United States Patent
Ouchi et al.

(10) Patent No.: US 9,554,336 B2
(45) Date of Patent: Jan. 24, 2017

(54) TERMINAL DEVICE, METHOD, AND INTEGRATED CIRCUIT

(71) Applicant: Sharp Kabushiki Kaisha, Osaka-shi, Osaka (JP)

(72) Inventors: Wataru Ouchi, Osaka (JP); Tatsushi Aiba, Osaka (JP); Shoichi Suzuki, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/904,153

(22) PCT Filed: Jul. 10, 2014

(86) PCT No.: PCT/JP2014/068516
§ 371 (c)(1),
(2) Date: Jan. 11, 2016

(87) PCT Pub. No.: WO2015/005462
PCT Pub. Date: Jan. 15, 2015

(65) Prior Publication Data
US 2016/0165545 A1   Jun. 9, 2016

(30) Foreign Application Priority Data
Jul. 12, 2013 (JP) ................................ 2013-146514

(51) Int. Cl.
*H04B 7/00* (2006.01)
*H04W 52/14* (2009.01)
(Continued)

(52) U.S. Cl.
CPC ......... *H04W 52/146* (2013.01); *H04W 52/327* (2013.01); *H04W 52/367* (2013.01); *H04W 52/48* (2013.01); *Y02B 60/50* (2013.01)

(58) Field of Classification Search
USPC ........... 455/522, 69, 70, 127.1; 370/310–320
See application file for complete search history.

(56) References Cited

U.S. PATENT DOCUMENTS

| | | | |
|---|---|---|---|
| 8,964,593 B2* | 2/2015 | Dinan | H04W 52/34 370/252 |
| 2010/0041428 A1* | 2/2010 | Chen | H04W 52/16 455/522 |

(Continued)

FOREIGN PATENT DOCUMENTS

JP   2011-525786 A   9/2011

OTHER PUBLICATIONS

Official Communication issued in International Patent Application No. PCT/JP2014/068516, mailed on Sep. 9, 2014.

(Continued)

*Primary Examiner* — Fayyaz Alam
(74) *Attorney, Agent, or Firm* — Keating & Bennett, LLP

(57) ABSTRACT

A terminal device configured to communicate with a base station device using one cell. The terminal device is configured to: set transmission power for transmission of a physical uplink shared channel on a subframe belonging to a first subframe set, based on a first parameter relating to power control adjustment; set transmission power for the physical uplink shared channel on a subframe belonging to a second subframe set, based on a second parameter relating to the power control adjustment; and calculate a value of the first parameter by accumulating a correction value indicated by a transmit power control command corresponding to the first subframe set, in a case that accumulation is enabled; calculate a value of the second parameter by accumulating the correction value indicated by the transmit power control command corresponding to the second subframe set, in a case that accumulation is enabled. Thus, the base station device and the terminal device can efficiently perform the transmit power control.

15 Claims, 8 Drawing Sheets

(51) Int. Cl.
*H04W 52/32* (2009.01)
*H04W 52/36* (2009.01)
*H04W 52/48* (2009.01)

(56) References Cited

U.S. PATENT DOCUMENTS

| | | | | |
|---|---|---|---|---|
| 2012/0282970 A1* | 11/2012 | Kela | ............... | H04W 52/146 455/522 |
| 2013/0308575 A1* | 11/2013 | Chen | ............... | H04W 52/16 370/329 |
| 2015/0327189 A1* | 11/2015 | Seo | ............... | H04W 52/383 370/311 |
| 2016/0135128 A1* | 5/2016 | Lee | ............... | H04W 52/04 370/311 |

OTHER PUBLICATIONS

"3rd Generation Partnership Project; Technical Specification Group Radio Access Network; Evolved Universal Terrestrial Radio Access (E-UTRA); Physical Channels and Modulation (Release 8)," 3GPP TS 36.211 V8.8.0, Sep. 2009, pp. 1-83.

Ericsson et al., "On standardization impact of TDD UL-DL adaptation", 3GPP TSG-RAN WG1 #69, R1-122016, May 21-25, 2012, pp. 1-3.

"3rd Generation Partnership Project; Technical Specification Group Radio Access Network; Evolved Universal Terrestrial Radio Access (E-UTRA); Physical layer; Measurements (Release 10)," 3GPP TS 36.214 V10.1.0, Mar. 2011, pp. 1-13.

NTT DOCOMO, "Issues Regarding Additional Carrier Type in Rel-11 CA", 3GPP TSG RAN WG1 Meeting #67, R1-114071, Nov. 14-18, 2011, pp. 1-5.

Nokia Corporation et al., "Enhanced uplink power control for dynamic TDD UL/DL reconfiguration", 3GPP TSG-RAN VG1 Meeting #73, R1-132295, May 20-24, 2013, 8 pages.

"3rd Generation Partnership Project; Technical Specification Group Radio Access Network; Evolved Universal Terrestrial Radio Access (E-UTRA); Physical layer procedures (Release 11)," 3GPP TS 36.213 V11.3.0, Jun. 2013, 16 pages.

* cited by examiner

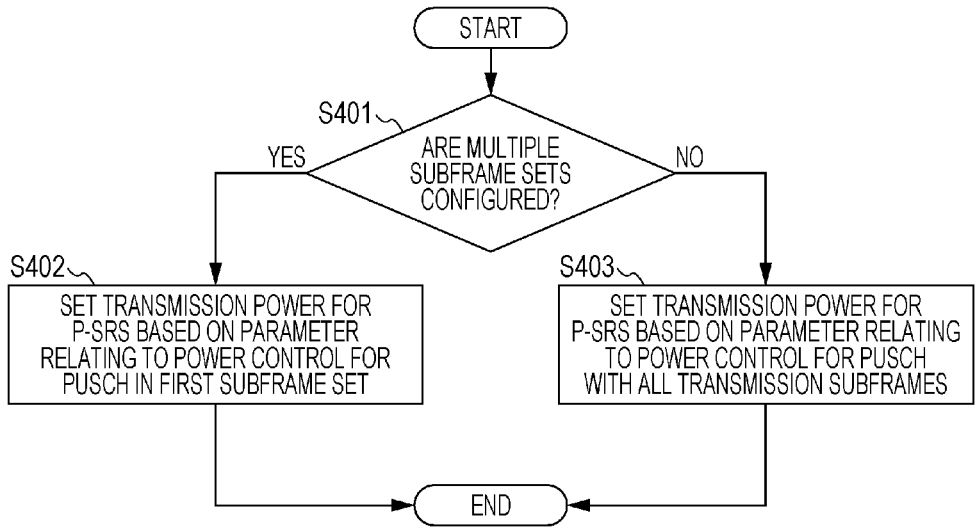

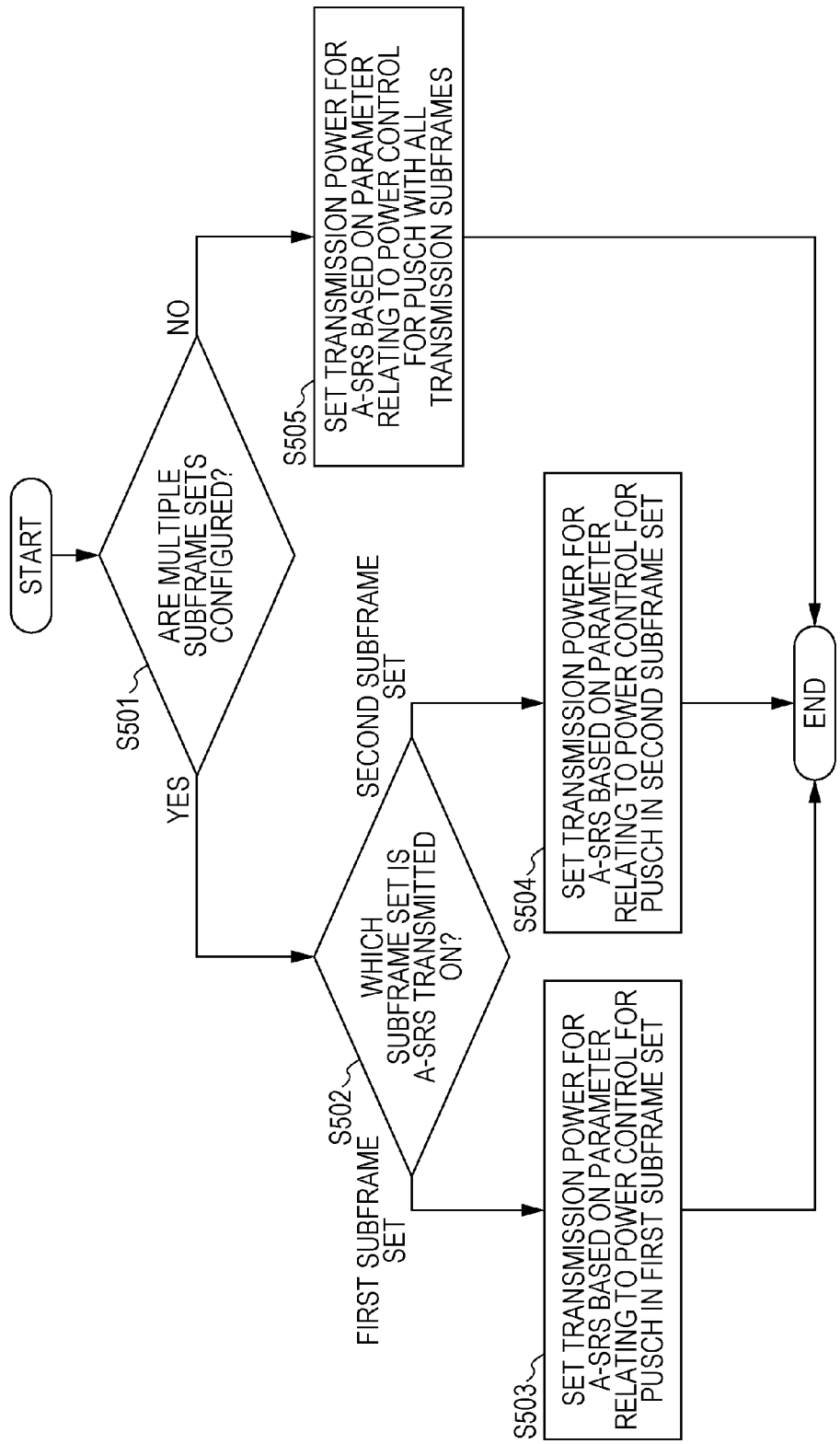

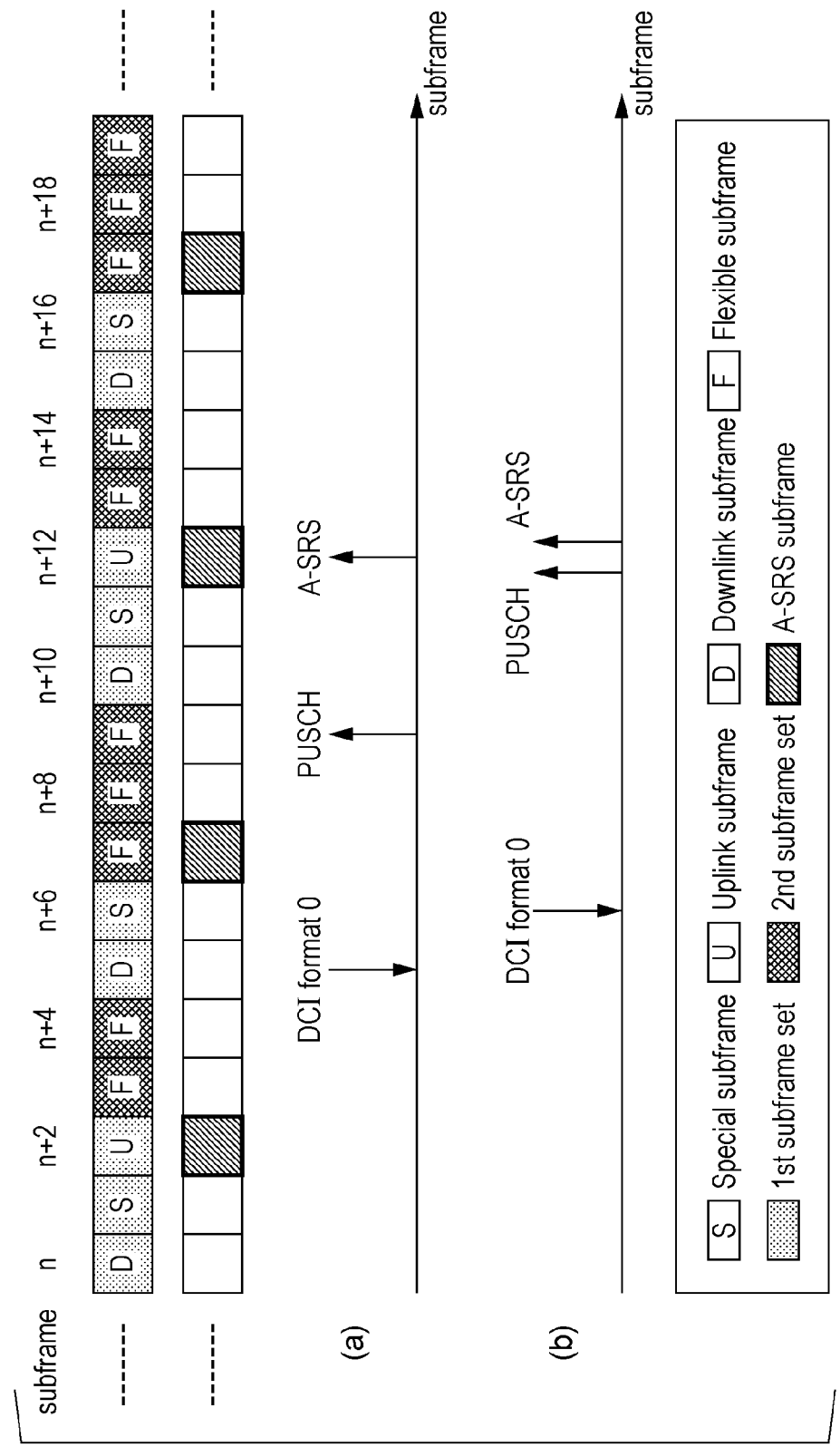

FIG. 7

PARAMETERS RELATING TO FIRST UPLINK POWER CONTROL (UplinkPowerControl)

SHARED PARAMETERS RELATING TO UPLINK POWER CONTROL (FOR PRIMARY CELL)
- p0-NominalPUSCH
- alpha
- p0-NominalPUCCH
- deltaFList-PUCCH
- deltaPreambleMsg3

SHARED PARAMETERS RELATING TO UPLINK POWER CONTROL FOR SECONDARY CELL
- p0-NominalPUSCH
- alpha DEDICATED PARAMETERS RELATING TO UPLINK POWER CONTROL (FOR PRIMARY CELL)
- p0-UE-PUSCH
- deltaMCS-Enabled
- accumulation-Enabled
- p0-UE-PUCCH
- pSRS-Offset
- filterCoefficient
- pSRS-Offset-Ap
- deltaTxD-OffsetListPUCCH DEDICATED PARAMETERS RELATING TO UPLINK POWER CONTROL FOR SECONDARY CELL
- p0-UE-PUSCH
- deltaMCS-Enabled
- accumulation-Enabled
- p0-UE-PUCCH
- pSRS-Offset
- pSRS-Offset-Ap
- filterCoefficient
- pathlossReferenceLinking

FIG. 9

ONE EXAMPLE OF DEDICATED PARAMETERS RELATING TO FIRST UPLINK POWER CONTROL (FOR PRIMARY CELL)
└── PATH LOSS REFERENCE RESOURCE

ONE EXAMPLE OF DEDICATED PARAMETERS RELATING TO FIRST UPLINK POWER CONTROL FOR SECONDARY CELL
└── PATH LOSS REFERENCE RESOURCE

ONE EXAMPLE OF DEDICATED PARAMETERS RELATING TO SECOND UPLINK POWER CONTROL (FOR PRIMARY CELL)
├── RELEASE
└── SETUP
    ├── p0-UE-PUSCH
    ├── deltaMCS-Enabled
    ├── accumulation-Enabled
    ├── p0-UE-PUCCH
    ├── pSRS-Offset
    ├── filterCoefficient
    ├── pSRS-Offset-Ap
    ├── deltaTxD-OffsetListPUCCH
    └── PATH LOSS REFERENCE RESOURCE

· ALL PARAMETERS ARE SET
· AT LEAST ONE IS SET

ONE EXAMPLE OF DEDICATED PARAMETERS RELATING TO SECOND UPLINK POWER CONTROL FOR SECONDARY CELL
├── RELEASE
└── SETUP
    ├── p0-UE-PUSCH
    ├── deltaMCS-Enabled
    ├── accumulation-Enabled
    ├── p0-UE-PUCCH
    ├── pSRS-Offset
    ├── pSRS-Offset-Ap
    ├── filterCoefficient
    ├── pathlossReferenceLinking
    └── PATH LOSS REFERENCE RESOURCE

· ALL PARAMETERS ARE SET
· AT LEAST ONE IS SET

TERMINAL DEVICE, METHOD, AND INTEGRATED CIRCUIT

TECHNICAL FIELD

The present invention relates to a terminal device, a method, and an integrated circuit.

This application claims the benefit of Japanese Priority Patent Application 2013-146514 filed Jul. 12, 2013, the entire contents of which are incorporated herein by reference.

BACKGROUND ART

In communication systems approved by Third Generation Partnership Project (3GPP), such as Wideband Code Division Multiple Access (WCDMA) (a registered trademark), Long Term Evolution (LTE), and LTE-Advanced (LTE-A), or in communication systems approved by the Institute of Electrical and Electronics Engineers (IEEE), such as Wireless LAN and Worldwide Interoperability for Microwave Access (WiMAX), a base station device (a cell, a first communication device (a communication device that is different from a terminal device), or an eNodeB) and a terminal device (a mobile terminal, a mobile station device, a second communication device (a communication device that is different from the base station device), or user equipment (UE)) each include multiple transmit and receive antennas, and spatial-multiplex a data signal and realize high-speed data communication by using a Multi Input Multi Output (MIMO) technology.

In the communication system, in order to realize the data communication between the base station device and the terminal device, the base station device needs to perform various control processes on the terminal device. For this reason, the base station device notifies the terminal device of control information using a predetermined resource, and thus performs the data communication for downlink and uplink. For example, the base station device notifies the terminal device of resource allocation information, modulation information on and coding information on the data signal, spatial multiplexing information on the data signal, transmit power control information and the like, and thus realizes the data communication.

The communication system supports Time Division Duplex (TDD). LTE that employs a TDD scheme is also referred to as TD-LTE or LTE TDD. TDD is a technology that makes downlink and uplink communication possible in a single frequency band (a carrier frequency or a component carrier) by time-multiplexing an uplink signal and a downlink signal. In LTE, with pre-setting, the downlink and the uplink can be switched on the subframe basis. Moreover, in TDD, a subframe (a downlink subframe, or a subframe reserved for downlink transmission) on which the downlink transmission is possible, a subframe (an uplink subframe, or a subframe reserved for uplink transmission) on which the uplink transmission is possible, and a guard period (GP) are provided, and thus for the downlink transmission and the uplink transmission, a subframe (a special subframe) is defined that is switchable in a time domain (a symbol region). Moreover, in the special subframe, the time domain on which the downlink transmission is possible is referred to as a downlink pilot time slot (DwPTS), and the time domain on which the uplink transmission is possible is referred to as an uplink pilot time slot (UpPTS).

For example, in a case where a subframe i is the downlink subframe, the terminal device can receive the downlink signal that is transmitted from the base station device, and in a case where a subframe j that is different from the subframe i is the uplink subframe, the terminal device can transmit the uplink signal from the terminal device to the base station device. Furthermore, in a case where a subframe k that is different from the subframe i or the subframe j is the special subframe, the downlink signal can be received in the time domain DwPTS of the downlink, and the uplink signal can be transmitted in the time domain UpPTS of the uplink (NPL 1). Furthermore, in order to perform communication in compliance with a TDD scheme in LTE or LTE-A, notification is provided with a special information element (TDD UL/DL configuration (TDD uplink-downlink configuration(s)), TDD configuration (tdd-Config or TDD config), or UL/DL configuration (uplink-downlink configuration(s))). The terminal device regards a certain subframe as any of the uplink subframe, the downlink subframe, and the special subframe, and can perform transmission and reception processing based on information that is notified. Furthermore, a configuration (lengths of the DwPTS, the UpPTS, and a GP within the special subframe) of the special subframe is defined by multiple patterns, and is managed using a table. The multiple patterns are associated with their respective values (indexes) and the value is notified, and thus the terminal device performs processing of the special subframe based on the pattern that is notified.

Furthermore, it is considered that according to traffic (an amount of information, an amount of data, or an amount of communication) of the uplink and traffic (an amount of information, an amount of data, or an amount of communication) of the downlink, a traffic adaptive control technology that changes a ratio between an uplink resource and a downlink resource is applied to TD-LTE. For example, it is considered that a ratio between the downlink subframe and the uplink subframe within 10 subframes is changed dynamically. As this method, a flexible subframe that is adaptively switched between the downlink subframe and the uplink subframe is considered (NPL 2). The base station device can perform reception of the uplink signal or transmission of the downlink signal on the flexible subframe. Furthermore, the terminal device regards the flexible subframe as the downlink subframe and can perform reception processing, as long as the base station device does not instruct the terminal device to transmit the uplink signal on the flexible subframe. Furthermore, in some cases, TDD in which the ratio between the downlink subframe and the uplink subframe, the subframes for the uplink and the downlink, or the TDD UL/DL (re-) configuration is changed dynamically is referred to as dynamic TDD (DTDD).

The communication system is a cellular communication system in which an area is divided in the cellular pattern into multiple areas, each covered by the base station device. Furthermore, a single base station device may manage multiple cells. Furthermore, a single base station device may manage multiple remote radio heads (RRH). Furthermore, a single base station device may manage multiple local areas. Furthermore, a single base station device may manage multiple heterogeneous networks (HetNets). Furthermore, a single base station device may manage multiple low power base station devices (low power nodes (LPNs)).

In the communication system, the terminal device can measure a reference signal received power (RSRP) based on a cell-specific reference signal (CRS) (NPL 3).

In the communication system, communication may be performed using a carrier (a component carrier) that is defined in LTE and in which one portion of a physical channel or signal is not mapped. At this point, such a carrier is referred to as a new carrier type (NCT). For example, a cell-specific reference signal, a physical downlink control channel, a synchronization signal (a primary synchronization signal or a secondary synchronization signal) may not be mapped in the new carrier type. Furthermore, it has been considered that a physical channel (a physical discovery channel (PDCH) or a new discovery signal (NDS)) for performing mobility measurement and time/frequency synchronization detection is introduced in a cell for which the new carrier type is set (NPL 4). Moreover, in some cases, the new carrier type is also referred to as an additional carrier type (ACT). Furthermore, in some cases, in contrast to the NCT, a known carrier type is also referred to as a legacy carrier type (LCT).

CITATION LIST

Non-Patent Literature

[NPL 1] 3rd Generation Partnership Project Technical Specification Group Radio Access Network; Evolved Universal Terrestrial Radio Access (E-UTRA); Physical Channels and Modulation (Release 8), TS36.211 v8.8.0 (2009 September).
[NPL 2] "On standardization impact of TDD UL-DL adaptation", R1-122016, 3GPP TSG-RAN WG1 Meeting #69, Prague, Czech Republic, 21st-25th May 2012.
[NPL 3] 3rd Generation Partnership Project Technical Specification Group Radio Access Network; Evolved Universal Terrestrial Radio Access (E-UTRA); Physical layer; Measurements (Release 10) 30 Mar. 2011, TS36.214 v10.1.0 (2011 March).
[NPL 4] "Issues Regarding Additional Carrier Type in Rel-11CA", R1-114071, 3GPP TSG-RAN WG1 Meeting #67, San Francisco, USA, 14-18 Nov. 2011.

DISCLOSURE OF THE INVENTION

Problems to be Solved by the Invention

In a communication system that performs dynamic time division duplex (DTDD) in which transmission timings for various uplink physical channels each are set implicitly or explicitly, a subframe that can be switched between an uplink subframe and a downlink subframe is set. For this reason, there occurs a problem that in such a subframe, a signal that is transmitted from each of the base station device and the terminal device causes interference with each other and suitable communication is not performed.

An object of an aspect of the present invention, which is made in view of the problems described above, is to provide a terminal device, a base station device, a communication method, and an integrated circuit, in each of which suitable transmit power control is possible.

Means for Solving the Problems

An aspect of the present invention is for solving the problems described, and therefore according to an aspect of the present invention, there is provided a terminal device configured to communicate with a base station device using one cell, the terminal device being configured to: receive first information indicating a subframe in a first subframe set and a subframe in a second subframe set, and second information indicating whether or not accumulation is enabled, for the one cell; set transmission power for transmission of a physical uplink shared channel on a subframe belonging to the first subframe set, based on a first parameter relating to power control adjustment; set transmission power for the physical uplink shared channel on a subframe belonging to the second subframe set, based on a second parameter relating to the power control adjustment; calculate a value of the first parameter by accumulating a correction value indicated by a transmit power control command corresponding to a subframe belonging to the first subframe set, in a case that the accumulation is enabled based on the second information; calculate a value of the second parameter by accumulating the correction value indicated by the transmit power control command corresponding to a subframe belonging to the second subframe set, in the case that the accumulation is enabled based on the second information; set one value indicated by one transmit power control command corresponding to the subframe belonging to the first subframe set, as the value of the first parameter, in a case that the accumulation is not enabled based on the second information; and set one value indicated by one transmit power control command corresponding to the subframe belonging to the second subframe set, as the value of the second parameter, in the case that the accumulation is not enabled based on the second information.

Furthermore, according to another aspect of the present invention, there is provided a method for use in a terminal device configured to communicate with a base station device using one cell, the method including: a step of receiving first information indicating a subframe in a first subframe set and a subframe in a second subframe set, and second information indicating whether or not accumulation is enabled, for the one cell; a step of setting transmission power for transmission of a physical uplink shared channel on a subframe belonging to the first subframe set, based on a first parameter relating to power control adjustment; a step of setting transmission power for the physical uplink shared channel on a subframe belonging to the second subframe set, based on a second parameter relating to the power control adjustment; a step of calculating a value of the first parameter by accumulating a correction value indicated by a transmit power control command corresponding to a subframe belonging to the first subframe set, in a case that accumulation is enabled based on the second information; a step of calculating a value of the second parameter by accumulating the correction value indicated by the transmit power control command corresponding to a subframe belonging to the second subframe set, in the case that the accumulation is enabled based on the second information; a step of setting one value indicated by one transmit power control command corresponding to the subframe belonging to the first subframe set, as the value of the first parameter, in a case that the accumulation is not enabled based on the second information; and a step of setting one value indicated by one transmit power control command corresponding to the subframe belonging to the second subframe set, as the value of the second parameter, in the case that the accumulation is not enabled based on the second information.

Furthermore, according to still another aspect of the present invention, there is provided an integrated circuit to be mounted on a terminal device configured to communicate with a base station device using one cell, and the integrated circuit being configured to cause the terminal device to perform a series of functions including: a function of setting a subframe in a first subframe set and a subframe in a second subframe set, for the one cell, based on first information; a function of setting transmission power for transmission of a physical uplink shared channel on a subframe belonging to the first subframe set, based on a first parameter relating to power control adjustment; a function of setting transmission power for the physical uplink shared channel on a subframe belonging to the second subframe set, based on a second parameter relating to the power control adjustment; a function of calculating a value of the first parameter by accumulating a correction value indicated by a transmit power control command corresponding to a subframe belonging to the first subframe set, in a case that accumulation is enabled based on second information; a function of calculating a value of the second parameter by accumulating the correction value indicated by the transmit power control command corresponding to a subframe belonging to the second subframe set, in the case that the accumulation is enabled based on the second information; a function of setting one value indicated by one transmit power control command corresponding to the subframe belonging to the first subframe set, as the value of the first parameter, in a case that the accumulation is not enabled based on the second information; and a function of setting one value indicated by one transmit power control command corresponding to the subframe belonging to the second subframe set, as the value of the second parameter, in the case that the accumulation is not enabled based on the second information.

Effects of the Invention

According to the aspect of the present invention, in a communication system in which a base station device and a terminal device communicate with each other, the terminal device performs suitable power control and thus communication efficiency can be improved.

BRIEF DESCRIPTION OF THE DRAWINGS

FIG. 3 is a diagram illustrating a configuration of a subframe pattern in a TDD UL/DL configuration.

FIG. 4 is a flowchart illustrating a processing procedure performed by the terminal device 2 on a periodic SRS according to a basic mode of the first embodiment of the present invention.

FIG. 5 is a flowchart illustrating a processing procedure performed by the terminal device 2 on an aperiodic SRS according to the basic mode of the first embodiment of the present invention.

FIG. 6 is a diagram illustrating one example of a transmission subframe for a PUSCH or an A-SRS according to the first embodiment.

FIG. 7 is a diagram illustrating one example of a parameter that is included in a parameter (UplinkPowerControl) relating to first uplink power control.

FIG. 9 is a diagram illustrating one example of a dedicated parameter relating to first uplink power control and a dedicated parameter relating to second parameter.

Figure 1:
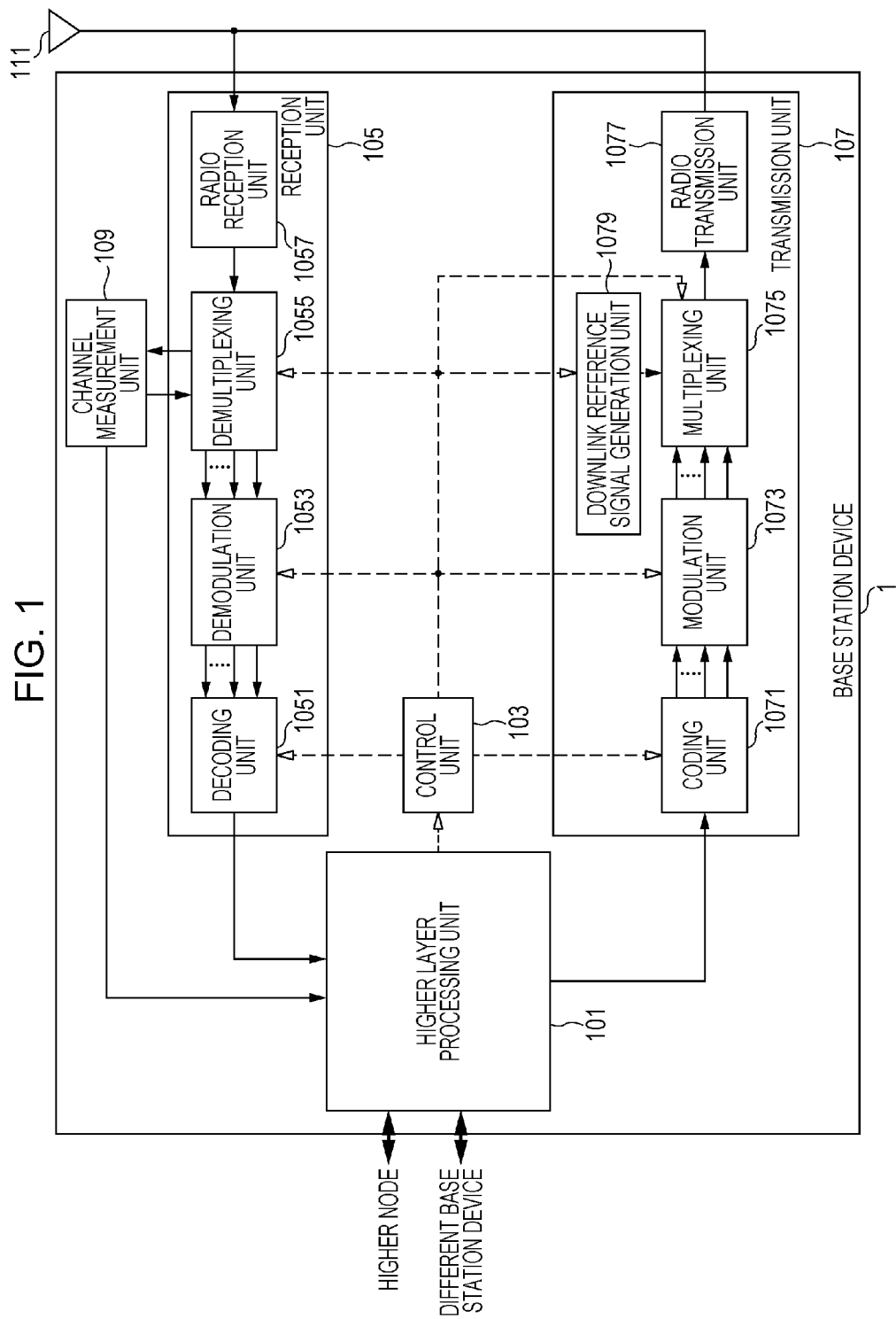
FIG. 1 is a schematic block diagram illustrating a configuration of a base station device 1 according to a first embodiment of the present invention.

MODE FOR CARRYING OUT THE INVENTION (Physical Channel) A main physical channel (or a physical signal) that is used in LTE and LTE-A is described. A channel means a medium that is used for signal transmission. A physical channel means a physical medium that is used for the signal transmission. There is a likelihood that, in LTE and LTE-A, and in standard releases after LTE and LET-A, a physical channel will be added from now on or a structure or format type of the physical channel will be changed or added, but even in such a case, the addition and change do not have an effect on a description of each embodiment of the present invention.

In LTE and LTE-A, physical channel scheduling is managed using a radio frame. 1 radio frame is 10 ms. 1 radio frame is configured from 10 subframes. Moreover, 1 subframe is configured from 2 slots (that is, 1 slot is 0.5 ms). Furthermore, management is performed using a resource block as a minimum unit of scheduling for arranging the physical channel. The resource block is defined by a given frequency region that is configured from a set of multiple subcarriers (for example, 12 subcarriers) and by a domain that is configured from given transmission time intervals (for example, 1 slot, or 7 symbols).

The physical channel corresponds to a set of resource elements on which information that is output from a higher layer is transmitted. The physical signal is used in a physical layer, does not carry the information that is output from the higher layer. To be more precise, higher layer control information, such as a radio resource control (RRC) message, system information (SI), or the like is transmitted on the physical channel.

As downlink physical channels, there are a physical downlink shared channel (PDSCH), a physical broadcast channel (PBCH), a physical multicast channel (PMCH), a physical control format indicator channel (PCFICH), a physical downlink control channel (PDCCH), a physical hybrid ARQ indicator channel (PHICH), and an enhanced physical downlink control channel (EPDCCH). Furthermore, as downlink physical signals, there are various reference signals and various synchronization signals. As downlink reference signals, there are a cell-specific reference signal (CRS), a UE specific reference signal (UERS), and a channel state information reference signal (CSI-RS). As synchronization signals, there are a primary synchronization signal (PSS), and a secondary synchronization signal (SSS).

As uplink physical channels, there are a physical uplink shared channel (PUSCH), a physical uplink control channel (PUCCH), and a physical random access channel (PRACH). Furthermore, as uplink physical signals, there are various reference signals. As uplink reference signals, there are a demodulation reference signal (DMRS) and a sounding reference signal (SRS).

The synchronization signal is configured from primary synchronization signals (PSSs) and secondary synchronization signals (SSSs). There are three types of primary synchronization signals. The secondary synchronization signals are configured from 31 types of codes which are alternately mapped in a frequency region. 504 types of cell identifiers (a physical layer cell identity (PCI), a physical cell identity, or a physical cell identifier) for identifying base station devices and a frame timing for radio synchronization are indicated by a combination of the primary synchronization signal and the secondary synchronization signal. A terminal device 2 specifies a cell identifier of a cell based on a synchronization signal that is received through a cell search.

The physical broadcast channel (PBCH) is transmitted for the purpose of notifying a control parameter (broadcast information or system information) that is used in a manner that is common to terminal devices within a cell. Furthermore, broadcast information (for example, SIB 1 or other system information) that is not notified on the PBCH is transmitted on the PDSCH through a DL-SCH. As pieces of broadcast information, a cell global identifier (CGI) indicating an identifier of an individual cell, a tracking area identifier (TAI) for managing a waiting area by paging, random access configuration information (a transmission timing timer or the like), common radio resource configuration information (shared radio resource configuration information), and the like are notified.

Initial transmission of a system information block type 1 message is performed through the PDSCH on a subframe 5 of a radio frame that satisfies SFN mod 8=0, and re-transmission (repetition) thereof is performed on subframe 5 which is a radio frame different from the radio frame used for the initial transmission and which satisfies SFN mod 2=0. The system information block type 1 message includes information indicating a configuration (lengths of DwPTS, GP, and UpPTS) of a special subframe. The system information block type 1 message is cell-specific information.

A system information message is transmitted through the PDSCH. The system information message is cell-specific information. The system information message may include a system information block X (X is a natural number) other than the system information block type 1.

The downlink reference signals are categorized by their usage into multiple types. For example, a cell-specific reference signal (CRS) is a pilot signal that is transmitted with predetermined power for every cell, and is a downlink reference signal that is periodically repeated in a frequency region and a time domain based on a predetermined rule. The terminal device 2 measures reception quality for every cell by receiving the cell-specific reference signal. Furthermore, the terminal device 2 uses the cell-specific reference signal also as a reference signal for demodulation of the physical downlink control channel that is transmitted at the same antenna port as the cell-specific reference signal, or of the physical downlink shared channel. As a sequence that is used for the cell-specific reference signal, a sequence that is identifiable for every cell is used. This sequence may be generated based on a pseudo random sequence. Furthermore, the sequence may be generated based on a Zadoff-Chu sequence. Furthermore, the sequence may be generated based on a gold sequence.

Furthermore, the downlink reference signal is used for downlink channel change estimation as well. The downlink reference signal that is used for the channel change estimation may be referred to as a channel state information reference signal (CSI-RS) or a CSI reference signal. Furthermore, the CSI reference signal that is not actually signal-transmitted or that is transmitted with zero power may be referred to as a zero power channel state information reference signal (zero power CSI-RS) or a zero power CSI reference signal. Furthermore, the CSI reference signal that is not actually signal-transmitted may be referred to as a non-zero power channel state information reference signal (non-zero power CSI-RS) or a non-zero power CSI reference signal. Furthermore, a downlink resource that is used for measuring an interference component may be referred to as a channel state information interference measurement resource (CSI-IMR) or a CSI-IM resource. The terminal device 2 may perform measurement of an interference signal for calculating a CQI value, using the zero power CSI reference signal that is included in the CSI-IM resource. Furthermore, the downlink reference signal that is dedicatedly set for every terminal device 2 is referred to as a UE-specific reference signal (UERS), a dedicated reference signal, a downlink demodulation reference signal (DL DMRS), or the like, and is used for demodulation of a physical downlink control channel or a physical downlink shared channel.

The physical downlink shared channel (PDSCH) is used for transmitting downlink data (DL-SCH). Furthermore, the PDSCH is also used in a case where the system information is transmitted on the DL-SCH. Information on allocation of a radio resource to the physical downlink shared channel is indicated with the physical downlink control channel. Furthermore, the PDSCH is also used for notifying a parameter (an information element or an RRC message) relating to uplink and downlink.

The RRC message is transmitted through the PDSCH. The RRC message is information or a signal in an RRC layer. The RRC message may be common to multiple mobile station devices within a cell, and may be dedicated to a specific mobile station device 1.

The physical downlink control channel (PDCCH) is transmitted on several OFDM symbols starting from the head of each subframe, and is used for the purpose of instructing the terminal device 2 as to resource allocation information in accordance with scheduling by a base station device 1, or an amount of adjustment for an increase or a decrease in transmission power. The terminal device 2 monitors the physical downlink control channel that is destined for the terminal device 2 itself before transmitting and receiving a layer 3 message (paging, a handover command, an RRC message or the like), and needs to acquire the resource allocation information that is referred to as an uplink grant at the time of transmission and as a downlink grant (also referred to as a downlink assignment) at the time of reception, from the physical downlink control channel that is destined for the terminal device 2 itself. Moreover, in addition to being transmitted on the OFDM symbol described above, it is also possible that the physical downlink control channel is configured to be transmitted on a region of the resource block that is dedicatedly allocated from the base station device 1 to the terminal device 2. In some cases, the physical downlink control channel that is transmitted on the region of the resource block which is dedicatedly allocated from the base station device 1 to the terminal device 2 is also referred to as an enhanced physical downlink control channel (enhanced PDCCH (EPDCCH)). Furthermore, in some cases, a PDCCH that is transmitted on the OFDM symbol described above is also referred to as a first control channel. Furthermore, in some cases, the EPDCCH is also referred to as a second control channel. Furthermore, in some cases, a resource region to which the PDCCH is allocable is also referred to as a first control channel region and a resource region to which the EPDCCH is allocable is also referred to as a second control channel region. Moreover, the PDCCH that will be described below basically includes the EPDCCH.

The base station device 1 may transmit a PCFICH, a PHICH, a PDCCH, an EPDCCH, a PDSCH, a synchronization signal, and a downlink reference signal, in the DwPTS of a special subframe. Furthermore, the base station device 1 may not transmit a PBCH in the DwPTS of the special subframe.

Furthermore, the terminal device 2 may transmit a PRACH and an SRS in the UpPTS of the special subframe. Furthermore, the terminal device 2 may not transmit a PUCCH, a PUSCH, and a DMRS in the UpPTS of the special subframe.

Furthermore, in a case where a special subframe is configured from only the GP and the UpPTS, the terminal device 2 may transmit a PUCCH and/or a PUSCH and/or a DMRS in the UpPTS of the special subframe.

At this point, the terminal device 2 monitors a set of PDCCH candidates and/or a set of EPDCCH candidates. The PDCCH hereinafter includes the EPDCCH for the sake of brief description. The PDCCH candidate refers to a candidate for the PDCCH that has the likelihood of being allocated or transmitted by the base station device 1. Furthermore, the PDCCH candidate is configured from one or multiple control channel elements (CCEs). Furthermore, the monitoring means that the terminal device 2 attempts to perform decoding on each of the PDCCHs within the set of PDCCH candidates, according to all DCI formats that are monitored.

At this point, the set of PDCCH candidates that the terminal device 2 monitors is also referred to as a search space. The search space is a set of resources that have a likelihood of being used by the base station device 1 for transmission of the PDCCH. In a PDCCH region, a common search space (CSS) and a UE-specific search space (USS) are configured (defined or set).

The CSS is used for transmission of downlink control information (DCI) to multiple terminal devices 2. That is, the CSS is defined by resources that are common to multiple terminal devices 2. Furthermore, a USS is used for the transmission of the downlink control information to a certain specific terminal device 2. That is, the USS is dedicatedly set for a certain specific terminal device 2. Furthermore, the USS may be shared among multiple terminal devices 2.

The downlink control information (DCI) is transmitted in a specific format (configuration or type) from the base station device 1 to the terminal device 2. The format may be referred to as a DCI format. In other words, it can be said that the DCI format is a format for transmitting the DCI. Multiple formats are prepared for the DCI formats that are transmitted from the base station device 1 to the terminal device 2 (for example, a DCI format 0/1/1A/1B/1C/1D/2/2A/2B/2C/2D/3/3A/4).

In a case where common DCI (single DCI) is transmitted in a certain DCI format to multiple terminal device 2, the base station device 1 transmits the DCI in a PDCCH (or EPDCCH) CSS, and, in a case where DCI is transmitted dedicatedly in a DCI format to the terminal device 2, transmits the DCI in a PDCCH (or EPDCCH) USS.

As pieces of DCI transmitted in a DCI format, there are resource allocation to the PUSCH or the PDSCH, a modulation coding scheme, a sounding reference signal request (an SRS request), a channel state information request (a CSI request), indication of initial transmission or re-transmission of a single transport block, a transmit power control command for the PUSCH, a transmit power control command for the PUCCH, a cyclic shift of a UL DMRS and an index of an orthogonal code cover (OCC), and the like. In addition to these, various pieces of DCI are defined by specifications.

A format that is used for uplink transmission control (for example, PUSCH scheduling or the like) may be referred to as an uplink DCI format (for example, a DCI format 0/4) or DCI relating to uplink. A format that is used for downlink reception control (for example, PDSCH scheduling or the like) may be referred to as a downlink DCI format (for example, a DCI format 1/1A/1B/1C/1D/2/2A/2B/2C/2D) or DCI relating to downlink. A format that is used for adjusting transmission power of each of the multiple terminal devices 2 may be referred to as a group triggering DCI format (for example, a DCI format 3/3A).

For example, the DCI format 0 is used for transmitting information relating to resource allocation to the PUSCH that is necessary for performing scheduling of one PUSCH in one serving cell, information relating to a modulation scheme, information relating to transmit power control (TPC) command for the PUSCH, or the like. Furthermore, these pieces of DCI are transmitted on the PDCCH/EPDCCH. The DCI format is said to be configured from at least one piece of DCI.

In the CSS and/or the USS of the PDCCH region, the terminal device 2 monitors the PDCCH and detects the PDCCH that is destined for the terminal device 2 itself.

Furthermore, for the transmission (the transmission on the PDCCH) of the downlink control information, a radio network temporary identifier (RNTI) that is allocated by the base station device 1 to the terminal device 2 is employed. Specifically, a cyclic redundancy check (CRC) parity bit is attached to the DCI format (also possibly to the downlink control information). After being attached, the CRC parity bit is scrambled by the RNTI.

The terminal device 2 attempts to perform the decoding on the DCI format to which the CRC parity bit scrambled by the RNTI is attached, and detects the DCI format that succeeds in the CRC, as the DCI format that is destined for the terminal device 2 itself (which is also called blind decoding). That is, the terminal device 2 attempts to perform the decoding on the PDCCH that is accompanied by the CRC that is scrambled by the RNTI, and detects the PDCCH that succeeds in the CRC, as the PDCCH that is destined for the terminal device 2 itself.

At this point, a cell-radio network temporary identifier (C-RNTI) is included in the RNTI. The C-RNTI is a unique identifier that is used for RRC connection and scheduling identification. The C-RNTI is used for unicast transmission that is dynamically scheduled.

Furthermore, a temporary C-RNTI is included in the RNTI. The temporary C-RNTI is an identifier that is used for a random access procedure (for example, initial access). For example, the terminal device 2 may attempt to decode only in the CSS the DCI format (for example, the DCI format 0) relating to the uplink to which the CRC scrambled by the temporary C-RNTI is attached. Furthermore, the terminal device 2 may attempt to decode in the CSS and the USS the DCI format (for example, the DCI format 1A) relating to the downlink to which the CRC scrambled by the temporary C-RNTI is added.

Furthermore, in a case where the DCI is transmitted in the CSS, if the CRC parity bit scrambled with the temporary C-RNTI or the C-RNTI is attached to the DCI (DCI format) and the DCI is transmitted in the USS, the base station device 1 may add the CRC scrambled with the C-RNTI to the DCI (DCI format).

The physical uplink shared channel (PUSCH) is mainly used for transmitting uplink data and uplink control information (UCI). The UCI that is transmitted on the PUSCH includes channel state information (CSI) and/or an ACK/NACK. Furthermore, the CSI that is transmitted on the PUSCH includes aperiodic CSI (A-CSI) and periodic CSI. Furthermore, as is the case with the downlink, the information on allocation of a resource to the physical uplink shared channel is indicated with the physical downlink control channel. Furthermore, the uplink data is transferred on the PUSCH that is scheduled by a dynamic scheduling grant. Furthermore, information (for example, identification information of the terminal device 2, or message 3) of the terminal device 2 itself relating to random access is transmitted on the PUSCH that is scheduled by a random access response grant. Furthermore, parameters that are used for setting transmission power for transmission on the PUSCH may differ according to a type of detected grant. Moreover, control data is transmitted in the form of a channel quality indicator (CQI and/or PMI), a HARQ-ACK, or an RI. To be more precise, the control data is transmitted in the form of uplink control information.

The physical uplink control channel (PUCCH) is used for notifying a reception acknowledgment response (acknowledgement/negative acknowledgement (ACK/NACK)) of the downlink data that is transmitted on the physical downlink shared channel or channel information (channel state information) on the downlink, or for making a scheduling request (SR) that is a request (a radio resource request) for allocation of uplink resource. The channel state information (CSI) includes a channel quality indicator (CQI), a precoding matrix indicator (PMI), a precoding type indicator (PTI), and a rank indicator (RI). In some cases, each indicator is expressed as an indication, but the indicator and the indication have the same application and meaning. Furthermore, a format of the PUCCH may be switched according to the UCI that is transmitted. For example, in a case where the UCI is configured from the HARQ-ACK and/or the SR, the UCI may be transmitted on the PUCCH in the format 1/1a/1b/3. Furthermore, in a case where the UCI is configured from the periodic CSIs, the UCI may be transmitted on the PUCCH in the format 2.

As types of CSI reporting, there are periodic CSI reporting by which the channel state information is reported periodically or in a case where an event condition is satisfied, and aperiodic CSI reporting by which the channel state information is reported in a case where a report is requested with the CSI request that is included in the DCI format. The periodic CSI reporting is performed on the PUCCH or the PUSCH, and the aperiodic CSI reporting is performed on the PUSCH. The terminal device 2, when given an instruction based on information included in the DCI format, can transmit the CSI that is not accompanied by the uplink data, on the PUSCH.

The uplink reference signal includes the demodulation reference signal (DMRS) that is used by the base station device 1 for demodulating the physical uplink control channel (PUCCH) and/or the physical uplink shared channel (PUSCH), and the sounding reference signal (SRS) that is used by the base station device 1 mainly for estimating an uplink channel state. Furthermore, as the sounding reference signals, there are a periodic sounding reference signal (periodic SRS (P-SRS)) that is set in such a manner that the periodic sounding reference signal is transmitted periodically by the higher layer, and an aperiodic sounding reference signal (aperiodic SRS (A-SRS)) of which transmission is requested by the SRS request that is included in a downlink control information (DCI) format. In some cases, the uplink reference signal is also referred to as an uplink pilot signal or an uplink pilot channel. Furthermore, in some cases, the periodic sounding reference signal is also referred to as a periodic sounding reference signal (P-SRS) or a trigger type 0 sounding reference signal (trigger type 0 SRS). Furthermore, in some cases, the aperiodic sounding reference signal is also referred to as an aperiodic sounding reference signal (A-SRS) or a trigger type 1 sounding reference signal (trigger type 1 SRS). Moreover, in cooperative communication, the aperiodic sounding reference signal may be divided into a signal (for example, which, in some cases, is referred to as a trigger type 1a SRS) that is a specialized signal for uplink channel estimation, and a signal (for example, which, in some cases, is referred to as a trigger type 1b SRS) that is used for causing the base station device 1 to measure the channel state using channel reciprocity, in TDD. Moreover, the DMRS is set to correspond to each of the PUSCH and the PUCCH. Furthermore, the DMRS is time-multiplexed onto the same subframe as with the PUSCH or the PUCCH. Furthermore, in the case of the PUSCH and in the case of the PUCCH, the DMRS may differ in terms of a time multiplexing method. For example, while the DMRS for the PUSCH is mapped within 1 slot that is configured from 7 symbols, using only 1 symbol, the DMRS for the PUCCH is mapped within 1 slot that is configured from 7 symbols, using 3 symbols.

Furthermore, for the sounding reference signal, a subframe on which the sounding reference signal is transmitted is determined in accordance with information relating to a subframe for transmission of a sounding reference signal, which is notified by higher layer signaling. As pieces of information relating to the transmission subframe, there are information (shared information) that is set to be cell-specific, and information (dedicated information) that is set to be UE-specific. The information that is set to be cell-specific includes information indicating a subframe on which the sounding reference signal that is shared among all terminal devices 2 within a cell is transmitted. Furthermore, the information that is set to be UE-specific includes information indicating a subframe offset and periodicity that are a subset of subframes which are set to be cell-specific. With these pieces of information, the terminal device 2 can determine a subframe (which, in some cases, is referred to as an SRS subframe or an SRS transmission subframe) on which the sounding reference signal can be transmitted. Furthermore, in the subframe on which the sounding reference signal that is set to be cell-specific is transmitted, in a case where the physical uplink shared channel is transmitted, the terminal device 2 can puncture as many time resources for the physical uplink shared channel as symbols on which the sounding reference signal is transmitted, and can transmit the physical uplink shared channel on the time sources. By doing this, a collision can be avoided between the transmission of the physical uplink shared channel and the transmission of the sounding reference signal between the terminal devices 2. Performance degradation can be prevented from the point of view of the terminal device 2 that transmits the physical uplink shared channel. Furthermore, from the point of view of the terminal device 2 that transmits the sounding reference signal, precision of channel estimation can be secured. At this point, the setting for being UE-specific may be performed independently of the periodic sounding reference signal and the aperiodic sounding reference signal. In a case where various parameters are set by the higher layer signaling, a first uplink reference signal is periodically transmitted in accordance with a transmission subframe that is set. Furthermore, in a case where a transmission request is made, a second uplink reference signal is aperiodically transmitted by a field (an SRS request) relating to a request for transmission of the second uplink reference signal, which is included in a downlink control information format. In a case where the SRS request that is included in a certain downlink control information format indicates a positive or positive-equivalent index (value), the terminal device 2 transmits the A-SRS on a predetermined transmission subframe. Furthermore, in a case where the detected SRS request indicates a negative or negative-equivalent index (value), the terminal device 2 does not transmit the A-SRS on a predetermined subframe. Moreover, information (shared information or cell information) relating to a parameter that is set to be cell-specific is notified using system information or a dedicated control channel (DCCH). Furthermore, information (individual information or dedicated information) relating to a parameter that is dedicatedly set for the terminal device 2 is notified using a common control channel (CCCH). Moreover, at least one parameter is notified with information relating to a parameter.

The physical random access channel (PRACH) is a channel that is used for notifying a preamble sequence, and has a guard time. The preamble sequence is configured in such a manner that 64 types of sequences are prepared to express 6-bit information. The physical random access channel is used as a means by which the terminal device 2 has access to the base station device 1. The terminal device 2 uses the physical random access channel in order to make a request to the base station device 1 for the radio resource when the physical uplink control channel is not set, in response to the scheduling request (SR), or to make a request to the base station device 1 for transmission timing alignment information (also referred to as timing advance (TA)) necessary to adjust uplink transmission timing to a reception timing window of the base station device 1.

Specifically, the terminal device 2 transmits the preamble sequence using the radio resource for the physical random access channel that is set by the base station device 1. The terminal device 2 that receives the transmission timing alignment information sets the transmission timing timer that counts the effective time of the transmission timing alignment information that is commonly set by the broadcast information (or is dedicatedly set with the layer 3 message), and manages an uplink state as a transmission timing alignment state during the effective time of the transmission timing timer (while the counting is in progress) and as a transmission timing non-alignment state (a state where the transmission timing is not aligned) during the non-effective time (after the transmission timing timer expires). The layer 3 message is a control-plane (C-plane) message that is exchanged with a radio resource control (RRC) layer between the terminal device 2 and the base station device 1, and is used as a message that has the same meaning as RRC signaling or the RRC message. Furthermore, in some cases, the RRC signaling is also referred to as the higher layer signaling or dedicated signaling. In some cases, the dedicated signaling is also referred to as individual signaling.

Random access procedures include two random access procedures. One is a contention-based random access procedure and the other is a non-contention-based random access procedure. The contention-based random access procedure is a random access procedure in which there is a likelihood that a collision will occur between multiple terminal devices 2.

Furthermore, the non-contention-based random access procedure is a random access procedure in which a collision does not occur between multiple terminal devices 2.

The non-contention-based random access procedure is made up of 3 steps, and random access preamble assignment is notified, by the dedicated signaling for the downlink, from the base station device 1 to the terminal device 2. At this time, with the random access preamble assignment, the base station device 1 allocates a random access preamble for non-contention to the terminal device 2, and the random access preamble assignment is transmitted by a source base station device for handover, and is signaled by the handover command that is generated by a target base station device or, in a case of a downlink data arrival, is signaled by the PDCCH.

The terminal device 2 that receives the random access preamble assignment transmits the random access preamble (message 1) on the RACH in the uplink. At this time, the terminal device 2 transmits the random access preamble for non-contention that is allocated.

The base station device 1 that receives the random access preamble transmits a random access response to the terminal device 2 on the downlink data (downlink shared channel (DL-SCH)). Furthermore, information that is transmitted with the random access response includes an initial uplink grant (a random access response grant) for and timing alignment information for handover, timing alignment information for downlink data arrival, and a random access preamble identifier. In some cases, the downlink data is also referred to as downlink shared channel data (DL-SCH data).

At this point, the non-contention-based random access procedure is applied to the handover, the downlink data arrival, and positioning. The contention-based random access procedure is applied to initial access from RRC_IDLE, RRC connection re-establishment, the handover, the downlink data arrival, and an uplink data arrival.

Next, an example of the contention-based random access procedure is described.

The terminal device 2 acquires system information block type 2 (SIB 2) that is transmitted by the base station device 1. SIB 2 is a setting (common information) that is common to all terminal devices 2 (or multiple terminal devices 2) within a cell. For example, the common setting includes a setting of the PRACH.

The terminal device 2 randomly selects a number of the random access preamble. Furthermore, the terminal device 2 transmits a random access preamble (message 1) of which a number is selected, to the base station device 1 using the PRACH. The base station device 1 estimates uplink transmission timing using the random access preamble.

The base station device 1 transmits a random access response (the DL-SCH or message 2) using the PDSCH. The random access response includes multiple pieces of information for the random access preamble that is detected by the base station device 1. For example, the pieces of information include a number of the random access preamble, the temporary C-RNTI, a timing advance command (TA command), and the random access response grant.

The terminal device 2 transmits (initially transmits) the uplink data (UL-SCH or message 3) on the PUSCH that is scheduled using the random access response grant. The uplink data includes an identifier (information indicating InitialUE-Identity or the C-RNTI) for identifying the terminal device 2. In some cases, the uplink data is also referred to as uplink shared channel data.

In a case where the base station device 1 fails to decode the uplink data, the base station device 1 gives an instruction for re-transmission of the uplink data using the DCI format to which the CRC parity bit scrambled by the temporary C-RNTI is attached. The terminal device 2, when instructed by the DCI format to re-transmit the uplink data, re-transmits the same uplink data on the PUSCH that is scheduled using the DCI format to which the CRC parity bit scrambled by the temporary C-RNTI is attached.

Furthermore, in a case where the base station device 1 fails to decode the uplink data, the base station device 1 can give an instruction for the re-transmission of the uplink data using the PHICH (NACK). The terminal device 2, when is instructed by the NACK to re-transmit the uplink data, re-transmits the same uplink data on the PUSCH.

In a case where the base station device 1 succeeds in decoding the uplink data, the base station device 1 can know which of the terminal devices 2 performs transmission of the random access preamble and the uplink data, by acquiring the uplink data. That is, before succeeding in decoding the uplink data, the base station device 1 cannot know which of the terminal devices 2 performs the transmission of the random access preamble and the uplink data.

In a case where message 3 including InitialUE-Identity is received, the base station device 1 transmits a contention resolution identifier (a contention resolution identity) (message 4) that is generated based on InitialUE-Identity that is received, to the terminal device 2 using the PDSCH. In a case where the received content resolution identifier and InitialUE-Identity are matched to each other, the terminal device 2 (1) regards contention resolution of the random access preamble as being successful, (2) sets a value of the temporary C-RNTI to the C-RNTI, (3) discards the temporary C-RNTI, and (4) regards the random access procedure as being correctly completed.

Furthermore, in a case where message 3 is received that includes information indicating the C-RNTI, the base station device 1 transmits to the terminal device 2 the DCI format (message 4) to which the CRC parity bit scrambled by the received C-RNTI is attached. In a case where the DCI format to which the CRC parity bit scrambled by the C-RNTI is attached is decoded, the terminal device 2 (1) regards the contention resolution of the random access preamble as being successful, (2) discards the temporary C-RNTI, and (3) regards the random access procedure as being correctly completed.

That is, the base station device 1 schedules the PUSCH, using the random access response grant, as part of the contention-based random access procedure.

The terminal device 2 transmits the uplink data (message 3) on the PUSCH that is scheduled using the random access response grant. That is, the terminal device 2 performs transmission on the PUSCH that corresponds to the random access response grant, as part of the contention-based random access procedure.

Furthermore, the base station device 1 schedules the PUSCH, using the DCI format to which the CRC scrambled by the temporary C-RNTI is attached, as part of the contention-based random access procedure. Furthermore, the base station device 1 schedules the transmission on the PUSCH or gives an instruction for the transmission on the PUSCH using the PHICH (the NACK), as part of the contention-based random access procedure.

The terminal device 2 transmits (re-transmits) the uplink data (message 3) on the PUSCH that is scheduled using the DCI format to which the CRC scrambled by the temporary C-RNTI is attached. Furthermore, the terminal device 2 transmits (re-transmits) the uplink data (message 3) on the PUSCH that is scheduled, according to the reception of the PHICH. That is, the terminal device 2 performs the transmission on the PUSCH that corresponds to re-transmission of the same uplink data (a transport block), as part of the contention-based random access procedure.

A logical channel will be described. The logical channel is used for transferring an RRC message or an information element. Furthermore, the logical channel is transmitted on the physical channel through a transport channel.

A broadcast control channel (BCCH) is a logical channel that is used for broadcasting system control information. For example, system information or information that is necessary for initial access is transmitted using this channel. A master information block (MIB) or system information block type 1 (SIB 1) is transferred using this logical channel.

The common control channel (CCCH) is a logical channel that is used for transmitting control information between the terminal device 2 that does not have the RRC connection to a network and the network. For example, UE-specific control information or configuration information is transmitted using this logical channel.

The dedicated control channel (DCCH) is a logical channel that is used for transmitting dedicated control information in both directions between the terminal device 2 that has the RRC connection and the network. For example, cell-specific re-configuration information is transmitted using this logical channel.

In some cases, signaling that uses the CCCH or the DCCH is collectively referred to as the RRC signaling (the higher layer signaling).

As pieces of information (an information element, a parameter, or a configuration) relating to uplink power control, there are information that is notified as broadcast information (system information), information that is notified as information (shared information) which is shared among the terminal devices 2 within the same cell, and information that is notified as UE-specific dedicated information. The terminal device 2 sets transmission power based on only information that is notified as the broadcast information, or based on information that is notified as the broadcast information/shared information, and on information that is notified as the dedicated information.

Radio resource control configuration shared information may be notified as the broadcast information (or the system information). Furthermore, the radio resource control configuration shared information may be notified as the dedicated information (mobility control information).

Radio resource configurations include a random access channel (RACH) configuration, a broadcast control channel (BCCH) configuration, a paging control channel (PCCH) configuration, a physical random access channel (PRACH) configuration, a physical downlink shared channel (PDSCH) configuration, a physical uplink shared channel (PUSCH) configuration, a physical uplink control channel (PUCCH) configuration, a sounding reference signal (SRS) configuration, a configuration relating to the uplink power control, and a configuration relating to uplink cyclic prefix length, and the like. In a case where information is notified as the broadcast information, and in a case where information is notified as re-configuration information, the pieces of information that are notified may not be the same. To be more precise, various settings that are notified by the broadcast information and the re-configuration information may be configured independently.

Each of the information elements, necessary for setting parameters relating to various physical channels/physical signals (the PRACH, the PUCCH, the PUSCH, the SRS, the UL DMRS, the CRS, the CSI-RS, the PDCCH, the PDSCH, the PSS/SSS, the DL DMRS, the PBCH, the PMCH, and the like) are configured from shared configuration information that is shared among the terminal devices 2 within the same cell and dedicated configuration information that is set for every terminal device 2. The shared configuration information may be transmitted with the system information. Furthermore, the shared configuration information may be transmitted as the dedicated information in a case where re-setting is performed. This setting includes setting of a parameter. The parameter setting includes setting of a parameter value. Furthermore, in a case where a parameter is managed using a table, the parameter setting includes setting of an index value.

Information relating to a parameter for the physical channel described above is transmitted to the terminal device 2 using the RRC message. To be more precise, based on the received RRC message, the terminal device 2 sets resource allocation or transmission power for each physical channel. As the RRC messages, there are a message relating to a broadcast channel, a message relating to a multi-casting channel, a message relating to a paging channel, a message relating to each channel for the downlink, a message relating to each channel for the uplink, and the like. Each RRC message may be configured to include information elements (IEs). Furthermore, the information element may include information that is equivalent to a parameter. Moreover, in some cases, the RRC message is also referred to as a message. Furthermore, a message class is a set of one or more messages. The message may include the information element. As the information elements, there are an information element relating to the radio resource control, an information element relating to security control, an information element relating to mobility control, an information element relating to measurement, an information element relating to a multimedia broadcast multicast service (MBMS), and the like. Furthermore, the information element may include a lower-level information element. The information element may be set as a parameter. Furthermore, the information element may be defined as control information indicating one or more parameters.

The information element (IE) is used for stipulating (designating or setting) a parameter for various channels/signals/pieces of information by the system information (SI) or the dedicated signaling. Furthermore, a certain information element includes one or more fields. The information element may be configured from one or more information elements. Moreover, in some cases, the field that is included in the information element is also referred to as a parameter. To be more precise, the information element may include one or more types of parameters (one or more parameters). Furthermore, the terminal device 2 performs radio resource allocation control, uplink power control, transmission control, and the like based on various parameters. Furthermore, the system information may be defined as the information element.

The information element may be set to be in the field that constitutes the information element. Furthermore, a parameter may be set to be in the field that constitutes the information element.

The RRC message includes one or more information elements. Furthermore, the RRC message for which multiple RRC messages are set is referred to as the message class.

As parameters relating to uplink transmission power control that is notified to the terminal device 2 using the system information, there are nominal power (a nominal level, a nominal power level, reference power, a reference level, a reference power level, official power, an official level, and an official power level) $P_{O\_NOMINAL\_PUSCH}$ for the PUSCH, standard $P_{O\_NOMINAL\_PUCCH}$ for the PUCCH, a pathloss compensation coefficient $\alpha_c$, a list of power offsets that are set for every PUCCH format, and power offset $P_{O\_PRE}$ for the preamble and message 3. Furthermore, as parameters relating to the random access channel, which is notified to the terminal device 2 using the system information, there are a parameter relating to the preamble, a parameter relating to the transmit power control for the random access channel, and a parameter relating to the transmission control for the random access preamble. The parameter relating to the transmission control for the random access preamble is used at the time of the initial access, or when a re-connection is made after a radio link failure (RLF) occurs. Furthermore, as parameters relating to downlink power control, which is notified to the terminal device 2 using the system information, there are transmission power (reference signal power) for a cell-specific reference signal, and an index $P_B$(p-b) indicating a ratio of a power ratio between the PDSCH and the CRS in a subframe in which the CRS is not present to a power ratio between transmission power for the PDSCH and transmission power for the CRS in a subframe in which the CRS is present.

Information relating to transmit power control (the uplink power control or the downlink power control) may be notified to the terminal device 2 as the broadcast information. Furthermore, the information relating to the transmit power control may be notified to the terminal device 2 as the shared information. Furthermore, the information relating to the transmit power control may be notified to the terminal device 2 as the dedicated information. Furthermore, the format relating to the transmit power control may be notified to the terminal device 2 as the system information.

Basic Mode of a First Embodiment

A basic mode of a first embodiment of the present invention will be described below. A communication system according to a basic mode of the first embodiment includes a master base station device (also referred to as a macro base station device, a first base station device, a first communication device, a serving base station device, a primary base station device, an anchor base station device, a first access point, a first point, a first transmission point, a first reception point, a macro cell, a first cell, and a primary cell) as a base station device 1 (hereinafter also referred to as an access point, a point, a transmission point, a reception point, a cell, a serving cell, a transmission device, a reception device, a transmission station, a reception station, a transmit antenna group, a transmit antenna port group, a receive antenna group, a receive antenna port group, a communication device, a communication terminal, and an eNodeB). Moreover, the communication system according to the first embodiment may include a secondary base station device (also referred to as a remote radio head (RRH)), a remote antenna, a forward-extending antenna, a distributed antenna, a second access point, a second point, a second transmission point, a second reception point, a reference point, a low power base station device (a low power node (LPN), a micro base station device, a pico base station device, a femto base station device, a small base station device, a local area base station device, a phantom base station device, a home (indoor) base station device (a home eNodeB, a home NodeB, a HeNB, or a HNB), a second base station device, a second communication device, a cooperative base station device group, a cooperative base station device set, a cooperative base station device, a hot spot, a micro cell, a pico cell, a femto cell, a small cell, a phantom cell, a local area cell, a second cell, and a secondary cell). Furthermore, the communication system according to the first embodiment includes a terminal device 2 (hereinafter also referred to as a mobile station, a mobile station device, a mobile terminal, a reception device, a transmission device, a reception terminal, a transmission terminal, a third communication device, a receive antenna group, a receive antenna port group, a transmit antenna group, a transmit antenna port group, a user device, and user equipment (UE)). Here, the secondary base station device may be described as multiple secondary base station devices. For example, the master base station device and the secondary base station device may perform communication with the terminal device 2 using a heterogeneous network arrangement, with some or all portions of a coverage of the secondary base station device being included in a coverage of the master base station device. Furthermore, the secondary base station device may be arranged out of the coverage of the master base station device.

Furthermore, the communication system according to the basic mode of the first embodiment is configured from the base station device 1 and the terminal device 2. A single base station device 1 may manage one or more terminal devices 2. Furthermore, a single base station device 1 may manage one or more cells (the serving cell, the primary cell, the secondary cell, the macro cell, the femto cell, the pico cell, the small cell, and the phantom cell). To be more precise, a single base station device 1 may manage the macro cell and the small cell. Furthermore, a single base station device 1 may manage one or more frequency bands (a component carrier and a carrier frequency). Furthermore, a single base station device 1 may manage one or more low power base station devices (low power nodes (LPNs)). Furthermore, a single base station device 1 may manage one or more home (indoor) base station devices (home eNodeBs (HeNBs)). Furthermore, a single base station device 1 may manage one or more access points. Multiple base station devices 1 may be connected to one another with an optical fiber, a copper wire, a coaxial cable, an X2 interface, an X3 interface, an Xn interface, and the like. Furthermore, the multiple base station devices 1 may be managed with a network. Furthermore, a single base station device 1 may one or more relay station devices (relay nodes). Furthermore, a network may be set up with the multiple base station devices 1. Furthermore, the multiple base station devices 1 may be clustered.

Furthermore, the communication system according to the basic mode of the first embodiment may realize coordination communication (coordination multiple points transmission and reception (CoMP)) with multiple base station devices and/or low power base station devices and/or home base station devices. To be more precise, the communication system according to the basic mode of the first embodiment may perform dynamic point selection (DPS) that dynamically switches among points (transmission points and/or reception points) through which communication with the terminal device 2 is performed. Furthermore, the communication system according to the basic mode of the first embodiment may perform coordinated scheduling (CS) or coordinated beamforming (CB). Furthermore, the communication system according to the basic mode of the first embodiment may perform joint transmission (JT) or joint reception (JR).

Furthermore, multiple low power base station devices or small cells, which are arranged adjacent to one another, may be clustered (clustering or grouping). The multiple low power base station devices that are clustered may notify the same configuration information. Furthermore, in some cases, areas (coverage) of the small cells that are clustered are referred to a local area.

In downlink transmission, in some cases, the base station device 1 is also referred to as a transmission point (TP). Furthermore, in some cases, in uplink transmission, the base station device 1 is also referred to as a reception point (RP). Furthermore, a downlink transmission point and an uplink reception point are path loss reference points (reference points) for measuring a downlink path loss. Furthermore, the reference point for measuring the path loss may be set independently of the transmission point or the reception point.

Furthermore, the small cell, the phantom cell, or the local area cell may be set as a third cell. Furthermore, the small cell, the phantom cell, or the local area cell may be re-set as the primary cell. Furthermore, the small cell, the phantom cell, or the local area cell may be re-set as the secondary cell. The small cell, the phantom cell, or the local area cell may be re-set as the serving cell. Furthermore, the small cell, the phantom cell, or the local area cell may be included in the serving cell.

The base station device 1 that can constitute the small cell may perform discrete reception (DRX) or discrete transmission (DTX) whenever necessary. Furthermore, the base station device 1 that can constitute the small cell may intermittently perform powering-on or powering-off.

In some cases, an independent identifier (identity (ID)) is set for the base station device 1 that constitutes the macro cell and the base station device 1 that constitutes the small cell. To be more precise, in some cases, the identifiers of the macro cell and the small cell are set independently. For example, in a case where the cell-specific reference signals (CRSs) are transmitted from the macro cell and the small cell, respectively, although the transmission frequency band and the radio resources are the same, in some cases, the cell-specific reference signals are scrambled with different identifiers. The cell-specific reference signal to the macro cell may be scrambled with a physical layer cell ID (a physical layer cell identity (PCI)), and the cell-specific reference signal to the small cell may be scramble with a virtual cell ID (a virtual cell identity (VCI)). The scrambling may be performed with the physical layer cell ID (the physical layer cell identity (PCI)) in the macro cell, and may be performed with a global cell ID (a global cell identity (GCI)) in the small cell. The scrambling may be performed with a first physical layer cell ID in the macro cell, and may be performed with a second physical layer cell ID in the small cell. The scrambling may be performed with a first virtual cell ID in the macro cell, and may be performed with a second virtual cell ID in the small cell.

Furthermore, one portion of the physical channel or of the physical signal may be transmitted in the small cell, the serving cell that is set as the small cell, or the component carrier that corresponds to the small cell. For example, the cell-specific reference signal (CRS) or the physical downlink control channel (PDCCH) may not be transmitted. Furthermore, a new physical channel/physical signal may be transmitted in the small cell, the serving cell that is set as the small cell, or the component carrier that corresponds to the small cell.

According to the basic mode of the first embodiment, the base station device 1 transmits information that instructs the terminal device 2 as to multiple subframe sets, to the terminal device 2. In a case where an aperiodic SRS is transmitted on an uplink subframe that belongs to a first subframe set, the terminal device 2, in which the first subframe set and a second subframe set are configured based on information that indicates multiple subframe sets, sets transmission power for transmission of the aperiodic SRS, based on a parameter (nominal power $P_{O\_PUSCH}$ (a sum of $P_{O\_NOMINAL\_PUSCH}$ and $P_{O\_UE\_PUSCH}$) for the terminal device 2, a pathloss compensation coefficient α, a power control adjustment value f(i) that is obtained by a TPC command, or the like) relating to power control for the transmission on the PUSCH in the uplink subframe that belongs to the first subframe set. In a case where the aperiodic SRS is transmitted on the uplink subframe that belongs to the second subframe set, the terminal device 2 sets the transmission power for the transmission of the aperiodic SRS, based on a parameter (the nominal power $P_{O\_PUSCH}$ (the sum of $P_{O\_NOMINAL\_PUSCH}$ and $P_{O\_UE\_PUSCH}$) for the terminal device 2, the pathloss compensation coefficient α, the power control adjustment value f(i) that is obtained by the TPC command, or the like) relating to the power control for the transmission on the PUSCH in the uplink subframe that belongs to the second subframe set, and sets the transmission power for the periodic SRS, based on the parameter relating to the power control for the transmission on the PUSCH in the first subframe set, without depending on whether the subframe on which the periodic SRS is transmitted belongs to the first subframe set or the second subframe set. That is, based on the information that indicates the multiple subframe sets, the base station device 1 may set at least two subframe sets (the multiple subframe sets) for the terminal device 2. Moreover, the parameter relating to the power control may be set independently for every serving cell c. Furthermore, the parameter relating to the power control may be set independently for every subframe set. Furthermore, the parameter relating to the power control may be set dedicatedly for the terminal device 2.

A value (or an index) that is set for a TPC command field and a correction value (or an absolute value) are managed using a table, and are in advance associated with each other. Furthermore, a power control adjustment value that is obtained by the TPC command is determined based on a correction value that is associated with a value of the TPC command field. An initial power control adjustment value may be 0. In a case where a UE-specific power control parameter ($P_{O\_UE\_PUSCH}$) is changed or is re-set, the initial power control adjustment value may be 0. In a case where a random access response message to a serving cell c is received, the initial power control adjustment value may be determined based on a parameter (a power value of the random access preamble that is initially transmitted, the total number of times that power ramp-up occurs, or a power value that is added for every power ramp-up) relating to transmit power control for random access and on a correction value that corresponds to a value that is set to be in the TPC command field that is indicated with the random access response.

The power control adjustment values that are obtained by the TPC command are of two types. One is obtained by accumulating the correction value that corresponds to the value that is set to be in the TPC command field, in a case where accumulation (summation or cumulation) is enabled. The other is given by the absolute value that corresponds to the value that is set to be in the TPC command field, in a case where the accumulation is not enabled.

In a case where the aperiodic SRS of which the transmission is requested by the sounding reference signal request (the SRS request) that is included in the downlink control information format is transmitted on the uplink subframe which is included in a certain subframe set, the terminal device 2, in which the multiple subframe sets are set, sets the transmission power for the aperiodic SRS, based on a set of parameters (the nominal power $P_{O\_PUSCH}$ (the sum of $P_{O\_NOMINAL\_PUSCH}$ and $P_{O\_UE\_PUSCH}$) for the terminal device 2, the pathloss compensation coefficient α, the power control adjustment value f(i) that is obtained by the TPC command, or the like) for the physical uplink shared channel that is transmitted on the uplink subframe which belongs to a certain subframe set, and sets transmission power for the periodic reference signal, based on a set of parameters (the nominal power $P_{O\_PUSCH}$ (the sum of $P_{O\_NOMINAL\_PUSCH}$ and $P_{O\_UE\_PUSCH}$) for the terminal device 2, the pathloss compensation coefficient α, the power control adjustment value f(i) that is obtained by the TPC command, or the like) relating to the power control for the physical uplink shared channel that is transmitted on a specific subframe set, without depending on whether in which of the multiple subframe sets the uplink subframe on which the periodic SRS that is transmitted based on the parameter which is set by the higher layer is transmitted is included. At this time, a power offset $P_{SRS\_OFFSET,\ c}$ (pSRS-OffsetAp) between the PUSCH and the aperiodic SRS may be common without depending on the subframe set.

In a case where multiple settings of the parameter relating to the power control for the PUSCH are not performed, although the multiple subframe sets are configured, the terminal device 2 may not perform the processing as described above. To be more precise, the terminal device 2 sets the transmission power based on a parameter relating to common power control, without depending on which subframe set the PUSCH, the periodic SRS, and the aperiodic SRS is transmitted on.

Moreover, among parameters relating to the power control for the PUSCH, some of the parameters may be notified on the higher layer signaling (the RRC signaling, L3 signaling). Furthermore, among the parameters relating to the power control for the PUSCH, some of the parameters may be notified on L1 signaling (the DCI format, the control signal, the PDCCH or the EPDCCH). Furthermore, among the parameters relating to the power control for the PUSCH, some of the parameters may be notified with the system information.

Furthermore, for the terminal device 2, multiple parameters that are set as the shared parameters relating to the power control for the PUSCH are set, and a value is set for each of the shared parameters. Furthermore, for the terminal device 2, in a case where a value is not set for a dedicated parameter relating to the power control for the PUSCH, a default may be used with regard to a parameter of which a default (a default value or a default configuration) is defined in advance. In a case where multiple shared parameters are notified from the base station device 1 to the terminal device 2 and the dedicated parameter is not notified, a default that is defined in advance may be used as the dedicated parameter.

Furthermore, the parameter relating to the power control relating to the transmission on the PUSCH in the first subframe set may be notified with the system information, and the parameter relating to the power control for the PUSCH that corresponds to the second subframe set may be notified with the higher layer signaling (for example, the dedicated signaling). Furthermore, in a case where the parameter relating to the power control for the transmission on the PUSCH in the first subframe set and the second subframe set is not notified, with regard to the parameter of which the default is defined in advance, the terminal device 2 sets the transmission power for the PUSCH or the SRS using a default value of the parameter. To be more precise, in a case where the parameter relating to the power control corresponding to the subframe set is not notified from the base station device 1, for the terminal device 2 in which the multiple subframe sets are set, the transmission power for the physical uplink channel that is transmitted on each subframe set is configured based on the default of each parameter.

Furthermore, in the communication system that performs communication using the primary cell and the secondary cell, for the primary cell, the parameter relating to the power control for the transmission on the PUSCH in the first subframe set may be notified with on the system information, and the parameter relating to the power control for the transmission on the PUSCH in the second subframe set may be notified with the higher layer signaling (for example, the dedicated signaling or the RRC signaling). For the secondary cell, each parameter relating to the power control for the transmission on the PUSCH in the first subframe set and the second subframe set may be notified with the higher layer signaling (for example, the dedicated signaling or the RRC signaling). Moreover, also in the communication system that performs the communication using multiple serving cells, the same processing may be performed.

Furthermore, according to the basic mode of the first embodiment, the terminal device 2 may switch a method of setting the transmission power for the periodic SRS and the aperiodic SRS, depending on whether or not the multiple subframe sets are configured. To be more precise, in a case where the multiple subframe sets (a subframe type or a subframe subset) are not configured (set or defined), the terminal device 2 sets the transmission power for the periodic SRS and the transmission power for the aperiodic SRS based on the parameter that is used for the power control for the transmission on the PUSCH.

Furthermore, in a case where the multiple subframe sets are configured, the terminal device 2 sets the transmission power for the periodic SRS based on the parameter that is used for the power control for the PUSCH that is transmitted on the uplink subframe which belongs to any subframe set (for example, the first subframe set, the second subframe set, a predetermined subframe set, or a specific subframe set) among the multiple subframe sets.

That is, any subframe set may be the first subframe set or the second subframe set. Furthermore, the predetermined subframe set may be the first subframe set or the second subframe set. Furthermore, the specific subframe set may be the first subframe set or the second subframe set.

Furthermore, in the case where the multiple subframe sets are configured, the terminal device 2 sets the transmission power of the aperiodic SRS based on the parameter that is used for the power control for the PUSCH which is transmitted each of the multiple subframe sets. For example, in a case where the aperiodic SRS is transmitted on the uplink subframe that belongs to the first subframe set, the terminal device 2 sets the transmission power for the aperiodic SRS based on the parameter that is used for the power control for the PUSCH which is transmitted on the first subframe set. Furthermore, in a case where the aperiodic SRS is transmitted on the uplink subframe that belongs to the second subframe set, the terminal device 2 sets the transmission power for the aperiodic SRS based on the parameter that is used for the power control for the PUSCH which is transmitted on the second subframe set. Furthermore, the same processing is also performed for the third subframe set and later. Moreover, in a case where the power offset between the PUSCH and the SRS is set for every subframe set, the transmission power for the SRS that is transmitted on the uplink subframe which belongs to the subframe set is configured using the power offset that corresponds to the subframe set to which the uplink subframe on which the SRS is transmitted belongs.

FIG. 1 is a schematic block diagram illustrating a configuration of the base station device 1 according to the present invention. As illustrated, the base station device 1 is configured to include a higher layer processing unit 101, a control unit 103, a reception unit 105, a transmission unit 107, a channel measurement unit 109, and a transmit and receive antenna 111. Furthermore, the reception unit 105 is configured to include a decoding unit 1051, a demodulation unit 1053, a demultiplexing unit 1055, and a radio reception unit 1057. Furthermore, reception processing by the base station device 1 is performed in the higher layer processing unit 101, the control unit 103, the reception unit 105, and the transmit and receive antenna 111. Furthermore, the transmission unit 107 is configured to include a coding unit 1071, a modulation unit 1073, a multiplexing unit 1075, a radio transmission unit 1077, and a downlink reference signal generation unit 1079. Furthermore, transmission processing by the base station device 1 is performed in the higher layer processing unit 101, the control unit 103, the transmission unit 107, and the transmit and receive antenna 111.

The higher layer processing unit 101 performs processing of a medium access control (MAC) layer, a packet data convergence protocol (PDCP) layer, a radio link control (RLC) layer, and a radio resource control (RRC) layer.

The higher layer processing unit 101 generates information that is arranged in each channel for downlink, or acquires such information from a higher node, and outputs the generated or acquired information to the transmission unit 107. Furthermore, the higher layer processing unit 101 allocates the radio resource to which the terminal device 2 allocates the physical uplink shared channel (PUSCH) that is uplink data information, from uplink radio resources. Furthermore, the higher layer processing unit 101 allocates the radio resource to which the physical downlink shared channel (PDSCH) that is downlink data information is allocated, from downlink radio resources. The higher layer processing unit 101 generates downlink control information indicating the allocation of the radio resource, and transmits the generated downlink control information to the terminal device 2 through the transmission unit 107. When the radio resource to which the PUSCH is allocated is allocated, the higher layer processing unit 101 preferentially allocates the radio resource that has good channel quality, based on a result of uplink channel measurement that is input from the channel measurement unit 109. To be more precise, the higher layer processing unit 101 sets configurations of various downlink signals and configurations of various downlink signals for a certain terminal device or a certain cell. Furthermore, the higher layer processing unit 101 may set the configurations of the various downlink signals and the configurations of the various uplink signals for every cell. Furthermore, the higher layer processing unit 101 may set the configurations of the various downlink signals and the configurations of the various uplink signals for every terminal device 2. Furthermore, the higher layer processing unit 101 may set first to n-th configurations (n is a natural number), for a certain terminal device 2 or a certain cell, to be more precise, in a UE-specific and/or cell-specific manner, and may transmit the first configuration to n-th configuration that are set, to the terminal device 2 through the transmission unit 107. For example, the configuration of the downlink signal and/or the uplink signal may include a parameter relating to the resource allocation. Furthermore, the configuration of the downlink signal and/or the uplink signal may include a parameter that is used for sequence calculation. Moreover, in some cases, the radio resource described above is referred to as a time frequency resource, a subcarrier, a resource element (RE), a resource element group (REG), a control channel element (CCE), a resource block (RB), a resource block group (RBG), or the like.

Information relating to these configurations and/or the control may be defined as an information element. Furthermore, the information relating to the configurations and the control may be defined as an RRC message. Furthermore, the information relating to the configuration and/or the control may be transmitted to the terminal device 2, with the system information. Furthermore, the information relating to the configuration and/or the control may be transmitted to the terminal device 2, with the dedicated signaling (individual signaling).

Furthermore, the higher layer processing unit 101 sets at least one TDD UL/DL configuration (TDD config, tdd-Config, or uplink-downlink configuration(s)) for a system information block type 1. The TDD UL/DL configuration may be defined as illustrated in FIG. 3. FIG. 3 illustrates a configuration example of a downlink subframe, a special subframe, and an uplink subframe in which 10 subframes are used. For the TDD UL/DL configuration, multiple parameters are prepared, and one TDD UL/DL configuration is associated with one index. The base station device 1 may instruct the terminal device 2 to perform the communication using the TDD UL/DL configuration that is associated with the index, by notifying the terminal device 2 of the index. Moreover, as a downlink reference, a second TDD UL/DL configuration may be set. Furthermore, multiple types of system information blocks may be prepared. For example, the system information block type 1 includes an information element relating to the TDD UL/DL configuration. Furthermore, the system information block type 2 includes an information element relating to the radio resource control. Moreover, a parameter relating to a certain information element may be included, as an information element, in the certain information element. For example, a so-called parameter in the physical layer may be defined as an information element in the higher layer. Furthermore, one portion of the information element may be referred to as a parameter. Furthermore, multiple types of parameters may be collectively (in a lump or list) or referred to as an information element.

Moreover, according to the present invention, an identity, an identifier, and an identification are referred to as an ID. As an ID (UE ID) that is set in a UE-specific manner, there are a cell radio network temporary identifier (C-RNTI), a semi-persistent scheduling C-RNTI (SPS C-RNTI), a temporary C-RNTI, a TPC-PUSCH RNTI, a TPC-PUCCH RNTI, and a random value for contention resolution. These IDs are used on a cell basis. The IDs are set by the higher layer processing unit 101. Furthermore, the higher layer processing unit 101 sets various identifiers for the terminal devices 2, and notifies the terminal device 2 of the various identifiers through the transmission unit 107. For example, the RNTI is set and notified to the terminal device 2. Furthermore, a physical cell ID, a virtual cell ID, or an ID that is equivalent to the virtual cell ID is set and is notified. For example, as the ID that is equivalent to the virtual cell ID, there are IDs (a PUSCH ID or a PUCCH ID, a scrambling initiation ID, a reference signal ID (RS ID), and the like) that can be set in a physical channel-specific manner. The physical cell ID or the virtual cell ID is used for sequence generation of the physical channel or of physical signal.

The higher layer processing unit 101 generates control information for controlling the reception unit 105 and the transmission unit 107, based on uplink control information (UCI) that is notified on the physical uplink control channel (PUCCH) from the terminal device 2, and on a buffer condition that is notified from the terminal device 2 or various pieces of configuration information (an RRC message, system information, a parameter, and an information element) of each of the terminal devices 2 that are set by the higher layer processing unit 101, and outputs the generated control information to the control unit 103. Moreover, the UCI includes at least one among the ACK/NACK, the scheduling request (SR), and the channel state information (CSI). Moreover, the CSI includes the CQI, the PMI, and the RI.

The higher layer processing unit 101 sets the transmission power for the uplink signal (the PRACH, the PUCCH, the PUSCH, the UL DMRS, the P-SRS, or the A-SRS) and the parameter relating to the transmission power. Furthermore, the higher layer processing unit 101 transmits the transmission power for the downlink signal (the CRS, the DL DMRS, the CSI-RS, the PDSCH, the PDCCH/EPDCCH, or the like) and the parameter relating to the transmission power to the terminal device 2 through the transmission unit 107. To be more precise, the higher layer processing unit 101 transmits the information relating to the uplink power control and the information relating to the downlink power control to the terminal device 2 through the transmission unit 107. In other words, the higher layer processing unit 101 performs the setting of parameters relating to power control for the base station device 1 and the terminal device 2. For example, the higher layer processing unit 101 notifies the terminal device 2 of a parameter (the parameter relating to the power control for the downlink) relating to the transmission power for the base station device 1. Furthermore, the higher layer processing unit 101 notifies the terminal device 2 of a parameter relating to maximum transmission power for the terminal device 2. Furthermore, the higher layer processing unit 101 notifies the terminal device 2 of information relating to power control for various physical channels. Furthermore, the higher layer processing unit 101 sets the transmission power for the terminal device 2, in such a manner that the PUSCH and the like satisfy predetermined channel quality according to information indicating an amount of interference from an adjacent base station device, information indicating an amount of interference, which is notified from the adjacent base station device and which is given to the base station device 1, channel quality that is input from the channel measurement unit 109, or the like, or considering interference to the adjacent base station device 1. Furthermore, the higher layer processing unit 101 transmits information indicating these configurations to the terminal device 2 through the transmission unit 107.

Specifically, the higher layer processing unit 101 transmits nominal power ($P_{O\_NOMINAL\_PUSCH}$ (p0-Nominal-PUSCH) or $P_{O\_NOMINAL\_PUCCH}$ (p0-NominalPUCCH)) for each of the PUSCH and the PUCCH, a pathloss compensation coefficient (attenuation coefficient) $\alpha_c$ (alpha), a power offset (deltaPreambleMsg3) for message 3, a power offset (deltaFList-PUCCH) that is stipulated for every PUCCH format), and the like, as information (a shared parameter relating to the uplink power control) that is shared among the terminal devices 2 or a parameter common to the terminal devices 2, with the system information. At this time, a power offset (deltaF-PUCCH-Format3) in a PUCCH format 3 and a power offset (deltaF-PUCCH-Format1bCS) in a delta PUCCH format 1bCS may be notified additionally. Furthermore, these parameters may be notified with the RRC message (the higher layer signaling or the dedicated signaling).

Furthermore, the higher layer processing unit 101 notifies UE-specific PUSCH power $P_{O\_UE\_PUSCH}$ (p0-UE-PUSCH), delta MCS enabled Ks (deltaMCS-Enabled), accumulation enabled (accumulationEnabled), UE-specific PUCCH power (p0-UE-PUCCH), a P-SRS power offset (pSRS-Offset), and a filter coefficient (filterCoefficient), as a parameter (a dedicated parameter relating to the uplink power control) that can be set for every terminal device 2, with the RRC message. At this time, a power offset (deltaTxD- OffsetListPUCCH) for transmit diversity in each PUCCH format and an A-SRS power offset (pSRS-OffsetAp) may be notified. The delta MCS enabled is a parameter (information) that indicates whether or not delta MCS is enabled. In a case where the delta MCS is enabled, the processing is performed with Ks=1.25. In a case where the delta MCS is not enabled, the processing is performed with Ks=0. The accumulation enabled is a parameter (information) that indicates whether or not accumulation (summation or cumulation) by the TPC command is enabled. In a case where the accumulation is enabled, the terminal device 2 sets the transmission power based on the power control adjustment value that is obtained by accumulation (summation processing) of a correction value that corresponds to a value which is set for the TPC command field. Furthermore, in a case where the accumulation is not enabled, the terminal device 2 sets the transmission power based on the power control adjustment value that is given by an absolute value that corresponds to a value that is set for one TPC command field.

Moreover, $\alpha_c$ that is mentioned here is used for setting a path loss value and the transmission power. Furthermore, $\alpha_c$ is a coefficient indicating the extent to which a path loss is compensated for, in other words, a coefficient (an attenuation coefficient or a pathloss compensation coefficient) that determines to what extent the transmission power is increased or decreased according to the path loss (to be more precise, to what extent the transmission power is adjusted). Normally, $\alpha_c$ is a value from 0 to 1. If $\alpha_c$ is 0, the adjustment of the power in accordance with the path loss is not made. If $\alpha_c$ is 1, the transmission power for the terminal device 2 is adjusted in such a manner that the path loss does not have an effect on the base station device 1. These pieces of information may be transmitted as re-configuration information to the terminal device 2.

Furthermore, the higher layer processing unit 101 may notify a parameter (a power offset (messagePowerOffsetGroupB) for a group B, a power ramping step (powerRampingStep), or initial reception target power (preambleInitialReceivedTargetPower) for a preamble) relating to power control for the random access channel.

Furthermore, the higher layer processing unit 101 may notify a power ratio (p-c) between the PDSCH and non-zero power CSI-RS, reference signal power (referenceSignalPower) for the base station device 1 (or the CRS that is transmitted from the base station device 1), $P_A$(p-a) that is used for calculation of a power ratio between the PDSCH and the CRS in a subframe in which the CRS is not present, an index $P_B$(p-b) that indicates a ratio between a power ratio between the PDSCH and the CRS in the subframe in which the CRS is not present and a power ratio between the PDSCH and the CRS in a subframe in which the CRS is present, and a power shift $\Delta_{offset}$(nomPDSCH-RS-EPRE-Offset) of the power ratio between the PDSCH and the CRS, as the parameter relating to the power control for the downlink.

Furthermore, the higher layer processing unit 101 may notify a parameter (P-Max) for limiting maximum transmission power for the terminal device 2 in a carrier frequency (a cell or a component carrier), with the system information (for example, the SIB 1). Some of these parameters may be notified with the higher layer signaling. Setting of these parameters relating to the power control may be performed for every serving cell. The setting of the parameters relating to the power control may be performed for every subframe set. The reference signal power for the base station device 1 may be referred to as the transmission power for the base station device 1.

Furthermore, the higher layer processing unit 101 may set the transmission power for the downlink signal and/or for the uplink signal, or the parameter relating to the transmission power for every terminal device 2. Furthermore, the higher layer processing unit 101 may set the transmission power for a common downlink and/or uplink signal, or the parameter relating to the transmission power between the terminal devices 2. Pieces of information relating to these parameters may be transmitted, as information relating to the uplink power control and/or information relating to the downlink power control, to the terminal device 2.

The higher layer processing unit 101 performs setting of various IDs relating to various physical channels or physical signals, and outputs information relating to the setting of the ID to the reception unit 105 and the transmission unit 107 through the control unit 103. For example, the higher layer processing unit 101 sets a value of the RNTI (UE ID) at which the CRC that is attached to the downlink control information format is scrambled. Furthermore, the higher layer processing unit 101 may set values of various identifiers, such as a cell radio network temporary identifier (C-RNTI), a temporary C-RNTI, a paging-RNTI (P-RNTI), a random access-RNTI (RA-RNTI), and a semi-persistent scheduling C-RNTI (SPS C-RNTI). Furthermore, the higher layer processing unit 101 sets a value of an ID such as a physical cell ID, a virtual cell ID, or a scramble initialization ID. These pieces of configuration information are output to each processing unit through the control unit 103. Furthermore, the pieces of configuration information may be transmitted, as an RRC message, system information, UE-specific dedicated information, and an information element, to the terminal device 2. Furthermore, some of the RNTIs may be transmitted using a MAC control element (CE).

The MAC CE is transmitted through the PDSCH. The MAC CE is information or a signal that is processed in a MAC layer.

The control unit 103 generates a control signal for performing the control of the reception unit 105 and of the transmission unit 107, based on control information from the higher layer processing unit 101. The control unit 103 outputs the generated control signal to the reception unit 105 and the transmission unit 107, and performs the control of the reception unit 105 and of the transmission unit 107.

In accordance with a control signal that is input from the control unit 103, the reception unit 105 outputs information, which results from demultiplexing, demodulating, and decoding a reception signal that is received from the terminal device 2 through the transmit and receive antenna 111, to the higher layer processing unit 101. The radio reception unit 1057 converts (down-converts) an uplink signal received through the transmit and receive antenna 111 into an intermediate frequency (IF), removes an unnecessary frequency component, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio reception unit 1057 removes a portion corresponding to a guard interval (GI) from the digital signal that results from the conversion. The radio reception unit 1057 performs Fast Fourier Transform (FFT) on the signal from which the guide interval is removed, and outputs the resulting signal to the demultiplexing unit 1055 that extracts the signal in the frequency region.

The demultiplexing unit 1055 demultiplexes the signal that is input from the radio reception unit 1057 into the signal such as the PUCCH, the PUSCH, the UL DMRS, and the SRS. Moreover, the demultiplexing is performed based on radio resource allocation information, which is determined in advance by the base station device 1 and is notified to each terminal device 2. Furthermore, the demultiplexing unit 1055 makes an adjustment of channels, that is, the PUCCH and the PUSCH, from a channel estimate that is input from the channel measurement unit 109. Furthermore, the demultiplexing unit 1055 outputs the UL DMRS and the SRS, which results from the demultiplexing, to the channel measurement unit 109.

The demodulation unit 1053 performs Inverse Discrete Fourier Transform (IDFT) on the PUSCH, acquires a modulation symbol, and performs demodulation of the received signal on each of the modulation symbols in the PUCCH and the PUSCH, using a modulation scheme that is prescribed in advance or that is notified by the base station device 1 to each of the terminal devices 2 with the downlink control information, such as Binary Phase Shift Keying (BPSK), Quadrature Phase Shift Keying (QPSK), 16 Quadrature Amplitude Modulation (16 QAM), or 64 quadrature amplitude modulation (64 QAM).

The decoding unit 1051 performs decoding on the demodulated coded bits in the PUCCH and the PUSCH at a coding rate in compliance with a coding scheme that is prescribed in advance, or at a coding rate that is prescribed in advance or is notified in advance by the base station device 1 to the terminal device 2 with the uplink grant (UL grant), and outputs the decoded data information and the uplink control information to the higher layer processing unit 101.

The channel measurement unit 109 measures the channel estimate, the channel quality, and the like from the UL DMRS and the SRS, which are uplink demodulation reference signals that are input from the demultiplexing unit 1055, and outputs a result of the measurement to the demultiplexing unit 1055 and the higher layer processing unit 101. Furthermore, the channel measurement unit 109 measures received power and/or reception quality of first to n-th signals, and outputs a result of the measurement to the demultiplexing unit 1055 and the higher layer processing unit 101.

The transmission unit 107 generates a reference signal for downlink (downlink reference signal) in accordance with the control signal that is input from the control unit 103, codes and modulates the data information and the downlink control information that are input from the higher layer processing unit 101, and multiplexes the PDCCH (EPDCCH), the PDSCH, and the downlink reference signal, and transmits a downlink signal to the terminal device 2 through the transmit and receive antenna 111.

The coding unit 1071 performs coding, such as turbo coding, convolutional coding, and block coding, on the downlink control information that is input from the higher layer processing unit 101, and the data information. The modulation unit 1073 performs modulation on the coded bits with the modulation schemes such as the QPSK, the 16 QAM, and the 64 QAM. The downlink reference signal generation unit 1079 performs generation as the downlink reference signal with a sequence that is obtained according to a rule that is prescribed in advance based on a cell identifier (a cell ID, a cell identity, or a cell identification) and the like for identifying the base station device 1 and that is already known to the terminal device 2. The multiplexing unit 1075 multiplexes each modulated channel and the generated downlink reference signal.

The radio transmission unit 1077 performs Inverse Fast Fourier Transform (IFFT) on a modulation symbol that results from the multiplexing, performs the modulation in compliance with an OFDM scheme, adds the guard interval to the OFDM-modulated OFDM symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a signal in a high frequency, removes unnecessary frequency components, and performs power amplification, and outputs a final result to the transmit and receive antenna 111 for transmission.

Figure 2:
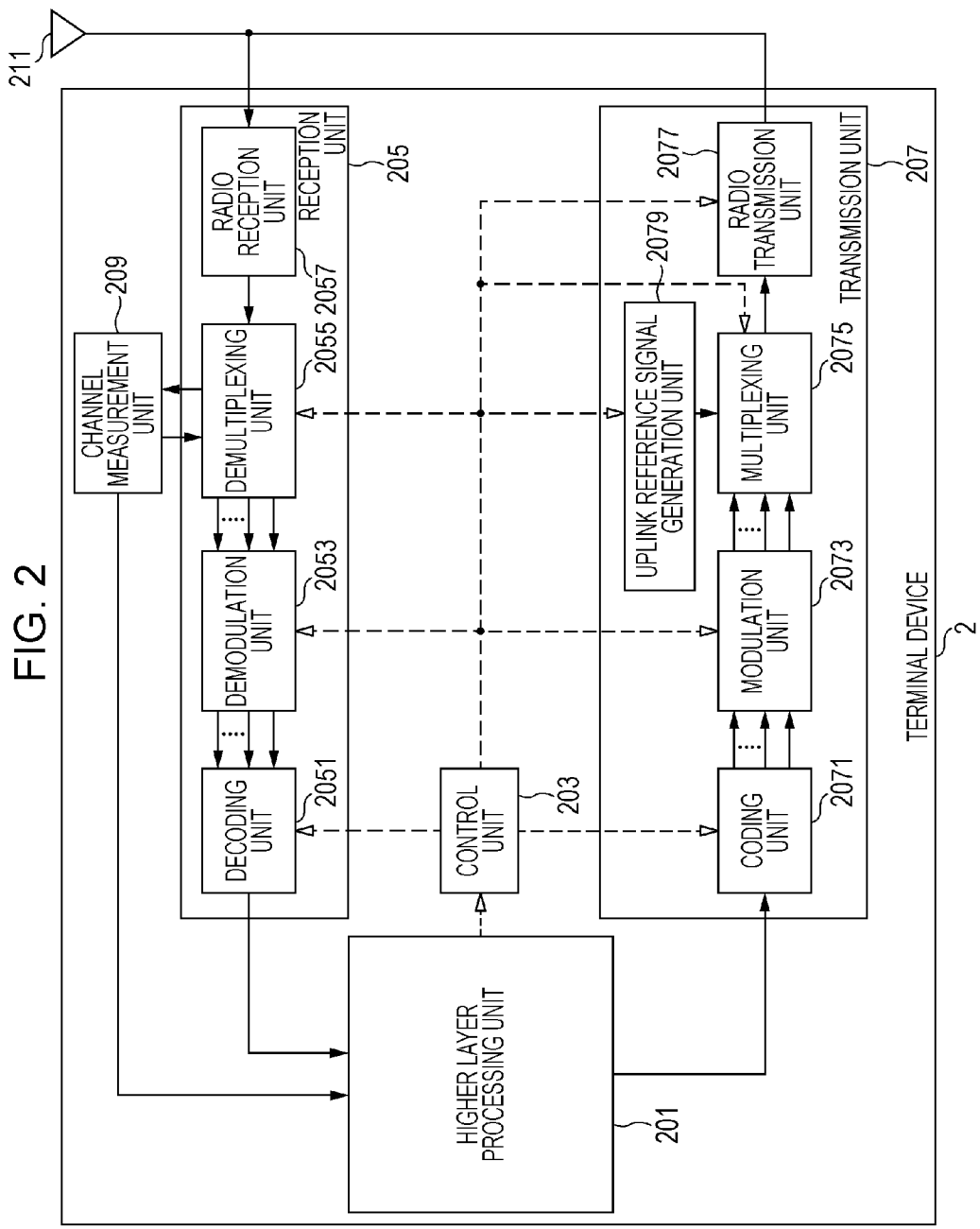
FIG. 2 is a schematic block diagram illustrating a configuration of a terminal device 2 according to the first embodiment of the present invention.

FIG. 2 is a schematic block diagram illustrating a configuration of the terminal device 2 according to the present embodiment. As illustrated, the terminal device 2 is configured to include a higher layer processing unit 201, a control unit 203, a reception unit 205, a transmission unit 207, a channel measurement unit 209, and a transmit and receive antenna 211. Furthermore, the reception unit 205 is configured to include a decoding unit 2051, a demodulation unit 2053, a demultiplexing unit 2055, and a radio reception unit 2057. The reception processing by the terminal device 2 is performed in the higher layer processing unit 201, the control unit 203, the reception unit 205 and the transmit and receive antenna 211. Furthermore, the transmission unit 207 is configured to include a coding unit 2071, a modulation unit 2073, a multiplexing unit 2075, and a radio transmission unit 2077. Furthermore, the transmission processing by the terminal device 2 is performed in the higher layer processing unit 201, the control unit 203, the transmission unit 207, and the transmit and receive antenna 211.

The higher layer processing unit 201 outputs to a transmission unit the uplink data information that is generated by a user operation and the like. Furthermore, the higher layer processing unit 201 performs the processing of the medium access control (MAC) layer, the packet data convergence protocol (PDCP) layer, the radio link control (RLC) layer, and the radio resource control (RRC) layer.

The higher layer processing unit 201 manages various pieces of configuration information of the terminal device 2 itself. Furthermore, the higher layer processing unit 201 generates information that is arranged in each uplink channel and outputs the generated information to the transmission unit 207. The higher layer processing unit 201 generates the control information for performing the control of the reception unit 205 and of the transmission unit 207, based on various pieces of configuration information of the terminal device 2 itself, which is managed by the higher layer processing unit 201 for which the downlink control information that is notified from the base station device 1 on the PDCCH and radio resource control information that is notified on the PDSCH are set, and outputs the generated control information to the control unit 203. Furthermore, the higher layer processing unit 201 sets various parameters (an information element and an RRC message) of each signal, based on pieces of information relating to the first to n-th configurations, which are notified from the base station device 1. Furthermore, these pieces of information that are set are generated and are output to the transmission unit 207 through the control unit 203.

The higher layer processing unit 201 acquires from the reception unit 205 information indicating a sounding subframe (an SRS subframe or an SRS transmission subframe) that is a subframe for which to reserve a radio resource for transmitting the SRS that is broadcast by the base station device 1, and a bandwidth of the radio resource that is reserved to transmit the SRS within the sounding subframe, information indicating a subframe on which to transmit a periodic SRS that is notified by the base station device 1 to the terminal device 2, a frequency band, and an amount of cyclic shift that is used in a CAZAC sequence for the periodic SRS, and information indicating the frequency band in which to transmit an aperiodic SRS that is notified by the base station device 1 to the terminal device 2, and the amount of cyclic shift that is used in a CAZAC sequence for the aperiodic SRS.

The higher layer processing unit 201 outputs indication information to the transmission unit 207 through the control unit 203 in such a manner that generation of the uplink reference signal and so forth are performed based on information relating to a configuration of the uplink reference signal, which is notified from the base station device 1. To be more precise, a reference signal control unit 2013 outputs the information relating to the configuration of the uplink reference signal to an uplink reference signal generation unit 2079 through the control unit 203.

Based on the control information from the higher layer processing unit 201, the control unit 203 generates the control signal for performing the control of the reception unit 205 and of the transmission unit 207. The control unit 203 outputs the generated control signal to the reception unit 205 and the transmission unit 207, and performs the control of the reception unit 205 and of the transmission unit 207.

In accordance with the control signal (the control information) that is input from the control unit 203, the transmission unit 207 generates the uplink demodulation reference signal (UL DMRS) and/or the sounding reference signal (SRS), codes and modulates the data information that is input from the higher layer processing unit 201, multiplexes the PUCCH, the PUSCH, and the generated UL DMRS and/or the SRS, adjusts the transmission power for the PUCCH, the PUSCH, the UL DMRS, and the SRS, and transmits a result of the multiplexing to the base station device 1 through the transmit and receive antenna 211. Furthermore, in a case where information relating to a result of the measurement is output from the higher layer processing unit 201, the transmission unit 207 transmits the information that is output, to the base station device 1 through the transmit and receive antenna 211. Furthermore, in a case where channel state information that is a result relating to channel estimation is output from the higher layer processing unit 201, the transmission unit 207 feeds the channel state information back to the base station device 1. To be more precise, the higher layer processing unit 201 generates the channel state information (CSI, CQI, PMI, or RI) based on the result of the measurement, which is notified from the channel measurement unit 209, and feeds the generated channel state information back to the base station device 1 through the control unit 203. When a predetermined grant (or a predetermined downlink control information format) is detected in the reception unit 205, the transmission unit 207 transmits the uplink signal that corresponds to the predetermined grant, on the first uplink subframe after a predetermined subframe from a subframe from which the grant is detected. For example, in the reception unit 205, when the grant is detected in a subframe i, the transmission unit 207 transmits the uplink signal, on the first uplink subframe after a subframe i+k. At this point, k may be a predetermined value. Furthermore, k may be managed using a table.

Furthermore, when the SRS request that is included in the grant is detected in the subframe i in the reception unit 205, the transmission unit 207 transmits the A-SRS on the initial SRS subframe (a transmission subframe that is set for the A-SRS) after the subframe i+k (k is a predetermined value). At this point, in a case where, as the initial SRS subframe after the subframe i+k, the uplink subframe is designated using third configuration, the A-SRS may be transmitted. Furthermore, information relating to the SRS subframe is notified by the higher layer. The SRS subframe is set with a subframe period and a subframe offset. The SRS subframe is set based on a cell-specific parameter and a UE-specific parameter.

In a case where the transmission on the PUSCH or the PUCCH is performed on the cell-specific SRS subframe, the transmission unit 207 allocates a resource to the PUSCH or the PUCCH in such a manner that a symbol that is allocated for the transmission on the PUSCH or the PUCCH does not overlap a symbol that is allocated to the SRS.

Furthermore, a transmission subframe for the uplink signal is the subframe i, the transmission unit 207 sets the transmission power for the uplink signal using the transmit power control command that is received on a subframe i−k. At this point, k may be a predetermined value. Furthermore, k may be managed using a table. Furthermore, k may be associated with the transmission subframe.

In a case where, in the reception unit 205, either of information relating to the first configuration and information relating to the second configuration is received and either of the first configuration and the second configuration is set, the transmission unit 207 sets the transmission power for the P-SRS and the A-SRS based on a parameter relating to the power control for the PUSCH. In a case where, in the reception unit 205, the information relating to the first configuration and the information relating to the second configuration are received, the first configuration and the second configuration are set, and multiple subframe sets are configured, the transmission unit 207 sets the transmission power for the P-SRS based on the power control parameter for the PUSCH that is transmitted on the first subframe set or the second subframe set. In a case where, in the reception unit 205, the information relating to the first configuration and the information relating to the second configuration are received, the first configuration and the second configuration are set, the multiple subframe sets are configured, and a subframe on which the A-SRS is transmitted belongs to the first subframe set, the transmission unit 207 sets the transmission power for the A-SRS based on the parameter relating to the power control for the PUSCH, which is transmitted on the first subframe set. In a case where, in the reception unit 205, the information relating to the first configuration and the information relating to the second configuration are received, the first configuration and the second configuration are set, the multiple subframe sets are configured, and the transmission is performed on the second subframe set, the transmission unit 207 sets the transmission power for the A-SRS based on the parameter relating to the power control for the PUSCH, which is transmitted on the second subframe set, and transmits the A-SRS.

Furthermore, the transmission unit 207 suitably sets maximum transmission power $P_{CMAX,c}$ (the configured UE transmit power or the configured maximum output power) for the terminal device 2 for a serving cell c according to a condition. The higher layer processing unit 201 sets the transmission power for the uplink signal based on the setting of the parameter relating to the power control. In a case where the transmission power for the uplink signal exceeds the maximum transmission power, the transmission unit 207 transmits the uplink signal with the maximum transmission power $P_{CMAX,\,c}$ for the terminal device 2. To be more precise, if a calculated transmission power and the maximum transmission power are compared with each other and the calculated transmission power is lower than the maximum transmission power, the transmission unit 207 transmits the uplink signal with the calculated transmission power. If the calculated transmission power is higher than the maximum transmission power, the transmission unit 207 transmits the uplink signal with the maximum transmission power.

Furthermore, in a case where, in a certain serving cell (for example, the serving cell c) and a certain subframe (for example, the subframe i), a sum of the transmission power for the uplink reference signal and the transmission power for the physical uplink shared channel exceeds total maximum output power $P_{CMAX}$ (UE total configured maximum output power) that is set for the terminal device 2, the transmission unit 207 transmits the physical uplink shared channel.

Furthermore, in a case where, in a certain serving cell and a certain subframe, the sum of the transmission power for the uplink reference signal and the transmission power for the physical uplink control channel exceeds total maximum output power $P_{CMAX}$ (UE total configured maximum output power) that is set for the terminal device 2, the transmission unit 207 transmits the physical uplink control channel.

Furthermore, in a case where the communication is performed in multiple serving cells at the same time, the transmission unit 207 controls the transmission power for the uplink signal that is transmitted in each serving cell, in such a manner that the total maximum output power $P_{CMAX}$ is not exceeded.

Furthermore, in a case where multiple physical channels are transmitted at the same timing (for example, a subframe or an SC-FDMA symbol), the transmission unit 207 can control the transmission power for the various physical channels or control the transmission of the various physical channels according to priority levels of various physical channels.

Furthermore, in a case where carrier aggregation that uses multiple component carriers which correspond to the multiple serving cells or each of the multiple serving cells is performed, the transmission unit 207 can control the transmission power for the various physical channel or can control the transmission of the various physical channels according to the priority levels of the various physical channels.

Furthermore, the transmission unit 207 may perform the transmission control of the various physical channels that are transmitted from a cell, according to a priority level of the cell.

Furthermore, the transmission unit 207 performs control of SRS transmission according to information that is input from the higher layer processing unit 201. Specifically, the higher layer processing unit 201 controls the transmission unit 207 in such a manner that the periodic SRS is transmitted one time or periodically in accordance with information relating to the periodic SRS described above. Furthermore, in a case where, in the SRS request (the SRS indicator) that is input from the reception unit 205, transmission of the aperiodic SRS is request, the transmission unit 207 transmits the aperiodic SRS only the number of times (for example, one time) that is prescribed in advance, in accordance with information relating to the aperiodic SRS.

Furthermore, the transmission unit 207 performs the control of the transmission power for the PRACH, the PUCCH, the PUSCH, the periodic SRS, and the aperiodic SRS, based on information (a parameter relating to transmit power control) relating to transmit power control for various uplink signals that are transmitted from the base station device 1. Specifically, the transmission unit 207 sets the transmission power for the various uplink signals based on various pieces of information relating to the uplink power control, which are acquired from the reception unit 205. For example, the transmission power for the SRS is controlled based on $P_{0\_PUSCH}$, $\alpha_c$, a power offset $P_{SRS\_OFFSET}(0)$ (a first power offset (pSRS-Offset)) for the periodic SRS, a power offset $P_{SRS\_OFFSET}(1)$ (a second power offset (pSRS-OffsetAp)) for the aperiodic SRS, and a TPC command for the PUSCH. To be more precise, the transmission power for the SRS is set based on a parameter that is used for the power control for the PUSCH. Moreover, the transmission unit 207 causes $P_{SRS\_OFFSET}$ to switch between the first power offset and the second power offset according to whether the SRS is the periodic SRS or the aperiodic SRS.

Furthermore, in a case where a third power offset is set for the periodic SRS and/or the aperiodic SRS, the transmission unit 207 sets the transmission power based on the third power offset.

Moreover, a value of the third power offset may be set in a wider range than the first power offset or the second power offset. The third power offset may be set for each of the periodic SRS and the aperiodic SRS. To be more precise, the information relating to the uplink power control is a parameter (an information element or an RRC message) relating to control of transmission power for various uplink physical channels. Some of these piece of information may be transmitted with the system information. Furthermore, some of the pieces of information may be transmitted with the higher layer signaling. Some of the pieces of information may be transmitted with the physical channel or the physical signal.

In accordance with the control signal that is input from the control unit 203, the reception unit 205 demultiplexes, demodulates, and decodes a reception signal that is received from the base station device 1 through the transmit and receive antenna 211, and outputs the resulting information to the higher layer processing unit 201.

The reception unit 205 performs suitable reception processing according to whether or not the information relating to the first configuration and/or the information relating to the second configuration are received. For example, in a case where either of the information relating to the first configuration and the information relating to the second control information is received, a first control information field is detected from the received downlink control information format. In a case where the information relating to the first configuration and the information relating to the second control information are received, a second control information field is detected from the received downlink control information format.

The radio reception unit 2057 converts (down-converts) a downlink signal received through each receive antenna into an intermediate frequency, removes an unnecessary frequency component, controls an amplification level in such a manner that a signal level is suitably maintained, performs orthogonal demodulation based on an in-phase component and an orthogonal component of the received signal, and converts the resulting orthogonally-demodulated analog signal into a digital signal. The radio reception unit 2057 removes a portion equivalent to the guard interval from the digital signal that results from the conversion, performs the Fast Fourier Transform on the signal from which the guard interval is removed, and extracts a signal in the frequency region.

The demultiplexing unit 2055 demultiplexes the extracted signal into the physical downlink control channel (PDCCH), the PDSCH, and the downlink reference signal (DRS). Moreover, the demultiplexing is performed based on the radio resource allocation information and the like that are notified with the downlink control information. Furthermore, the demultiplexing unit 2055 makes an adjustment of channels, that is, the PDCCH and the PDSCH, from a channel estimate that is input from the channel measurement unit 209. Furthermore, the demultiplexing unit 2055 outputs the downlink reference signal, which results from the demultiplexing, to the channel measurement unit 209.

The demodulation unit 2053 performs demodulation in compliance with a QPSK modulation scheme on the PDCCH and outputs a result of the demodulation to the decoding unit 2051. In a case where the decoding unit 2051 attempts to decode the PDCCH and succeeds in the decoding, the decoding unit 2051 outputs the downlink control information that results from the decoding, to the higher layer processing unit 201. The demodulation unit 2053 performs the demodulation, which is in compliance with the modulation scheme that is notified with the downlink control information, such as the QPSK, the 16 QAM, and the 64 QAM, on the PDSCH, and outputs a result of the demodulation to the decoding unit 2051. The decoding unit 2051 performs the decoding on a coding rate that is notified with the downlink control information, and outputs the data information that results from the decoding, to the higher layer processing unit 201.

The channel measurement unit 209 measures a downlink path loss from the downlink reference signal that is input from the demultiplexing unit 2055, and outputs the measured path loss to the higher layer processing unit 201. Furthermore, the channel measurement unit 209 calculates a downlink channel estimate from the downlink reference signal and outputs the calculated downlink channel estimate to the demultiplexing unit 2055. Furthermore, the channel measurement unit 209 performs received power measurement or reception quality measurement of the first signal and/or the second signal in accordance with various pieces of information relating to measurement, which is notified from the reference signal control unit 2013 through the control unit 203, or various pieces of information relating to a measurement report. A result of the measurement is output to the higher layer processing unit 201. Furthermore, in a case where the channel measurement unit 209 is instructed to perform the channel estimation of the first signal and/or the second signal, the channel measurement unit 209 may output a result of the channel estimation of each signal to the higher layer processing unit 201. At this point, the first signal or the second signal is a reference signal (a pilot signal, a pilot channel, or a reference signal), and a third signal or a fourth signal other than the first signal or the second signal may be provided. To be more precise, the channel measurement unit 209 measures channels for one or more signals. Furthermore, the channel measurement unit 209 measures a signal for performing the channel measurement in accordance with the control information that is notified from the higher layer processing unit 201 through the control unit 203.

The coding unit 2071 performs the coding, such as the turbo coding, the convolutional coding, and the block coding, on the uplink control information that is input from the higher layer processing unit 201 and on the data information. The modulation unit 2073 modulates the coded bits that are input from the coding unit 2071 with the modulation scheme such as the BPSK, the QPSK, the 16 QAM, or the 64 QAM.

The uplink reference signal generation unit 2079 generates the uplink reference signal based on the information on the configuration of the uplink reference signal. To be more precise, the uplink reference signal generation unit 2079 generates the CAZAC sequence that is obtained according to the rule which is prescribed in advance based on the cell identifier for identifying the base station device 1, the bandwidth in which the uplink demodulation reference signal, the first uplink reference signal, and the second uplink reference signal are mapped, and the like, and that is already known to the base station device 1. Furthermore, in accordance with the control signal that is input from the control unit 203, the uplink reference signal generation unit 2079 gives the cyclic shift to the CAZAC sequences for the uplink demodulation reference signal, the first uplink reference signal, and the second uplink reference signal that are generated.

The uplink reference signal generation unit 2079 may initialize reference sequences for the uplink demodulation reference signal, the sounding reference signal, and/or the uplink reference signal, based on a predetermined parameter. The predetermined parameters may be the same in each reference signal. Furthermore, the predetermined parameter may be a parameter that is set independently for each reference signal. To be more precise, if a parameter that is independently set is not present, the uplink reference signal generation unit 2079 can initialize a reference sequence for each reference signal with the same parameter.

In accordance with the control signal that is input from the control unit 203, the multiplexing unit 2075 re-maps PUSCH modulation symbols in parallel and then performs the Inverse Discrete Fourier Transform (IDFT) on the re-mapped PUSCH modulation symbols, and multiplexes PUCCH and PUSCH signals and the UL DMRS and the SRS that are generated.

The radio transmission unit 2077 performs the Inverse Fast Fourier Transform (IFFT) on a signal that results from the multiplexing, performs the modulation in compliance with an SC-FDMA scheme, adds the guard interval to the SC-FDMA-modulated SC-FDMA symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a signal in a high frequency (radio frequency), removes unnecessary frequency components, performs power amplification, and outputs a final result to the transmit and receive antenna 211 for transmission.

FIG. 4 is a flowchart illustrating a processing procedure performed by the terminal device 2 on the periodic SRS according to the basic mode of the first embodiment. The terminal device 2 determines whether or not multiple subframe sets are configured, depending on whether or not a certain condition is satisfied (Step S401). In the case where the multiple subframe sets are configured (YES in S401), the terminal device 2 sets the transmission power for the periodic SRS, based on the parameter (the nominal power $P_{O\_PUSCH}$ (the sum of $P_{O\_NOMINAL\_PUSCH}$ and $P_{O\_UE-}$ $_{PUSCH}$) for the terminal device 2, the pathloss compensation coefficient α, the power control adjustment value f(i) that is obtained by the TPC command, or the like) relating to the power control for the PUSCH that is transmitted on the uplink subframe which is included in one subframe set (a specific subframe set) among the multiple subframe sets (Step S402). In a case where the multiple subframe sets are not configured (NO in S401), the terminal device 2 sets the transmission power for the periodic SRS, based on the parameter relating to the power control for the PUSCH (Step S403).

Here, a certain condition is a condition for configuring multiple subframe sets, and for example, the first configuration and the second configuration may be set. Furthermore, a certain condition may be a condition that the terminal device 2 receives information indicating multiple subframe sets.

Moreover, the first configuration and the second configuration will be described in detail below.

FIG. 5 is a flowchart illustrating a processing procedure performed by the terminal device 2 on the aperiodic SRS according to the basic mode of the first embodiment. The terminal device 2 determines whether or not multiple subframe sets are configured, depending on whether or not a certain condition is satisfied (Step S501). In the case where the multiple subframe sets are configured (YES in S501), it is determined which subframe set of the multiple subframe sets the aperiodic SRS is transmitted on (Step S502). In a case where the aperiodic SRS is transmitted on the uplink subframe that belongs to the first subframe set (the first subframe set in S502), the terminal device 2 sets the transmission power for the aperiodic SRS, based on the parameter (the nominal power $P_{O\_PUSCH}$ (the sum of $P_{O\_NOMINAL\_PUSCH}$ and $P_{O\_UE\_PUSCH}$) for the terminal device 2, the pathloss compensation coefficient α, the power control adjustment value f(i) that is obtained by the TPC command, or the like) relating to the power control for the PUSCH in the first subframe set (Step S503). In a case where the aperiodic SRS is transmitted on the uplink subframe that belongs to the second subframe set (the second subframe set in S502), the terminal device 2 sets the transmission power for the aperiodic SRS, based on the parameter relating to the power control for the PUSCH in the second subframe set (Step S504). In the case where the multiple subframe sets are not configured (NO in S501), the terminal device 2 sets the transmission power for the aperiodic SRS, based on the parameter relating to the power control for the PUSCH (Step S505).

According to the basis mode of the first embodiment, the power control for the SRS in accordance with a communication environment can be suitably performed by associating the subframe set and the periodic SRS or the aperiodic SRS with each other.

Modification Example of the First Embodiment

Next, a modification example of the first embodiment is described. According to the modification example of the first embodiment, the base station device 1 transmits information that is used for indicating multiple subframe sets and information relating to a power offset between the PUSCH and the A-SRS, to the terminal device 2. The terminal device 2 in which the multiple subframe sets are configured based on information that is received from the base station device 1 sets the transmission power for the A-SRS based on the parameter relating to the power control for the PUSCH. The terminal device 2 in which the multiple subframe sets are configured based on the information that is received from the base station device 1 sets the transmission power for the A-SRS based on the parameter relating to the power control for the PUSCH, which is transmitted on the uplink subframe that is included in one subframe set (for example, the first subframe set) among the multiple subframe sets, without depending on whether or not which subframe set the subframe on which the A-SRS is transmitted belongs to. At this point, in a case where the power offset between the PUSCH and the A-SRS is set for every subframe set, the power offset between the PUSCH and the A-SRS may be switched and be set according to the subframe set on which the A-SRS is transmitted.

Furthermore, according to the modification example of the first embodiment, in other words, in the case where the multiple subframe sets are configured, the terminal device 2 sets the transmission power for the periodic SRS and the aperiodic SRS, based on the parameter (at least one parameter) relating to the power control for the PUSCH that is transmitted on the uplink subframe which belongs to any subframe set (for example, the first subframe set, a predetermined subframe set, or a specific subframe set) among the multiple subframe sets, without depending on which subframe set the subframe on which the periodic SRS and the aperiodic SRS are transmitted belong to. That is, the terminal device 2 sets the transmission power for the periodic SRS and the aperiodic SRS, based on the parameter relating to the power control for the PUSCH that corresponds to any one subframe set among the multiple subframe sets.

According to the first embodiment, the terminal device 2 in which the multiple subframe sets are configured may set the power control adjustment value that is obtained by the TPC command, for every subframe set. The power control adjustment value that is obtain by the TPC command is applied to the subframe set, to which the subframe on which the PUSCH that is scrambled by the DCI format in which the TPC command is included is transmitted, belongs. To be more precise, in a case where the power control adjustment that results from the scheduling of the PUSCH in a single DCI format and the TPC command is performed, the subframe set to which the subframe to which the power control adjustment value that is obtained by the TPC command is applied belongs, and the subframe set to which the subframe on which the PUSCH is transmitted belongs may be the same subframe set. Furthermore, the power control adjustment value that is obtained by the TPC command which is transmitted in a DCI format 3/3A may be applied to a specific subframe set, without depending on the subframe set to which the subframe on which the DCI format 3/3A is received belongs.

According to the first embodiment, in a case where the scheduling of the PUSCH and an aperiodic SRS request are performed in the same (or a certain single) DCI format (the uplink grant), the PUSCH is transmitted on the uplink subframe that belongs to the first subframe set, and the aperiodic SRS is transmitted on the uplink subframe that belongs to the second subframe set, the power control adjustment value that is obtained by the TPC command which is transmitted in the DCI format may not be applied to the transmission power for the aperiodic SRS that is transmitted on the second subframe set. Accumulation by the TPC command that is set to be in the DCI format which is used for the scheduling of the PUSCH indicates accumulation by the TPC command for the subframe set to which the subframe on which the PUSCH is transmitted belongs, and may not be applied to the subframe set to which the subframe on which the aperiodic SRS is transmitted belongs. In a case where the subframes or the subframe set that is instructed to transmit the PUSCH and the aperiodic SRS in the DCI format are the same, the power control adjustment value that is obtained by the TPC command that is transmitted in the DCI format is also applied to the transmission power for the aperiodic SRS. At this point, in a case where the accumulation is enabled, the power control adjustment value that is obtained by the TPC command may be obtained by the accumulation that results from the correction value. In a case where the accumulation is not enabled, the power control correction value may be obtained by an absolute value.

Furthermore, in a case where the subframe on which the aperiodic SRS is transmitted belongs to the second subframe set, the scheduling of the PUSCH for the first subframe set may be performed in the DCI format for which the SRS request field for performing a request for transmission of the aperiodic SRS is set, and the scheduling of the PUSCH for the second subframe set may be performed. Furthermore, the scheduling of the PUSCH for a different subframe set and the request for the transmission of the aperiodic SRS may be performed in one DCI format.

FIG. 6 is a diagram illustrating one example of the transmission subframe for the PUSCH and the A-SRS according to the first embodiment. In FIG. 6, a subframe {n, n+1, n+2, n+5, n+6, n+10, n+11, n+12, n+15, n+16} constitutes the first subframe set, a subframe {n+3, n+4, n+7, n+8, n+9, n+13, n+14, n+17, n+18, n+19} constitutes the second subframe set. Furthermore, in FIG. 6, a subframe on which the transmission of the A-SRS is possible is defined as a subframe {n+2, n+7, n+12, n+17}.

FIG. 6(a) is an example in which the PUSCH and the A-SRS are transmitted in different subframe set (different subframes). The DCI format 0 for performing the scheduling of the PUSCH and the request for the transmission of the A-SRS is detected on the subframe n+5. The PUSCH is transmitted on a subframe n+9, and the A-SRS is transmitted on a subframe n+12. In FIG. 6(a), the power control adjustment value that is obtained by the TPC command which is included in the DCI format 0 is used for setting the transmission power for the PUSCH, but may be used for setting the transmission power for the A-SRS that is transmitted on a subframe set different from the subframe set to which the subframe on which the PUSCH is transmitted belongs.

Furthermore, in FIG. 6(b), the DCI format 0 for performing the scheduling of the PUSCH and the request for the transmission of the A-SRS is detected on the subframe n+6, and the PUSCH and the A-SRS are transmitted on the subframe n+12. In FIG. 6(b), because the PUSCH and the A-SRS are transmitted on the subframes that belong to the same subframe set, the power control adjustment value that is obtained by the TPC command which is transmitted on the DCI format 0 is used for setting the transmission power for the PUSCH and the transmission power for the A-SRS. Furthermore, in a case where both of FIGS. 6(a) and 6(b) are combined, it is possible to associate multiple DCI formats with one A-SRS subframe. However, in a case where, among the multiple DCI formats, the scheduling of the PUSCH is performed on a subframe set different from the subframe set on which the transmission of the A-SRS is possible, the power control adjustment value that is obtained by the TPC command that is set to be in the DCI format is not used for the transmission power for the A-SRS. In a case where multiple SRS requests are notified on one A-SRS subframe in the same type of DCI format (for example, the DCI format 0 or 1A) within a certain period of time, the transmission power for the A-SRS is set based on the power control adjustment value that is obtained by the TPC command which is transmitted in the DCI format for performing the scheduling of the PUSCH on the same subframe set as with the A-SRS and on the parameter (the parameter relating to the power control) that is used for the power control for the PUSCH.

According to the first embodiment, the terminal device 2 in which multiple subframe sets are configured can independently perform the power control for the periodic SRS and the aperiodic SRS. Furthermore, according to the first embodiment, the terminal device 2 in which the multiple subframe sets are configured can distinguish between the subframe set that can share the power control for the periodic SRS and the aperiodic SRS and the subframe set that does not share the power control for the periodic SRS and the aperiodic SRS. Furthermore, according to the first embodiment, the power control for the periodic SRS and the aperiodic SRS and the power control for the PUSCH can be associated with each other. In a case where the multiple subframe sets are configured, the power control for the periodic SRS may be controlled based on the power control for the PUSCH that is transmitted on the uplink subframe that belongs to a specific subframe set, and the power control for the aperiodic SRS may be controlled based on the power control for the PUSCH that is transmitted on the subframe set to which the subframe on which the aperiodic SRS is transmitted belongs.

Basic Mode of a Second Embodiment

Next, a basic mode of the second embodiment is described. According to the basic mode of the second embodiment, the base station device 1 transmits information (subframe set indication information) that is used for indicating multiple subframe sets, and a parameter (accumulation indication information or accumulationEnabled) for indicating whether or not the accumulation is enabled, to the terminal device 2. The terminal device 2 determines whether or not the accumulation for multiple subframe sets is enabled, based on the accumulation indication information. In a case where the accumulation is enabled, the terminal device 2 sets the transmission power for the transmission on the physical uplink shared channel for each of the multiple subframe sets, based on the power control adjustment value for each of the multiple subframe sets, which is obtained by performing the accumulation by the TPC command for each of the multiple subframe sets. In a case where the accumulation is not enabled, the terminal device 2 sets the transmission power for the transmission on the PUSCH, without depending on the subframe set, based on the power control adjustment value for which the absolute value that is given by a single TPC command is set.

Furthermore, in a case where the accumulation indication information is notified from the base station device 1, the terminal device 2 determines whether or not the accumulation is enabled, based on a default (a default value or a default configuration) for the accumulation indication information. For example, in a case where the default is "The accumulation is enabled (TRUE or Enabled)," the terminal device 2 in which multiple subframe sets are configured sets the transmission power for the PUSCH (or the SRS) for each of the multiple subframe sets, based on the power control adjustment value for each of the multiple subframe sets, which is obtained by performing the accumulation by the TPC command on each of the multiple subframe sets. Furthermore, in a case where the default is "The accumulation is not enabled (FALSE or disabled)," the terminal device 2 in which the multiple subframe sets are configured sets the transmission power for the PUSCH (or the SRS), based on the power control adjustment value to which the absolute value that is given by a single TPC command is set, without depending on the subframe set. At this time, control is not performed in which the DCI format or the TPC command field that is set to be in the DCI format, and the subframe set are associated with each other.

At this point, the accumulation by the TPC command in the case where the accumulation is enabled is such that the accumulation (the summation or the cumulation) of the correction value that corresponds to a value that is set for the TPC command field is performed. That is, in a case where the uplink signal is transmitted on the subframe the terminal device 2 sets the transmission power for the uplink signal that is transmitted on the subframe i, considering the correction value that corresponds to a value that is set for the TPC command field which is detected before the subframe i.

In contrast, in a case where the accumulation is not enabled, the accumulation of the correction value that corresponds to a value which is set for the TPC command field is not performed. That is, in the case where the uplink signal is transmitted on the subframe i, the terminal device 2 sets the transmission power for the uplink signal that is transmitted on the subframe i, based on the power control adjustment value that is given by the absolute value that corresponds to a value which is set for the TPC command field that is detected on a subframe (the latest subframe, for example, a subframe that appeared four subframes earlier) that appears immediately before the subframe i. In other words, in the case where the accumulation is not enabled, the power control adjustment value that is used for the transmission power for the uplink signal (for example, the PUSCH) that is transmitted on a certain subframe is given by the absolute value that corresponds to a value that is set for a single TPC command. Furthermore, in other words, the power control adjustment value in the case where the accumulation is not enable is set based on the TPC command that is transmitted in the DCI format that is a certain downlink subframe.

At this point, the performing of the accumulation by the TPC command for every subframe set is such that the accumulation by the TPC command is performed independently for every subframe set. In a case where the uplink signal is transmitted on the uplink subframe that belongs to the first subframe set, the accumulation is performed based on the TPC command that is notified for the uplink signal that is transmitted on the uplink subframe that belongs to the first subframe set. In a case where the uplink signal is transmitted on the uplink subframe that belongs to the second subframe set, the accumulation is performed based on the TPC command that is notified for the uplink signal that is transmitted on the uplink subframe that belongs to the second subframe set. That is, in a case where the uplink signal is transmitted on the subframe an accumulation value (the power control adjustment value) that is used for the accumulation differs depending on which subframe set the subframe i belongs to. In a case where an accumulation value for the first subframe set and an accumulation value for the second subframe set are present and the accumulation is performed on the subframe i, which accumulation value is used is determined by which subframe set the subframe i belongs to.

Furthermore, the terminal device 2 may determine whether or not re-setting (initialization) of the accumulation for the PUSCH is performed for every subframe set, depending on whether or not multiple parameters PO_UE_PUSCH (p0-UE-PUSCH) relating to UE-specific power for the PUSCH are set. For example, in a case where the multiple parameters relating to the UE-specific power for the PUSCH are set, to be more precise, the parameter relating to the UE-specific power for the PUSCH is set for each of the subframe sets, the re-setting of the accumulation is performed for every subframe set. In a case where the multiple parameters relating to the UE-specific power for the PUSCH are not set, when a parameter relating to the UE-specific power is re-set and a value of the parameter is changed, even if the power control adjustment value is set by the accumulation by the TPC command for each of the multiple subframe sets, each accumulation (the power control adjustment value that is obtained by the accumulation) is re-set. At this point, the re-setting of the accumulation is such that the power control adjustment value (a value of the accumulation of the power control adjustment value that is obtained by the TPC command) that is obtained by the accumulation is re-set and the power control adjustment value is re-set to an initial value (the default value). The same processing as with the PUSCH may also be performed on the SRS. Furthermore, the same processing as with the PUSCH may also be performed on the PUCCH. The re-setting of the accumulation includes re-setting of the power control adjustment value that is obtained by the accumulation.

Furthermore, the terminal device 2 may determine whether or not the re-setting (the initialization) of the accumulation is performed on the PUSCH for every subframe set, depending on whether or not the multiple parameters (for example, $P_{O\_PRE}$) relating to the power control for the PUSCH that corresponds to the random access response grant are set. In a case where multiple parameters for the PUSCH that corresponds to the random access response grant are set being associated with the subframe set, it is determined which subframe set the random access response message is for, and the accumulation that corresponds to any one subframe set among the multiple subframe sets is re-set. To be more precise, the re-setting of the accumulation that occurs by receiving the random access response message is performed for every subframe set. In a case where the multiple parameters for the PUSCH that corresponds to the random access response grant are not set, to be more precise, the parameter for the PUSCH that corresponds to the random access response grant which is associated with the subframe set is not set, all the power control adjustment values (the power control adjustment values that correspond to multiple subframe sets) are re-set at the point in time when the random access response message is received, even if the accumulation is performed independently for every subframe set. The same processing as with the PUSCH may also be performed on the SRS. Furthermore, the same processing as with the PUSCH may also be performed on the PUCCH. Moreover, in a case where the random access response message is not transmitted on every subframe set, when the terminal device 2 receives the random access response message for the subframe set c, each power control adjustment value that is obtained by the accumulation that is controlled for every subframe set is re-set (initialized). An initial value thereof may be determined based on the transmit power control for the random access. To be more precise, the initial value may be determined based on a ramp-up value that is set according to the number of times that the TPC command for the random access preamble and the random access preamble are transmitted.

Furthermore, in a case where the accumulation is enabled for each of the multiple subframe sets, when maximum power (maximum transmit power, maximum output power, or $P_{CMAX, c}$) or minimum power (minimum transmit power or minimum output power) of the terminal device 2 for the serving cell c for every subframe set is reached, processing is performed. For example, in a case where the transmission power $P_{PUSCH, c}$ for the PUSCH that is transmitted on the uplink subframe which belongs to the first subframe set reaches the maximum power of the terminal device 2 for the serving cell c, the accumulation by the TPC command is not performed to the extent that the transmission power exceeds the maximum power $P_{CMAX, c}$ of the terminal device 2 for the serving cell c. However, if the transmission power for the PUSCH that is transmitted on the uplink subframe which belongs to the second subframe set does not reach the maximum power $P_{CMAX, c}$ of the terminal device 2 for the serving cell c, the accumulation by the TPC command may be performed until the maximum power $P_{CMAX, c}$ of terminal device 2 for the serving cell c is reached.

Furthermore, in the case where the transmission power for the PUSCH that is transmitted on the uplink subframe which belongs to the first subframe set reaches the minimum power of the terminal device 2 for the serving cell c, the accumulation by the TPC command is not performed to the extent that the transmission falls below the minimum power of the terminal device 2 for the serving cell c. However, if the transmission power for the PUSCH that is transmitted on the uplink subframe which belongs to the second subframe set does not reach the minimum power of the terminal device 2 for the serving cell c, the accumulation by the TPC command may be performed until the minimum power of terminal device 2 for the serving cell c is reached. To be more precise, in a case where the accumulation is enabled for every subframe set, the accumulation by the TPC command for the maximum power or the minimum power for every subframe set may be performed. Furthermore, when the TPC command that increases the transmission power is referred to as a positive TPC command, and the TPC command that decreases the transmission power is referred to as a negative TPC command, it may be determined for every subframe set whether or not the positive TPC command and/or the negative TPC command is accumulated. The same processing as with the PUSCH may also be performed on the SRS. Furthermore, the same processing as with the PUSCH may also be performed on the PUCCH.

According to the basic mode of the second embodiment, it can be determined whether the common processing between the subframe sets is performed based on one piece of indication information or the processing is performed independently for every subframe set.

First Modification Example of the Second Embodiment

Next, a first modification example of the second embodiment is described. According to the first modification example of the second embodiment, in a case where multiple subframe sets are configured, if a parameter (accumulation indication information or accumulationEnabled) for each of the multiple subframe sets, which indicates whether or not the accumulation is enabled, is set, the terminal device 2 determines whether or not the accumulation by the TPC command for every subframe set is performed, based on the indication information. If the indication information is not set for every subframe set, as in the basic mode of the second embodiment, it may be determined whether or not the accumulation by the TPC command for every subframe set is enabled, based on one piece of indication information. Furthermore, it may be determined whether or not the accumulation by the TPC command is performed, based one piece of indication information, without depending on the subframe set. Moreover, in a case where the indication information is not notified, the mobile terminal device 2 may determine whether or not the accumulation by the TPC command for every subframe set is performed, based on a default on the indication information.

In a case where the accumulation indication information is set for every subframe set, that is, the accumulation and absolute transmit power control can be set for every subframe set, addition processing and deduction processing (accumulation processing) of the correction value that corresponds to a value being set in the TPC command field may be performed for every subframe set.

According to the first modification example of the second embodiment, it can be set whether or not the accumulation by the TPC command is performed for every subframe set, by setting the accumulation indication information for every subframe set, and flexible power control can be performed for every subframe set. Suitable power control can be performed in a case where an interference situation differs from one subframe set to another.

Second Modification Example of the Second Embodiment

Next, a second modification example of the second embodiment is described. According to the second modification example of the second embodiment, in a case where multiple subframe sets are configured, the terminal device 2 performs the accumulation by the TPC command for every subframe set, without depending on information (accumulation indication information or accumulationEnabled) indicating whether or not the accumulation is enabled.

Although "The accumulation is not enabled (FALSE or disable)" is indicated in advance by the accumulation indication information, in a case where multiple subframe sets are configured by a certain condition being satisfied, the terminal device 2 performs the accumulation for every subframe set without depending on configuration contents of the indication information.

According to the second modification example of the second embodiment, in the terminal device 2 in which multiple subframe sets are configured, because the accumulation by the TPC command is performed implicitly for every subframe set without depending on the accumulation indication information, there is no need to notifying the accumulation indication information, and thus overhead is reduced decreases as much as the omission of the notification takes place.

Third Modification Example of the Second Embodiment

Next, a third modification example of the second embodiment is described. According to the third modification example of the second embodiment, in a case where multiple subframe sets are configured, among multiple subframe sets, the terminal device 2 determines whether or not the accumulation by the TPC command is performed, for one subframe set (a specific subframe set, a predetermined subframe set, or the first subframe set), based on the parameter (the accumulation indication information or accumulationEnabled) indicating whether or not the accumulation is enabled, and performs the accumulation by the TPC command for every subframe set for the other subframe sets. The setting by the accumulation indication information is enabled for only one subframe set. For example, the first subframe set indicates whether or not the accumulation by the TPC command is enabled, using the accumulation indication information, but the accumulation by the TPC command is always enabled for the other subframe sets. To be more precise, in a case where the multiple subframe sets are configured, it can be said that, for subframe sets other than a specific subframe set, the accumulation by the TPC command is set as being enabled by default.

According to the third modification example of the second embodiment, with the accumulation indication information, the power control is performed for one subframe set, and the accumulation is always performed for the other subframe sets. Thus, the accumulation indication information does not need to be set for every subframe set, and the overhead is reduced as much as the omission of the setting takes place, and with the accumulation indication information, the power control is performed for the specific subframe set. Because of this, the power is set in a more suitable manner, and communication quality is improved.

Moreover, according to the second embodiment, the accumulation by the TPC command for the PUSCH is described. However, in a case where the parameter (information) indicating whether or not the accumulation is enabled is set for the other uplink physical channels (for example, the PUCCH, the PRACH, and the PUSCH for the random access response grant) or the physical signal (for example, the SRS) and the transmission on the other uplink physical channels is performed with the multiple subframe sets, the processing that is described according to the second embodiment may be performed on the other uplink physical channels.

Third Embodiment

Next, a third embodiment is described. According to the third embodiment, the base station device 1 transmits to the terminal device 2 information that is used for indicating multiple subframe sets and the maximum allowed output power $P_{EMAX, c}$ (Maximum allowed UE output power) for each of the multiple subframe sets. Furthermore, the base station device 1 performs reception of the transmission power on the PUSCH, which is set based on the maximum transmission power $P_{CMAX, c}$ for each of the multiple subframe sets, on each of the multiple subframe sets. In a case where the maximum allowed output power $P_{EMAX, c}$ (p-Max) for the multiple subframe sets and each of the multiple subframe sets is set, the terminal device 2 sets the maximum transmission power $P_{CMAX, c}$ for the serving cell c in every subframe set, based on the maximum allowed output power $P_{EMAX, c}$ for each of the multiple subframe sets. The maximum transmission power $P_{CMAX, c}$ is set to be the same as or lower than the maximum allowed output power $P_{EMAX, c}$. Among parameters for setting the maximum transmission power $P_{CMAX, c}$ for the serving cell c, which are maximum power reduction (MPR), additional maximum power reduction (A-MPR), power management maximum power reduction (P-MPR), and $\Delta T_C$ (allowed operating band edge transmission power relaxation), at least one may be set independently for every subframe set. At this point, the MPR is determined by a channel bandwidth, a transmission bandwidth, and a modulation index. The A-MPR is determined by a network signaling value, a resource block allocation region, a carrier aggregation bandwidth combination, a modulation index, and the like. Furthermore, the P-MPR is used when power management is performed such as power back off or electromagnetic field energy absorption guarantee. $\Delta T_C$ is used for alleviating the maximum transmission power in a case where the transmission bandwidth is set to a predetermined frequency band (near the lowest frequency band or the highest frequency band in an operating band) in the operating band.

Furthermore, when the MPR, the A-MPR, and the P-MPR are defined as a first MPR, a second MPR, and a third MPR, respectively, in case where the multiple subframe sets are configured, a fourth MPR may be set. For example, the fourth MPR is a parameter that is used for adjusting the maximum transmission power $P_{CMAX, c}$, considering a power difference between subframe sets for a subframe belonging to a certain subframe set. That is, the fourth MPR may be a power offset between subframe sets. Furthermore, the fourth MPR may be used for calculating the maximum transmission power $P_{CMAX, c}$ for the uplink signal that is transmitted on a subframe which belongs to a specific subframe set. Furthermore, the fourth MPR may be a power offset of a fixed subframe and a flexible subframe. For example, the maximum transmission power $P_{CMAX, c}$ for the flexible subframe may be set based on the fourth MPR. At this time, the fourth MPR may not be used for the maximum transmission power for the fixed subframe may not use.

Furthermore, in a case where the information that is used for indicating the multiple subframe set is notified, the maximum allowed output power $P_{EMAX, c}$ (p-Max) that is set for the terminal device 2 may be set independently for every subframe set.

Furthermore, in the case where the information that is used for indicating the multiple subframe sets is notified, a power class $P_{PowerClass}$ that is set for the terminal device 2 may be set independently for every subframe set.

Furthermore, in the case where the information that is used for indicating the multiple subframe sets is notified, and with the one piece of information that is notified, any one of the maximum allowed output power $P_{EMAX, c}$, the first to third MPRs, and $\Delta T_c$ is not set for every subframe set, the fourth MPR may be set for a subframe that belongs to a certain subframe set in order to set the maximum transmission power $P_{CMAX, c}$ for every subframe set. For example, in a case where the maximum transmission power $P_{CMAX, c}$ of the subframe that belongs to the first subframe set is set with the maximum allowed output power $P_{EMAX, c}$, the first to third MPRs, and $\Delta T_c$, the maximum transmission power $P_{CMAX, c}$ of the subframe that belongs to the second subframe set may further be set using the maximum transmission power $P_{CMAX, c}$ of the subframe that belongs to the first subframe set and the fourth MPR. That is, the fourth MPR may be applied to any subframe set of the first subframe set and the second subframe set. These parameters may be defined in advance. Furthermore, the parameters may be managed using a table. Furthermore, the parameters may be notified from the base station device 1 to the terminal device 2. Furthermore, the maximum allowed output power $P_{EMAX, c}$ of the terminal device 2 is set by the higher layer.

Furthermore, for the terminal device 2, the first to fourth MPRs may be set for every subframe set, and the maximum transmission power $P_{CMAX, c}$ for every subframe set may be based on the first to fourth MPRs.

Furthermore, in a case where only one maximum allowed output power $P_{EMAX, c}$ is notified to the terminal device 2, the maximum allowed output power for the multiple subframe sets may be determined by the maximum allowed output power that is notified and the fourth MPR.

In a case where the multiple subframe sets are configured, it is possible for the terminal device 2 to set the maximum allowed output power PEMAX, c for the serving cell c independently for every subframe set.

The transmit power control in accordance with the interference situation can be performed by setting the maximum allowed power PEMAX, c for the serving cell c for every subframe set.

In a case where the terminal device 2 performs the transmission of the PUSCH that is accompanied by the PUCCH at the same time on the uplink subframe that belongs to the first subframe set and performs the transmission of the PUSCH that is not accompanied by the PUCCH at the same time on the uplink subframe that belong to the second subframe set, the maximum transmission power for each subframe set may be set independently.

Furthermore, in a case where, with one subframe, the terminal device 2 receives the DCI format 3/3A for the uplink subframe that belongs to the first subframe set and the DCI format 0/4 for the uplink subframe that belongs to the second subframe set, the maximum transmission power $P_{CMAX, c}$ for each subframe set may be set independently.

The maximum transmission power $P_{CMAX, c}$ for every subframe set may be set in a case where an event relating to power headroom reporting (PHR) occurs. For example, the maximum transmission power may be set in a case where a predetermined timer expires, in a case where setting or re-setting for the power headroom reporting is performed, in a case where a predetermined timer expires when the uplink resource for new transmission is allocated, and in a case where a predetermined timer expires when the uplink resource for new transmission is allocated and a path loss changes by a predetermined value or above. Furthermore, the maximum transmission power $P_{CMAX, c}$ for every subframe set may be set when power headroom is reported. Furthermore, in a case where the power headroom is reported with a subframe that belongs to any subframe set, the terminal device 2 may calculate the maximum transmission power for the power headroom of all the subframe sets and for the serving cell, and may report these values to the base station device 1, using MAC CE.

Among maximum transmission powers that are set for multiple subframes, one transmission power may be calculated considering a path loss with at least one cell. For example, the maximum transmission power for a certain cell may be calculated considering a path loss from another cell. The terminal device 2 that performs communication with multiple base station devices sets a first maximum transmission power for the first base station device, but, at this time, the terminal device 2 may set the first maximum transmission power, considering a path loss between a base station device other than the first base station device and the terminal device 2. In addition to the maximum allowed output power, the MPR, the A-MPR, and P-MPR, and $\Delta T_C$, the first maximum transmission power may be set considering a path loss with a different cell (a base station device other than the first base station device). Interference to a different cell can be suppressed considering the path loss with the different cell, in a case where the transmission is performed with the first maximum transmission power. This processing may be applied in a case where the path loss between the terminal device 2 and a base station device other than the first base station device is smaller than a predetermined value. Furthermore, the processing may be applied in a case where the path loss between the terminal device 2 and the first base station device and the path loss between the terminal device 2 and a base station device other than the first base station device are compared with each other and the former is greater than the latter.

Furthermore, among the maximum transmission powers that are set with the multiple subframe sets, at least one may be calculated on the assumption that MPR=0 dB, A-MPR=0 dB, P-MPR=0 dB, and $\Delta T_C$=0 dB.

Moreover, the third embodiment may further be applied to (implemented in) the terminal device 2 that can connect to the base station device 1 (a master base station device) that constitutes a macro cell and to the base station device 1 (a secondary base station device) that constitutes a small cell, at the same time (dual connectivity). At this time, the macro cell and the small cell may perform communication at the same frequency (a carrier frequency, a band, a frequency band, a frequency bandwidth, a carrier, a component carrier, and a transmission frequency). Furthermore, in the terminal device 2 in which the carrier aggregation is possible, the third embodiment may be applied in a case where a primary cell and a secondary cell (or multiple serving cells) are set to the same frequency. The terminal device 2 that connects at the same time to two cells that are set to the same frequency may apply an offset between the cells as an offset between subframe sets and determine the maximum transmission power $P_{CMAX, c}$ using the offset. Furthermore, in a case where the maximum allowed output power is set for every cell, the terminal device 2 that connects at the same time to two cells that are set to the same frequency may calculate an offset between the subframe sets from maximum allowed output power for every cell, and determine the maximum transmission power $P_{CMAX, c}$ using the offset.

In the terminal device 2 in which the carrier aggregation is possible, the total maximum output power $P_{CMAX}$ may be set for every subframe set.

In the terminal device 2 in which timing adjustment (timing advance or time alignment) for transmission and reception is possible for multiple component carriers, the total maximum output power $P_{CMAX}$ may be set for every subframe set. To be more precise, in the terminal device 2 in which it is possible to set multiple pieces of timing alignment information, the total maximum output power $P_{CMAX}$ may be set for every subframe set.

Furthermore, only in a case where a specific parameter is set, the maximum transmission power $P_{CMAX, c}$ may be set for the serving cell c for every subframe set. For example, in a case where information indicating whether or not the multiple maximum transmission powers $P_{CMAX, c}$ are enabled to be set for one serving cell and information that is used for indicating the multiple subframe sets are notified to the terminal device 2, the terminal device 2 may set the multiple maximum transmission powers $P_{CMAX, c}$.

Furthermore, only in a case where a specific parameter is set, for the terminal device 2, the base station device 1 may set the maximum allowed output power $P_{EMAX, c}$ for the serving cell c for every subframe set. For example, in a case where information indicating whether or not the multiple maximum allowed output powers $P_{EMAX, c}$ is enabled to be set for one serving cell and information that is used for indicating the multiple subframe sets for one serving cell are notified to the terminal device 2, the terminal device 2 may set the multiple maximum transmission power based on each of the multiple maximum allowed output powers. At this time, one maximum allowed output power may be associated with one subframe set. In a case where one maximum allowed output power and one subframe set are associated with each other, the former and the latter may be associated with each other in a state of being mapped to one ID.

Furthermore, only in the case where a specific parameter is set, the total maximum output power $P_{CMAX}$ may be set for every subframe set. For example, in a case where information indicating whether or not the multiple total maximum output powers $P_{CMAX}$ are enabled to be set for one terminal device 2 and information that is used for indicating the multiple subframe sets are notified to the terminal device 2, the terminal device 2 may set the multiple total maximum output powers $P_{CMAX}$. At this time, one total maximum output power may be associated with one subframe set. In a case where one total maximum output power and one subframe set are associated with each other, the former and the latter may be associated with each other in a state of being mapped to one ID.

According to the third embodiment, a communication environment state (interference or noise) for a certain terminal device 2 differs from one subframe set to another, according to such a communication environment, the maximum transmission power $P_{CMAX, c}$ of the terminal device 2 for the serving cell c that is set for the terminal device 2 is set independently for every subframe set. Thus, it is possible to realize suppression of interference to a different terminal device 2. Only the maximum transmission power of the terminal device 2 for the serving cell c is controlled and thus the suppression of the interference due to excessive signal power is possible without setting a new parameter. For a subframe set in which an amount of interference between multiple terminal devices 2 is great, the interface can be alleviated by setting the maximum transmission power of the terminal device 2 to a low level. In a case where the amount of interference between the base station device 1 and the terminal device 2 is great, the communication quality of a signal that is transmitted from the terminal device 2 can be secured by setting the maximum transmission power of the terminal device 2 to a high level. The terminal device 2 can perform the communication in accordance with the amount (strength) of interference.

According to the third embodiment, the maximum transmission power $P_{CMAX, c}$ of terminal device 2 for the serving cell c is described, but the same processing may be performed on the minimum power for the serving cell c. The terminal device 2 may set the minimum transmission power for the subframe set in which the amount of interference is great (interference power is high), to a high level, and set the minimum transmission power for the subframe set in which the amount of interference is small (interference power is low), to a low level. Furthermore, according to the third embodiment, the same processing may be performed on the total maximum output power $P_{CMAX}$ and/or the total minimum output power that are set by the terminal device 2.

According to each of the embodiments described above, the base station device 1 may transmit a TPC command that corresponds to each subframe set, to the terminal device 2 in which the multiple subframe sets are configured, with the TPC command being set to be in the same DCI format field. Furthermore, the base station device 1 may transmit a TCP command field that corresponds to the first subframe set in the same type of DCI format, to the terminal device 2 in which the multiple subframe sets are configured, with the TCP command field being set as the TPC command field that corresponds to the second subframe set. To be more precise, the base station device 1 may replace the TPC command field that corresponds to the first subframe set with the TPC command field that corresponds to the second subframe set and then may transmit the TPC command field that corresponds to the second subframe set. To be more precise, the TPC command field that corresponds to the first subframe set and the TPC command field that corresponds to the second subframe set may be shared in the same frame. Furthermore, the base station device 1 may transmit one portion of control information field to the terminal device 2 in which the multiple subframe sets are configured, with the one portion being set as the TPC command field corresponding to the second subframe set. The terminal device 2 can detect the TPC command field corresponding to the second subframe set, from the DCI format that is set by the base station device 1. Moreover, whether or not the TPC command that corresponds to the second subframe set can be applied may be indicated by control information that is different from the information relating to the first configuration and the information relating to the second configuration.

According to each of the embodiments described above, the base station device 1 may set multiple parameters relating to the power control for the terminal device 2. The multiple parameters that are set may be parameters that are set to be cell-specific. Furthermore, the multiple parameters that are set may be parameters that are set to be UE-specific. Furthermore, the multiple parameters that are set may be parameters that are set to be cell-specific and parameters that are set to be UE-specific. Furthermore, the same types of multiple parameters that are set may be specific parameters that are included in parameters which are set to be cell-specific or parameters which are set to be UE-specific. For example, the setting of the parameter relating to the power control may include at least one among a parameter and a parameter set for controlling the transmission power for the PUSCH, the transmission power for the PUCCH, or the transmission power for the SRS. Furthermore, the setting of the parameter relating to the power control may include at least one among a parameter and a parameter set for controlling the transmission power for the PDSCH, the transmission power for the PDCCH, the transmission power for the CRS, the transmission power for the CSI-RS, and the transmission power for the DL DMRS. To be more precise, a parameter that is not set as the parameter relating to second power control can substitute for a parameter that is set as a parameter relating to first power control. For the parameter that is not set as the parameter relating to the second power control, a default value may be used.

For example, with different types of power control, that is, the first power control and the second power control, parameters (sets) relating to different cell-specific power control are switched, and power for a signal is controlled. Furthermore, with the different types of power control, parameters (sets) relating to different UE-specific power control are switched and power for a signal is controlled. Furthermore, with the different types of power control, parameters (sets) relating to different cell-specific or UE-specific power control are switched, and power for a signal is controlled. Furthermore, with the different types of power control, the accumulation by the TPC command is performed using a different loop.

According to each of the embodiments described above, a parameter relating to the power control that will be described below may be set for every subframe set.

FIG. 7 is a diagram illustrating one example of a parameter that is included in a parameter (UplinkPowerControl) relating to first uplink power control. As the parameters relating to the first uplink power control, there are a parameter (a shared parameter (UplinkPowerControlCommon) relating to uplink power control) that is set to be cell-specific (shared among the terminal devices 2 within a cell) and a parameter (a dedicated parameter (UplinkPowerControlDedicated) relating to the uplink power control) that is set for every terminal device 2. As the shared parameters, there are nominal PUSCH power (p0-NominalPUSCH) that is PUSCH power which can be set to be cell-specific, an attenuation coefficient (a pathloss compensation coefficient) of fractional transmit power control $\alpha_c$ (alpha), nominal PUCCH power (p0-NominalPUCCH) that is PUCCH power which can be set to be cell-specific, power adjustment value (a power offset) $\Delta_{F\_PUCCH}$ (deltaFList-PUCCH) for every PUCCH format, and a power adjustment value (a power offset) (deltaPreambleMsg3) in a case where preamble message 3 is transmitted. Furthermore, as the dedicated parameters, there are UE-specific PUSCH power (p0-UE-PUSCH) that is PUSCH power which can be set to be UE-specific, a parameter (deltaMCS-Enabled) indicating whether a power shift value Ks in compliance with a modulation coding scheme is enabled, a parameter (accumulationEnabled) indicating whether the accumulation is enabled, UE-specific PUCCH power (p0-UE-PUCCH) that is PUCCH power which can be set to be UE-specific, power offset $P_{SRS\_OFFSET}$ pSRS-Offset or pSRS-OffsetAp) for the periodic SRS and the aperiodic SRS, and a filter coefficient (filterCoefficient) of received power (Reference Signal Received Power (RSRP)) for a reference signal. It is possible to set these pieces of information for a primary cell, but the same setting can also be performed on a secondary cell. Moreover, with the dedicated parameter for the secondary cell, a parameter (pathlossReferenceLinking) indicating that calculation of a path loss is performed using a path loss measurement reference signal for the primary cell or the secondary cell may be set.

Figure 8:
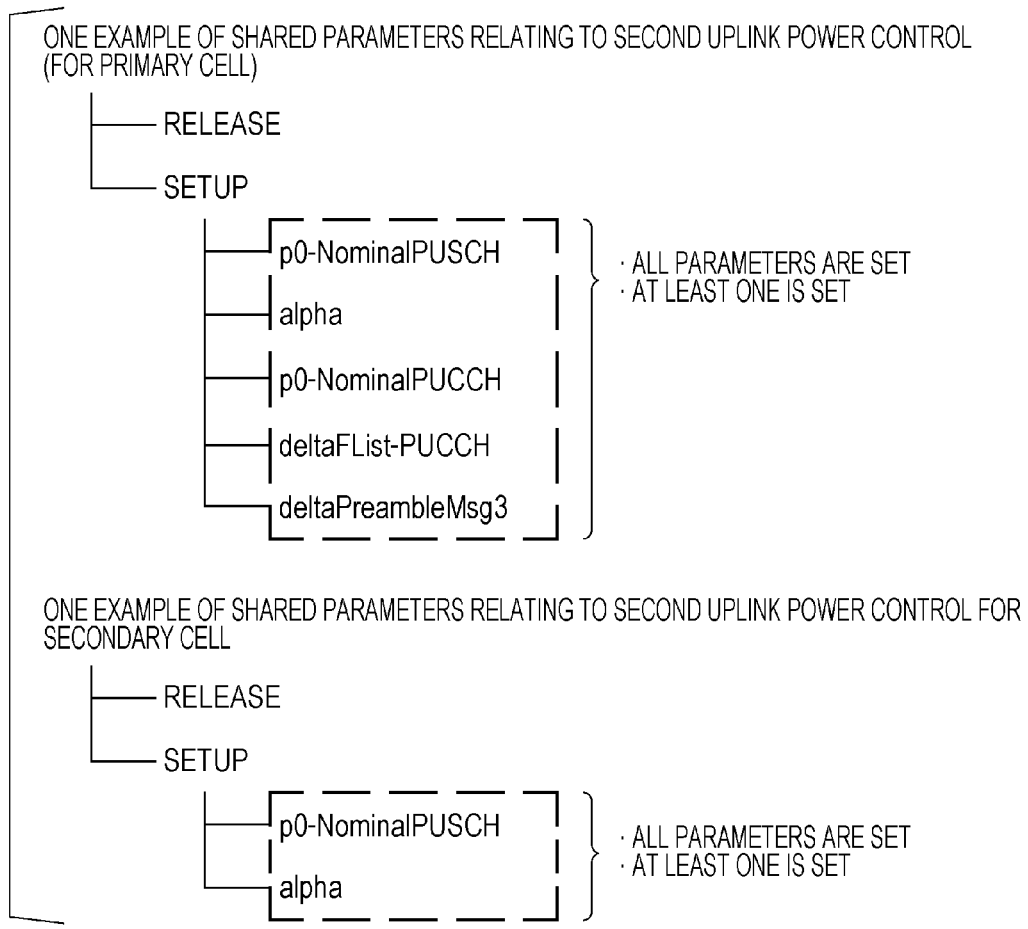
FIG. 8 is a diagram illustrating one example of a shared parameter relating to second uplink power control.

FIG. 8 is a diagram illustrating one example of a shared parameter relating to second uplink power control. As the shared parameter relating to the second uplink power control (for the primary cell) or a shared parameter relating to the second uplink power control for the secondary cell, all parameters that are illustrated in FIG. 8 may be set. Furthermore, as the shared parameter relating to the second uplink power control (for the primary cell) or the shared parameter relating to the second uplink power control for the secondary cell, at least one parameter among all parameters that are illustrated in FIG. 8 may be set. Furthermore, neither the shared parameter relating to the second uplink power control (for the primary cell), nor the shared parameter relating to the second uplink power control for the secondary cell may be set. In this case, the base station device 1 selects release and transmits information relating to setting of this shared parameter to the terminal device 2. Furthermore, the same value as that of a parameter that is set as the shared parameter relating to the first uplink power control may be set for a parameter that is not set as the shared parameter relating to the second uplink power control.

FIG. 9 is a diagram illustrating one example of a dedicated parameter relating to the first uplink power control and a dedicated parameter relating to the second uplink power control. A path loss radio resource indicating the downlink reference signal (the downlink radio resource) for measuring a path loss may be set for the dedicated parameter relating to the first uplink power control for the primary cell and/or secondary cell. Furthermore, in addition to the parameters that are illustrated in FIG. 7, the path loss reference resource may be set for the dedicated parameter relating to the second uplink power control for the primary cell and/or secondary cell. As a dedicated parameter relating to the second uplink power control (for the primary cell) or a dedicated parameter relating to the second uplink power control for the secondary cell, all parameters that are illustrated in FIG. 9 may be set. Furthermore, as the dedicated parameter relating to the second uplink power control (for the primary cell) or the dedicated parameter relating to the second uplink power control for the secondary cell, at least one parameter among all parameters that are illustrated in FIG. 9 may be set. Furthermore, neither the dedicated parameter relating to the second uplink power control (for the primary cell), nor the dedicated parameter relating to the second uplink power control for the secondary cell may be set. In this case, the base station device 1 selects release, and transmits such information on the release to the terminal device 2. Furthermore, the same value as that of the dedicated parameter relating to the first uplink power control may be set for a parameter that is not set as the dedicated parameter relating to the second uplink power control. To be more precise, in a case where the path loss reference resource is not set in the dedicated parameter relating to the second uplink power control, calculation of the path loss may be performed based on the path loss reference resource that is set with the dedicated parameter relating to the first uplink power control. Furthermore, for a parameter, a default on which is set, the default may be used.

Moreover, the setting of the parameter relating to the first uplink power control and the setting of the parameter relating to the second uplink power control may be transmitted to the terminal device 2, in a state of being included in the same information element or the RRC message.

In a case where the multiple parameters relating to the uplink power control (for example, the parameter relating to the first uplink power control and the parameter relating to the second uplink power control) are set for terminal device 2, the setting of the parameter relating to the first uplink power control may be applied to the uplink signal that is transmitted on the first subframe set, and the setting of the parameter relating to the second uplink power control may be applied to the uplink signal that is transmitted on the second subframe set. Furthermore, in a case where the multiple parameters relating to the downlink power control (for example, the parameter relating to the first downlink power control and the parameter relating to the second downlink power control) are set for terminal device 2, the setting of the parameter relating to the first downlink power control may be applied to the downlink signal that is transmitted on the first subframe set, and the setting of the parameter relating to the second downlink power control may be applied to the downlink signal that is transmitted on the second subframe set.

Among the parameters that are used for the setting of the parameter relating to the power control, at least one may be transmitted to the terminal device 2 with the system information. Among the parameters that are used for the setting of the parameter relating to the power control, at least one may be transmitted to the terminal device 2 with the higher layer signaling (RRC signaling or Dedicated signaling). Among the parameters that are used for the setting of the parameter relating to the power control, at least one may be transmitted to the terminal device 2 on the physical channel (in the DCI format). Among the parameters that are used for the setting of the parameter relating to the power control, a default on at least one may be set for the terminal device 2.

In a case where, in each of the first configuration and the second configuration, different types of subframes are set for the same subframe (one subframe), such as an uplink subframe and a downlink subframe, a downlink subframe and a special subframe, an uplink subframe, and a special subframe, in some cases, such a subframe is referred to as a flexible subframe. To be more precise, the flexible subframe is a subframe that can be processed as a different type of subframe according to a situation. In contrast, the fixed subframe is a subframe that is set, as the same type of subframe, in the first configuration and the second configuration. For example, in a case where in both of the first configuration and the second configuration, the uplink subframe is indicated with a subframe i, the subframe i is a fixed subframe. In a case where in the first configuration and the second configuration, different types of subframes are indicated with the subframe i, the subframe i is the flexible subframe. Multiple fixed subframes and multiple flexible subframes each may be set as a subframe set.

The transmit power control by the TPC command (accumulation, absolute) may be performed for every subframe set. At this time, in a case where, for the accumulation in each subframe set, power (p0-UE-PUSCH, p0-UE-PUCCH) for the physical channel (PUSCH, PUCCH), which is included in the setting of the parameter relating to the uplink power control that corresponds to each subframe set, and which is set for every terminal device 2, is re-set (changed), a power control adjustment value (a total value, an accumulation value, an integration value, and an addition value) that is obtained by the accumulation may also be re-set (initialized). Furthermore, in a case where the random access response message is received on the downlink subframe that corresponds to the uplink subframe which belongs to each subframe set, the power control adjustment value of the accumulation that corresponds to each subframe set may be re-set (initialized). The terminal device 2 may independently re-set the power control adjustment value that is obtained by the accumulation for every subframe set. Moreover, in a case where the power control adjustment value f(i) that is obtained by the TPC command for every subframe set is set, and the power control adjustment value f(i) that corresponds to each subframe set is re-set based on reception of the random access response message, an initial value f(0) (the first value) that is used for the power control adjustment value for each subframe set may be dedicatedly set. For example, in a case where the power control adjustment value for the first subframe set is re-set based on the reception of the random access response message, the initial value f(0) that is used for the power control adjustment value for the first subframe set may be re-set based on a parameter (a power value of a random access preamble that is initially transmitted, the total number (sum) of times that power ramp-up occurs during a period of time from the first occurrence (initial transmission) of the random access preamble to the last occurrence (last re-transmission) of the random access preamble, or a power value that is added for every power ramp-up) relating to the transmit power control for the random access and on a correction value that corresponds to a value which is set to be in the TPC command field that is indicated with the random access response. Furthermore, in a case where the power control adjustment value for the second subframe set is re-set based on the reception of the random access response message, the initial value that is used for the power control adjustment value for the second subframe set may be set to 0 (or a predetermined value). Furthermore, each of the initial power control adjustment value for the first subframe set and the initial power control adjustment value for the second subframe set may be set in the reverse order of the means (method) described above. That is, in a case where the power control adjustment value for each of the multiple subframe sets is re-set, the initial value f(0) that is used for each power control adjustment value is set dedicatedly (with a separate method, with a separate means, or as an individual parameter).

The TPC command is set for a grant (an uplink grant) relating to the uplink or a grant (a downlink grant) relating to the downlink and is transmitted to the terminal device 2. As the grants relating to the uplink, there are a semi-persistent grant (semi-persistent scheduling grant), a dynamic scheduled grant, and a random access response grant. The semi-persistent grant is used for indicating transmission of periodic (regular or static) data. At this point, the semi-persistent grant includes the DCI format to which the CRC parity bit scrambled by the SPS C-RNTI is attached. The semi-persistent grant is used for indicating transmission of user data and resource allocation. At this point, the dynamic scheduled grant includes the DCI format to which the CRC parity bit scrambled by the C-RNTI is attached. The random access response grant is used for indicating transmission of data that includes user information (information of the terminal device 2) and resource allocation for the transmission of the data, in response to the random access response that is transmitted from the base station device 1. As described above, a random accelerator response grant includes the random access response grant in the contention-based random access procedure. Transmission of these pieces of data is performed using the PUSCH. To be more precise, these grants include resource allocation to the PUSCH, indication of the transmission of the PUSCH, scheduling of the PUSCH.

At this point, the indication of the transmission of the PUSCH by the semi-persistent grant includes indication of the resource allocation to the PUSCH by the semi-persistent grant or indication of the scheduling of the PUSCH. The indication of the transmission of the PUSCH by the dynamic scheduled grant includes indication of the resource allocation to the PUSCH by the dynamic scheduled grant or indication of the scheduling of the PUSCH. The indication of the transmission of the PUSCH by the random access response grant includes indication of the resource allocation to the PUSCH by the random access response grant or indication of the scheduling of the PUSCH. To be more precise, the indication of the transmission of the PUSCH by each grant includes indication of the resource allocation to the PUSCH by each grant or indication of the scheduling of the PUSCH.

For example, in a case where only either of the first configuration and the second configuration is set based on the received information, when the PUSCH is scheduled by the dynamic scheduled grant, the terminal device 2 sets the transmission power for the PUSCH based on the first power control (a first power control method). In a case where both of the first configuration and the second setting is set, when the PUSCH is scheduled by the dynamic scheduled grant, the terminal device 2 sets the transmission power for the PUSCH based on the second power control (a second power control method). At this time, in a case where the transmission of the SRS is requested by the same grant (a positive SRS request is detected), the transmission power for the SRS is set based on the power control that is applied to the PUSCH. Furthermore, even in a case where the PUSCH is scheduled by the semi-persistent grant, the transmission power for the PUSCH may be set by performing the same processing. At this point, for various power control parameters that are included in the setting of the parameter relating to the first power control and the setting of the parameter relating to the second power control, the same parameters as illustrated in FIG. 7, 8, or 9 may be set. The setting of these parameters relating to the power control may be performed for every subframe set. The parameters relating to the power control may be set for every serving cell. Some of the parameters may be shared among the subframe sets and among the serving cells. Furthermore, for example, setting of the parameters relating to the power control, as illustrated in FIGS. 7 to 9, is given an ID (an power control ID) indicating the setting. In a case where the power control ID is involved in the configuration of the subframe set, for the subframe that is transmitted and received in the subframe set, the transmission power and/or received power is set based on the setting of the parameter relating to the power control that is associated with the power control ID. In a case where the subframe set and the power control ID are associated with each other, the terminal device 2 sets the power based on the setting of the parameter relating to the power control. FIGS. 7 to 9 illustrate the uplink power control, but the power control ID may also be set for the setting of the parameter relating to the downlink power control.

Furthermore, in a case where either of the first configuration and the second configuration is set based on the received information, the transmission power for the PUSCH that is scheduled by the random access response grant is set based on third power control (a third power control method). Even in a case where both of the first configuration and the second configuration are set based on the received information, the transmission power for the PUSCH is set based on the third power control. To be more precise, in this case, the terminal device 2 performs the common power control without depending on the configuration that is set.

Moreover, various parameters, which are included in the setting of parameters relating to the first power control, the setting of parameters relating to the second power control, the setting of parameters relating to the third power control and the setting of the parameters, each may be set independently. Furthermore, the parameters relating to the first power control, and the parameters relating to the second power control may be set based on an example that is illustrated in FIG. 7, 8, or 9. Furthermore, the setting of the parameters relating to the third power control may be included in setting of the random access channel.

Independent parameters (preambleInitialReceivedTargetPower ($P_{O\_PRE}$) and $\Delta_{PREAMBLE\_Msg3}$) may be set for information relating to the transmit power control for the uplink signal that corresponds to the random access response grant. Furthermore, a dedicated TPC command ($\delta_{msg2}$) may be applied to the uplink transmission power that corresponds to the random access response grant. Furthermore, these parameter s may be set for every subframe set.

In a case where multiple pieces of information relating to the power control for the uplink signal that corresponds to the random access response grant are set independently, processing may be performed in the same manner as with the power control for the uplink signal that corresponds to a different grant.

That is, according to a type of received grant, switching between performing processing for one type of power control and performing processing for two types of power control is performed.

Moreover, according to each of the embodiments described above, there are a grant that enables switching between two power control methods depending on whether or not both of the first configuration and the second configuration are set and a grant that enables application of the same power control method without depending on whether or not both of first setting and the second configuration are set. The grant that enables performing of suitable power control, considering interference and the grant that enables performing of power control, without considering the interference can be distinguished.

Moreover, according to each of the embodiments described above, when the uplink signal is scheduled by the dynamic scheduled grant or the semi-persistent grant, the terminal device 2, in which either of the first configuration and the second configuration is set, sets the transmission power for the uplink signal based on the first power control method. Furthermore, when the uplink signal is scheduled by the dynamic scheduled grant or the semi-persistent grant, the terminal device 2, in which both of the first configuration and the second configuration are set, sets the transmission power for the uplink signal based on the second power control method. Furthermore, when the uplink signal is scheduled by the random access response grant, the terminal device 2 always sets the transmission power based on the third power control method without depending on the configuration that is set.

Moreover, according to each of the embodiments described above, in a case where the first configuration and the second configuration are set, when the random access response message is received, the terminal device 2 may re-set (initialize) an accumulation value of the accumulation by the TPC command that is included in the first uplink power control and/or the second uplink power control. Furthermore, in a case where UE-specific power parameter ($P_{O\_UE\_PUSCH}$, $P_{O\_UE\_PUCCH}$) is set for each of the information relating to the first uplink power control and the information relating to the second uplink power control for the terminal device 2, when these power parameters are re-set (value-changed) by the higher layer, the accumulation value of the accumulation of the correction value that corresponds to a value that is set to be in the TPC command field that is included in each uplink power control may be re-set (initialized). The accumulation value that is obtained by the accumulation by the TPC command may be referred to as the power control adjustment value.

At this point, in a case where the transmit power control for the uplink signal that is scheduled by the random access response grant is common to the first subframe set and the second subframe set, that is, to multiple subframe sets, when the random access response message is received, the terminal device 2 re-sets the power adjustment value that is obtained by the accumulation. To be more precise, although the power control is independently performed by the accumulation with the first uplink power control and the second uplink power control, the power adjustment value that is obtained by the accumulation may be re-set.

Moreover, according to each of the embodiments described above, in a case where the UE-specific power parameter ($P_{O\_UE\_PUSCH}$, $P_{O\_UE\_PUCCH}$) that is set for the information relating to the first power control and the information relating to the second power control is common, when the UE-specific power parameter is re-set (is value-changed), the accumulation value by the accumulation is re-set. To be more precise, although the power control by the accumulation is independently performed with the first power control and the second power control, the accumulation value by the accumulation may be re-set.

Moreover, according to each of the embodiments described above, in a case where both of the first configuration and the second configuration are set, when the PUSCH is scheduled by the semi-persistent grant, if the transmission subframe for the PUSCH is the fixed subframe (the first subframe), that is, if the PUSCH is scheduled for the fixed subframe, the terminal device 2 sets the transmission power for the PUSCH that corresponds to the semi-persistent grant, based on a parameter (for example, $P_{O\_NOMINAL\_PUSCH}$, $P_{O\_UE\_PUSCH}$) that is set for the information relating to the first power control. Furthermore, if the transmission subframe for the PUSCH is the flexible subframe (the second subframe), that is, if the PUSCH is scheduled for the flexible subframe, the terminal device 2 sets the transmission power for the PUSCH that corresponds to the semi-persistent grant, based on a parameter (for example, $P_{O\_NOMINAL\_PUSCH}$, $P_{O\_UE\_PUSCH}$) that is set for the information relating to the second power control.

Moreover, according to each of the embodiments described above, in a case where both of the first configuration and the second configuration are set, when the PUSCH is scheduled by the dynamic scheduled grant, if the transmission subframe for the PUSCH is the fixed subframe (the first subframe), that is, if the PUSCH is scheduled for the fixed subframe, the terminal device 2 sets the transmission power for the PUSCH that corresponds to the dynamic scheduled grant, based on a parameter (for example, $P_{O\_NOMINAL\_PUSCH}$, $P_{O\_UE\_PUSCH}$) that is set for the setting of the parameter relating to the first power control. Furthermore, if the transmission subframe for the PUSCH is the flexible subframe (the second subframe), that is, if the PUSCH is scheduled for the flexible subframe, the terminal device 2 sets the transmission power for the PUSCH that corresponds to the dynamic scheduled grant, based on a parameter (for example, $P_{O\_NOMINAL\_PUSCH}$, $P_{O\_UE\_PUSCH}$) that is set for the setting of the parameter relating to the second power control.

Moreover, according to each of the embodiments described above, in the case where both of the first configuration and the second configuration are set, when the PUSCH is scheduled by the random access response grant, the terminal device 2 sets the transmission power for the PUSCH that corresponds to the random access response grant, based on the parameter that is set for the setting of the parameter relating to the same power control, without depending on whether or not the transmission subframe for the PUSCH is the fixed subframe or the flexible subframe.

Moreover, according to each of the embodiments described above, an independent power control method may be applied to the terminal device 2 in a case where the first configuration and the second configuration are set, in a case where the uplink signal is scheduled in the downlink control information (DCI) format that is detected in a common search space (CSS), and in a case where the uplink signal is scheduled in the downlink control information format that is detected in a UE-specific search space (USS). To be more precise, in the case where both of the first configuration and the second configuration are set, when the uplink signal is scheduled in the DCI format that is detected in the CSS, the terminal device 2 sets the transmission power for the uplink signal based on the first power control method. Furthermore, when the uplink signal is scheduled in the DCI format that is detected in the USS, the terminal device 2 sets the transmission power for the uplink signal based on the second power control method. Furthermore, when the uplink signal is scheduled in the DCI format that is detected in the USS, the transmission power for the uplink signal may be set based on the first power control method or the second power control method.

Moreover, according to each of the embodiments described above, in a case where the uplink signal is scheduled for the uplink subframe that belongs to the first subframe set, in the DCI format that is detected in the USS, and in a case where the uplink signal is scheduled for the uplink subframe that belongs to the second subframe set, in the DCI format that is detected in the USS, the transmit power control by the TPC command that is transmitted in the DCI format may be independently performed.

Moreover, according to each of the embodiments described above, in a case where the uplink signal is scheduled in the DCI format that is detected in the CSS, common transmit power control may be performed without depending on the first subframe set and the second subframe set.

Moreover, according to each of the embodiments described above, in the case where either of the first configuration and the second configuration is set, when an instruction for transmission of the uplink signal is given by the first DCI format, the terminal device 2 may set the transmission power for the uplink signal based on the first power control method (or the second power control method). Furthermore, in the case where both of the first configuration and the second configuration are set, the terminal device 2 can configure the first subframe set and the second subframe set. Furthermore, when indication of the transmission of the uplink signal is given by the first DCI format for the uplink subframe that belongs to the first subframe set, the terminal device 2 may set the transmission power for the uplink signal based on the first power control method. Furthermore, when indication of the transmission of the uplink signal is given by the first DCI format for the uplink subframe that belongs to the second subframe set, the terminal device 2 may set the transmission power for the uplink signal based on the second power control method.

For example, in some cases, in the re-transmission of the PUSCH for the same uplink data (the transport block), the CRC that is attached to the DCI format that indicates the re-transmission of the PUSCH is scheduled using the C-RNTI, and is scheduled using the temporary C-RNTI. In a case where the CRC is scheduled using the C-RNTI, in the uplink subframe that belongs to the first subframe set, the transmission power for the PUSCH may be set based on the first power control method, and in the uplink subframe that belongs to the second subframe set, the transmission power for the PUSCH may be set based on the second power control method. In a case where the CRC is scheduled using the temporary C-RNTI, in the uplink subframe that belongs to the first subframe set and the uplink subframe that belongs to the second subframe set, the transmission power for the PUSCH may be set based on the same power control method (for example, the third power control method).

Moreover, according to each of the embodiments described above, in a case where the DCI format that indicates the re-transmission is detected, the terminal device 2 may set the transmission power for the uplink signal that is re-transmitted, based on the same uplink power control method, without depending on the subframe set.

Moreover, according to each of the embodiments described above, in a case where the instruction to transmit the uplink signal (for example, the PUSCH) is given by the PDCCH (the EPDCCH) that includes the DCI format to which the CRC scrambled with the C-RNTI is attached (in a case where the resource for the uplink signal is allocated), when the transmission of the uplink signal is on the uplink subframe that belongs to the first subframe set, the transmission power for the uplink signal is set based on the first power control method. Furthermore, when the transmission of the uplink signal is on the uplink subframe that belongs to the second subframe set, the transmission power for the uplink signal is set based on the second power control method. At this time, in a case where indication of transmission for a different uplink signal (for example, the SRS) is given, the transmission power for the different uplink is set based on the same power control method as with the transmission power for the uplink signal. In a case where indication of the transmission of the uplink signal (for example, the PUSCH) is given by the PDCCH (the EPDCCH) that includes the DCI format to which the CRC scrambled with the temporary C-RNTI is attached, when the transmission of the uplink signal is on the uplink subframe that belongs to the first subframe set, the transmission power for the uplink signal is set based on the third power control method. Furthermore, when the transmission of the uplink signal is on the uplink subframe that belongs to the second subframe set, the transmission power for the uplink signal is set based on the third power control method.

Moreover, according to each of the embodiments described above, when multiple conditions are satisfied, the terminal device 2 can switch between performing the power control for the uplink signal corresponding to multiple subframe sets based on a common power control method and performing the power control for the uplink signal corresponding to multiple subframe sets based on an independent power control method.

Moreover, according to each of the embodiments described above, the terminal device 2 can switch the power control method, for a specific identifier, depending on whether the first configuration and/or the second configuration are set, and sets the transmission power, for a different identifier, based on a predetermined power control method without depending on whether the first configuration and/or the second configuration are set.

Moreover, according to each of the embodiments described above, when the transmission of the uplink signal that is accompanied by the C-RNTI is performed, with the uplink subframe that belongs to the first subframe set, the terminal device 2 in which multiple subframe sets are configured may set the transmission power for the uplink signal based on the first power control method. Furthermore, with the uplink subframe that belongs to the second subframe set, the terminal device 2 may set the transmission power for the uplink signal based on the second power control method. When the transmission of the uplink signal that is accompanied by the temporary C-RNTI is performed, the transmission power for the uplink signal may be set based on the common power control method, without depending on the first subframe set or the second subframe set.

Moreover, according to each of the embodiments described above, the reception processing may include detection processing (Detection). Furthermore, the reception processing may include demodulation processing (Demodulation). Furthermore, the reception processing may include decoding processing (Decode, Decoding).

Moreover, according to each of the embodiments described above, in a case where multiple subframe sets are configured based on multiple pieces of information, the information relating to the first configuration and/or the information relating to the second configuration may be transmitted with the system information. Furthermore, the information relating to the first configuration and/or the information relating to the second configuration may be transmitted with the higher layer signaling (the L3 signaling, the RRC signaling, implicit signaling, and semi-static signaling). Furthermore, either of the information relating to the first configuration and the information relating to the second configuration may be transmitted with dynamic signaling (the L1 signaling, control signaling, and explicit signaling). Furthermore, either of the information relating to the first configuration and the information relating to the second configuration may be transmitted with MAC signaling (L2 signaling).

Moreover, according to each of the embodiments described above, the configurations of the multiple subframe sets may be configurations of multiple measurement subframe sets. Furthermore, the configurations of the multiple subframe sets may be configurations of multiple uplink transmission subframe sets. Furthermore, the configurations of the multiple subframe sets may be configurations of multiple downlink reception subframe sets. Furthermore, the configurations of the multiple subframe sets may be configurations of multiple HARQ transmission subframe sets. Furthermore, the configurations of the multiple subframe sets may be configurations of multiple subframe sets in which different types of subframes (for example, the fixed subframe and the flexible subframe) are set.

Moreover, according to each of the embodiments described above, for example, in a radio frame that is configured from 10 subframes, the subframe set may refer to a group of specific subframes. As one example, the first subframe set may be configured from #0, #1, #2, #5, #6, and #7 subframes, and the second subframe set may be configured from #3, #4, #8, and #9 subframes. These subframe sets may be configured based on specific information. Furthermore, these subframe sets may be configured in advance by the terminal device 2. Furthermore, these subframe sets may be dedicatedly notified from the base station device 1 to the terminal device 2 in a dynamic or semi-static manner. These subframe sets may be notified in the DCI format or with the higher layer signaling.

Moreover, according to each of the embodiments described above, the base station device 1 transmits information relating to the setting of a subframe, which is for configuring a subframe set, to the terminal device 2. Furthermore, the base station device 1 transmits configuration information on a parameter relating to the power control to the terminal device 2. The terminal device 2 sets multiple subframe sets based on the setting of the subframe. Furthermore, the terminal device 2 performs the power control that corresponds to each of the multiple subframe sets, based on the setting of the parameter relating to the power control.

Moreover, according to each of the embodiments described above, the terminal device 2 may set the first subframe set and the second subframe set, based on the first configuration and the second configuration. At this point, in the first configuration and the second configuration, the first subframe set is a set of subframes in which the same types of subframes (an uplink subframe and an uplink subframe, a downlink subframe and a downlink subframe, and a special subframe and a special subframe) are set as the same frames. In the first configuration and the second configuration, the second subframe set is a set of subframes in which different types of subframes (a downlink subframe and an uplink subframe, a downlink subframe and a special subframe, and an uplink subframe and a special subframe) are set as the same subframes. For example, the first configuration and the second configuration may be set based on the TDD UL/DL configuration.

Moreover, according to each of the embodiments described above, in the case where both of the first configuration and the second configuration are set, terminal device 2 may set a subframe (an uplink subframe) on which an uplink signal is transmitted, based on the first configuration, and may set a subframe (a downlink subframe) on which a downlink signal is received, based on the second configuration. At this point, in a case where a subframe that is set as an uplink subframe based on the first configuration and a subframe that is set as a downlink subframe based on the second configuration are the same, that is, in a case where both of the uplink subframe and the downlink subframe are set as the same subframe, in some cases, such a subframe is referred to as a flexible subframe. In a case where ae uplink signal is transmitted on the flexible subframe, the power control for the transmission of the uplink signal may be performed independently of a different uplink subframe.

Moreover, according to each of the embodiments described above, in a case where the carrier aggregation that performs communication using multiple component carriers (multiple serving cells, multiple cells) is performed, multiple subframe sets may be configured for every cell. To be more precise, a subframe pattern of the subframe set that is set for every cell may not be shared among cells. One subframe set may be shared among cells.

Moreover, according to each of the embodiments described above, only one subframe set may be configured. A set (a group) of subframes that are included in the configuration of the subframe set may be defined as the first subframe set, a set (a group) of subframes that are not included in the configuration of the subframe set may be defined as the second subframe set. The configuration of the subframe set may be notified from the base station device 1 to the terminal device 2 with the higher layer signaling. A parameter that is set for the configuration of the subframe set may be notified with the higher layer signaling (the L3 signaling, the RRC signaling) and information as to whether or not the configuration of the subframe set is actually applied may be notified in the DCI format (the L1 signaling).

Moreover, according to each of the embodiments described above, in addition to the configuration method described above, there is provided a method in which, in a case where the first subframe set and the second subframe set are configured based on the first configuration and the second configuration, information relating to the TDD UL/DL configuration is included in either of the first configuration and the second configuration, and information that indicates the flexible subframe or information that indicates the fixed subframe is included in the other. Moreover, the information indicating the fixed subframe is information that indicates the subframe that is not processed as the flexible subframe in the first configuration. Furthermore, the information indicating the fixed subframe may be information that indicates a specific type of subframe.

Moreover, according to each of the embodiments described above, in a case where the first configuration and the second configuration are the same (or indicates the same configuration), the multiple subframe sets may not be configured.

Moreover, according to each of the embodiments described above, the terminal device 2 may set or define, in advance, priority levels of the physical channel/physical signal that are transmitted according to a type of physical channel.

Moreover, according to each of the embodiments described above, the terminal device 2 may report to the base station device 1 a result of measurement of the received power, which is based on a second downlink reference signal. The terminal device 2 may perform the reporting periodically. Furthermore, the terminal device 2 may perform the reporting in a case where a certain condition is satisfied.

Moreover, according to each of the embodiments described above, in a case where received power that is based on the second downlink signal is measured, the terminal device 2 may perform the transmit power control for the uplink signal based on the received power. Furthermore, the terminal device 2 may determine the downlink path loss based on the received power.

Moreover, according to each of the embodiments described above, in a case where a sum of transmission powers for various uplink signals, which include the transmission powers for the first uplink reference signal and/or the second uplink reference signal, exceeds a total maximum output power (UE total configured maximum output power (PCMAX)) that is set for the terminal device 2, the terminal device 2 may not transmit the first uplink reference signal and/or the second uplink reference signal.

Moreover, a combination of the embodiments may be realized. For example, the first embodiment and the second embodiment may be combined. Furthermore, the second embodiment and the third embodiment may be combined. Furthermore, the basic mode and the modification example may be combined. Furthermore, the first modification example and the second modification example may be combined.

Moreover, according to each of the embodiments described above, the subframe on which the uplink signal is actually transmitted and/or the subframe on which the downlink signal is actually received may be set based on the parameter (for example, the third configuration) that is set independently of the first configuration and the second configuration.

Moreover, according to each of the embodiments described above, the first configuration and/or the second configuration may be notified with the system information block type 1 (SIB 1) or the RRC message. Furthermore, the first configuration and the second configuration may be notified with the same SIB 1 or the same RRC message.

Moreover, according to each of the embodiments described above, the first configuration and the second configuration may be set for the same RRC message, the same system information or the same information element. Furthermore, the first configuration and the second configuration may be set for a different RRC message, different system information, or a different information element. Furthermore, the first configuration and the second configuration may be set independently as different parameters. Furthermore, the first configuration and/or the second configuration may be notified in a semi-static manner. Furthermore, the first configuration and/or the second configuration may be notified dynamically.

At this point, according to each of the embodiments described above, in a case where the first configuration is the TDD UL/DL configuration that is notified with the system information block type 1 (SIB 1) or the RRC message, the second configuration may be the following configurations. For example, the second configuration may be an additional TDD UL/DL configuration (the second TDD UL/DL configuration). Furthermore, the second configuration may be information (a flexible subframe pattern) that indicates the flexible subframe. Furthermore, the second configuration may be information (a fixed subframe pattern) that indicates the fixed subframe. Furthermore, the second configuration may be information relating to Release 12 (r12) or a version 12 (v12). Furthermore, the second configuration may be information that indicates a subframe that corresponds (or that belongs to the first subframe set) to the first subframe set described above. Furthermore, the second configuration may be information that indicates a subframe that corresponds (or that belongs to the second subframe set) to the second subframe set described above. Furthermore, the second configuration may be information that indicates a subframe to which the PDCCH/EPDCCH (the DCI format) which is accompanied by the TPC command for the flexible subframe is allocable. Furthermore, the second configuration may be information that indicates a subframe on which the CRS is receivable. Furthermore, the second configuration may be information that indicates a subframe on which the CSI-RS is receivable. Furthermore, the second configuration is information that indicates a subframe on which the reporting of the channel state information (the CSI, the CQI, the PMI, or the RI) is possible. Furthermore, the second configuration may be information that indicates a subframe for limiting measurement in the time domain for measurement (received power RSRP, reception quality RSRQ, and wireless monitoring) in a primary cell. To be more precise, the second configuration may be information that indicates a subframe for performing measurement. Furthermore, the second configuration may be information that indicates a subframe for limiting the measurement in the time domain for measurement in a neighboring cell. Furthermore, the second configuration may be information that indicates a subframe for limiting the measurement in the time domain for measurement in the secondary cell. Furthermore, the second configuration may be set based on a measurement subframe pattern. Furthermore, the second configuration may be information that indicates a subframe on which the downlink signal is receivable. Furthermore, the second configuration may be information that is addable. Furthermore, the second configuration may be information as to whether or not the transmission of the physical uplink control channel is possible in the second cell (the secondary cell). Furthermore, the second configuration may be information that indicates a subframe on which transmission of HARQ is possible. Furthermore, the second configuration may be information that indicates a subframe on which the power headroom reporting is possible. Furthermore, the second configuration may be information that indicates a subframe that is associated with the reporting of certain channel state information (the CSI, CQI, the PMI, or the RI). Furthermore, the second configuration may be information that is set separately from the information which indicates the subframe that is associated with the reporting of certain channel state information (the CSI, CQI, the PMI, or the RI) that is different from that in the second configuration. To be more precise, the third configuration and a fourth configuration may be set separately from the second configuration, and either of the third configuration and the fourth configuration may be information that indicates a subframe in the same manner as the second configuration. To be more precise, the third configuration and the fourth configuration may be set separately from the second configuration, and either of the third configuration and the fourth configuration may be information that is set separately from the information which indicates the subframe that is associated with the reporting of a certain channel state information (the CSI, the CQI, the PMI, or the RI). Furthermore, the reporting of channel state information (the CSI, the CQI, the PMI, or the RI) that is calculated based on the CSI-RS and/or the zero power CSI-RS that are included in the associated subframe pattern (set), and/or the CSI-IM resource may be performed. The same may also be applied to all the configurations up to and containing the n-th configuration, which are described above. Furthermore, multiple second configurations may be set, and the switching between the first power control method and the second power control method may be performed based on any one of the multiple second configurations. That is, the second configuration may be the additional TDD UL/DL configuration (the second TDD UL/DL configuration). For the second configuration, information may be set that indicates a subframe which is associated with the reporting of a certain channel state information (the CSI, the CQI, the PMI, or the RI). Furthermore, the second configuration may be information indicating whether or not the concurrent connection (dual connectivity) to multiple base station devices or multiple types of cells is possible. Moreover, the second configuration may be determined in a manner that is peculiar to the system. Furthermore, the second configuration may be broadcast as the shared information or the system information. The second configuration may be notified dynamically. The second configuration may be expressed in a field that is included in the DCI format. The second configuration may be notified in a semi-static manner. Furthermore, the second configuration may be notified with the higher layer signaling. Furthermore, the second configuration may be dedicatedly notified as UE-specific dedicated information to every terminal device 2. Information (UE capability) indicating whether or not the second configuration can be set (re-set) may be notified from the terminal device 2 to the base station device 1. At this point, information that indicates a subframe may be information that indicates a subframe pattern (or a set or a combination). Information that indicates a subframe may be information indicating which subframe is correspondingly provided.

In the case of the TDD UL/DL configuration in which either of the first configuration and the second configuration is notified with the system information block type 1 (SIB 1) or the RRC message, the other may be a configuration (indication information) described above.

Furthermore, the first configuration and/or the second configuration may be set in a bitmap manner. Moreover, the bitmap may be configured from 40 bits or 80 bits.

Furthermore, for the first configuration and/or the second configuration, a configuration that includes an uplink subframe, a downlink subframe, and a special subframe may be designated with an index (an information bit or a sequence of bits indicating an index) based on a table. For example, a table may be a TDD UL/DL configuration (uplink-downlink configuration). A table that shows TDD UL/DL configurations is configured as illustrated in FIG. 3.

Multiple subframe sets may be determined in a manner that is peculiar to the system. Furthermore, multiple subframe sets may be configured by default in advance for the terminal device 2. Furthermore, multiple subframe sets may be defined in advance. For example, in the TDD UL/DL configuration as illustrated in FIG. 3, a set of subframes that are the same types of subframes and a set of subframes that are different types of subframes may be handled as different sets (groups). In the TDD UL/DL configuration (Uplink-Downlink configuration) indexes 0 to 6, one subframe set may be configured from subframe Nos. #0, #1, #2, and #5, and one subframe set may be configured from subframe Nos. #3, #4, #6, #7, #8, and #9. Furthermore, in a case where the special subframe and the downlink subframe are regarded as being only the same type of subframe, one subframe set may be configured from subframe Nos. #0, #1, #2, #5, and #6 and one subframe set may be configured from subframes Nos. #3, #4, #7, #8, and #9. In a case where multiple subframe sets are configured, information (multi-subframeset-Enabled) that indicates the configuration of the multiple subframe sets may be transmitted from the base station device 1 to the terminal device 2. In the case where the multiple subframe sets are configured, information that indicates the setting of the flexible subframe may be transmitted from the base station device 1 to the terminal device 2.

Moreover, according to each of the embodiments described above, information that gives an indication may be referred to as a parameter that gives an indication, or an indicator.

Moreover, according to each of the embodiments described above, the second configuration may be the additional TDD UL/DL configuration (the second TDD UL/DL configuration). Furthermore, the second configuration may be information that indicates a blank subframe. Furthermore, the second configuration may be information (a flexible subframe pattern) that indicates the flexible subframe. Furthermore, the second configuration may be information (a fixed subframe pattern) that indicates the fixed subframe. At this time, although an uplink reference UL-DL configuration and a downlink reference UL-DL configuration are calculated from the first configuration and the second configuration using a table and the like, this does not matter. In other words, in addition to the first configuration and the second configuration, the uplink reference UL-DL configuration and the downlink reference UL-DL configuration may be determined using a table and the like as the third configuration.

Moreover, according to each of the embodiments described above, the base station device 1 or the terminal device 2 may set either of the first configuration and the second configuration as the uplink reference UL-DL configuration, and may set the other as the downlink reference UL-DL configuration. For example, the terminal device 2 may receive two configurations, that is, the first configuration and the second configuration, and then may set the two configurations for the uplink reference UL-DL configuration and the downlink reference UL-DL configuration. Moreover, the DCI format (for example, the DCI format 0/4) relating to the uplink may be transmitted on the downlink subframe that is set with the uplink reference UL-DL configuration.

Furthermore, the uplink reference UL-DL configuration and the downlink reference UL-DL configuration each may be set using the same table. However, in a case where indexes for the uplink reference UL-DL configuration and the downlink reference UL-DL configuration are set based on the same table, it is preferable that the uplink reference UL-DL configuration and the downlink reference UL-DL configuration are set with different indexes. To be more precise, it is preferable that different subframes patterns are set for the uplink reference UL-DL configuration and the downlink reference UL-DL configuration.

According to each of the embodiments described above, in a case where both of the first configuration and the second configuration are set with the TDD UL/DL configuration, according to a condition, one may be set as the uplink reference UL-DL configuration, and the other may be set as the downlink reference UL-DL configuration. Moreover, the uplink reference UL-DL configuration may be used to determine a correspondence between a subframe in which at least a physical downlink control channel is allocated and a subframe in which a physical uplink shared channel to which the physical downlink control channel described above corresponds is allocated, and although the direction (to be more precise, uplink or downlink) in which a signal is actually transmitted is different, this does not matter. The downlink reference UL-DL configuration may be used to determine a correspondence between a subframe to which at least a physical downlink shared channel is allocated and a subframe on which a HARQ-ACK corresponding to the physical downlink shared channel is transmitted, and although the direction (to be more precise, uplink or downlink) in which a signal is actually transmitted is different, this does not matter. That is, the uplink reference UL-DL configuration is used to specify (select or determine) a correspondence between a subframe n to which the PDCCH/EPDCCH/PHICH allocated and a subframe n+k in which the PUSCH to which the PDCCH/EPDCCH/PHICH corresponds is allocated. In a case where one primary cell is set, or in a case where one primary cell or one secondary cell is set and the uplink reference UL-DL configuration that corresponds to the primary cell and the uplink reference UL-DL configuration that corresponds to the secondary cell are the same, each of the two serving cells, the corresponding uplink reference UL-DL configuration is used to determine a correspondence between a subframe to which the PDCCH/EPDCCH/PHICH is allocated and a subframe to which the PUSCH to which the PDCCH/EPDCCH/PHICH corresponds is allocated. Furthermore, the downlink reference UL-DL configuration is used to specify (select or determine) a correspondence between a subframe n to which the PDSCH is allocated and a subframe n+k on which the HARQ-ACK corresponding to the PDSCH is transmitted. In the case where one primary cell is set, or in a case where one primary cell or one secondary cell is set and the downlink reference UL-DL configuration that corresponds to the primary cell and the downlink reference UL-DL configuration that corresponds to the secondary cell are the same, each of the two serving cells, the corresponding downlink reference UL-DL configuration is used to specify (select or determine) a correspondence between the subframe n to which the PDSCH is allocated and the subframe n+k on which the HARQ-ACK corresponding to the PDSCH is transmitted.

Furthermore, when a TDD UL/DL configuration (a first TDD UL/DL configuration) for an uplink transmission reference and a TDD UL/DL configuration (the second TDD UL/DL configuration) for a downlink transmission reference are set, and the information relating to the power control is set, in the subframe pattern that is indicated with the first TDD UL/DL configuration and the second TDD UL/DL configuration, in a case where the same subframe is set as the same type of subframe, the terminal device 2 performs the power control for the subframe based on the first power control method. Furthermore, in a case where different types of subframes are set with the first TDD UL/DL configuration and the second TDD UL/DL configuration, the terminal device 2 performs the power control for the subframe based on the second power control method.

The first TDD UL/DL configuration and/or the second TDD UL/DL configuration may be notified in a semi-static manner. Furthermore, the first TDD UL DL configuration and/or the second TDD UL/DL configuration may be notified dynamically. In a case where different indexes are set with the first TDD UL DL configuration and the second TDD UL/DL configuration, multiple subframe sets may be configured. To be more precise, a set of the same types of subframes and a set of different types of subframes may be configured with two TDD UL/DL configurations. These sets may be scheduled independently.

In a case where as the second configuration, the second TDD UL/DL configuration (for example, tdd-Config-v12, tdd-Config-r12, tdd-ConfigULreference-v12, or tdd-ConfigDLreference-r12) is set/attached as parameters, the terminal device 2 may transmit the uplink signal based on the first TDD UL/DL configuration, and may receive the downlink signal based on the second TDD UL/DL configuration. In a certain subframe, in a case where the transmission of the uplink signal and the transmission of the downlink signal are performed, either may be preferentially determined based on transmission direction setting information (information relating to the third configuration).

Moreover, according to each of the embodiments described above, the first configuration and/or the second configuration may be the TDD UL/DL configuration (TDD configuration, tdd-Config, or uplink-downlink configuration(s)). Furthermore, the first configuration and/or the second configuration may be a subframe pattern that is indicated by a bitmap. Furthermore, either of the first configuration and the second configuration may be information that indicates the uplink subframe, and the other may be information that indicates the downlink subframe. These pieces of indication information may be defined using a table, and may be defined in a bitmap manner.

Moreover, the base station device 1 may instruct the terminal device 2, in which the first configuration and the second configuration can be set, as to the uplink subframe, with either of the first configuration and the second configuration, and as to the downlink subframe, with the other. Furthermore, in a case where either of the first configuration and the second configuration is set, the terminal device 2 recognizes a subframe other than the subframe that is indicated, as a different type of subframe and performs transmission and reception processing. For example, in a case where the uplink subframe is indicated with the first configuration, and the downlink subframe is indicated with the second configuration, the terminal device 2 in which only the first configuration is set recognizes a subframe other than the uplink subframe that is indicated, as the downlink subframe or the special subframe, based on the second configuration, and performs the reception processing/transmission processing. The terminal device 2 in which only the second configuration is set recognizes a subframe other than the downlink subframe that is indicated, as the uplink subframe or the special subframe, based on the first configuration, and performs the transmission processing/reception processing. Moreover, with the first configuration and the second configuration, the uplink subframe and the downlink subframe may be set for the same subframe.

For example, in a case where the first configuration and the second configuration are set, the terminal device 2 may perform the transmission of the uplink signal based on the first configuration, and may perform the reception of the downlink signal based on the second configuration. Furthermore, in the case where the first configuration and the second configuration are set, the terminal device 2 may perform the reception of the downlink signal based on the first configuration, and may perform the transmission of the uplink signal based on the second configuration. Which configuration the performing of the transmission of the uplink signal and the reception of the downlink signal is based on may be determined based on the third configuration.

At this point, when the first configuration is defined as the TDD UL/DL configuration, the second configuration may be information (a parameter) that indicates the flexible subframe. Moreover, the second configuration may be managed using a table. Furthermore, the second configuration may be information that indicates the subframe that is set as the flexible subframe by a bitmap.

Moreover, according to each of the embodiments described above, the flexible subframe is a subframe that is an uplink subframe and a downlink subframe. Furthermore, the flexible subframe is a subframe that is a downlink subframe and a special subframe. Furthermore, the flexible subframe is a subframe that is an uplink subframe and a special subframe. To be more precise, the flexible subframe is a subframe that is the first subframe and the second subframe. For example, furthermore, a subframe that is set as the flexible subframe is processed as the first subframe (for example, the uplink subframe) in the case of condition 1, and is processed as the second subframe (for example, the downlink subframe) in the case of condition 2.

Moreover, the flexible subframe may be set based on the first configuration and the second configuration. For example, in a case where a certain subframe i is set as the uplink subframe with the first configuration and is set as the downlink subframe with the second configuration, the subframe i is the flexible subframe. The flexible subframe may set based on information that indicates a subframe pattern of the flexible subframe.

Furthermore, according to each of the embodiment described above, the first configuration and the second configuration may not be two TDD UL/DL configurations, and may be one TDD UL/DL configuration and a flexible subframe pattern (a downlink candidate subframe pattern, an uplink candidate subframe pattern, or an additional subframe). In a subframe index that is indicated with the flexible subframe pattern, although it is indicated with the TDD UL/DL configuration that the uplink subframe is present, if the uplink signal is not transmitted on that subframe, the terminal device 2 can receive the downlink signal. Furthermore, although it is indicated with the TDD UL/DL configuration that the downlink subframe is present, if it is indicated in advance that the uplink signal is transmitted on that subframe, the terminal device 2 can transmit the uplink signal. A specific subframe may be indicated as a subframe for an uplink/downlink candidate.

When both of the first configuration and the second configuration are set, based on a certain condition, the terminal device 2 may recognize one as a subframe set for the uplink and may recognize the other as a subframe set for the downlink. At this point, the subframe set for the uplink is a set of subframes that are set for the transmission of the PUSCH and the PHICH, and the subframe set for the downlink is a set of subframes that are set for the transmission on the PDSCH and the HARQ. Information indicating a subframe relationship between the PUSCH and the PHICH and information indicating a subframe relationship between the PDSCH and the HARQ may be set in advance for the terminal device 2. To be more precise, either of the first configuration and the second configuration may be information that indicates a subframe pattern of the uplink subframe and the other may be information that indicates a subframe pattern of the downlink subframe. These pieces of information may be set in a bitmap manner.

Moreover, according to each of the embodiments described above, the power control may include a power control method, a power control procedure, a power control process and the like. To be more precise, the first uplink power control may include a first uplink power control method, a first uplink power control procedure, and the like.

Moreover, according to each of the embodiments described above, in a case where the first configuration and the second configuration are set and thus two or more subframe sets are independently configured, the maximum transmission power ($P_{CMAX, c}$) and/or the minimum transmission power for the serving cell c, which is set for every terminal device 2, may be set for each of the subframe sets. Furthermore, the total maximum output power $P_{CMAX}$ (UE total configured maximum output power) and the total minimum output power, which are set by the terminal device 2, may be set for every subframe set. To be more precise, the terminal device 2 may set multiple independent maximum transmission powers and/or multiple independent minimum transmission powers.

Furthermore, in a case where resource allocation for various uplink signals is the same, the base station device 1 can detect the various uplink signals using a difference in a signal sequence between the uplink signals. To be more precise, the base station device 1 can identify each of the uplink signals using the difference in the signal sequence between the received uplink signals. Furthermore, the base station device 1 can determine whether or not the transmission is destined for the base station device 1 itself, using the difference in the signal sequence between the received uplink signals.

Moreover, in a case where, with the second downlink reference signal, the base station device 1 instructs the terminal device 2 to measure the received power, the terminal device 2 may calculate the downlink path loss based on a result of the measurement and may use the calculated the downlink path loss for the uplink transmit power control.

In some cases, the received power measurement here is referred to as reference signal received power (RSRP) measurement or reception signal power measurement. Furthermore, in some cases, the reception quality measurement is referred to as reference signal received quality (RSRQ) measurement or reception signal quality measurement.

Furthermore, the resource allocation (mapping to resource elements or mapping to physical resources) to the second downlink reference signal may be frequency-shifted. The frequency shift of the second downlink reference signal may be determined based on the physical cell ID. Furthermore, the frequency shift of the second downlink reference signal may be determined based on the virtual cell ID.

As one example, the base station device 1 notifies the terminal device 2 of information indicating whether or not the received power measurement of the second downlink reference signal is performed. In a case where the indication information indicates that the received power measurement of the second downlink reference signal can be performed, the terminal device 2 performs the received power measurement of the second downlink reference signal. At this time, the terminal device 2 may perform the received power measurement of a first downlink reference signal in a parallel manner. In a case where the indication information indicates that the received power measurement of the second downlink reference signal cannot be performed, the terminal device 2 performs only the received power measurement of the first downlink reference signal. Moreover, information indicating whether or not the received quality measurement of the second downlink reference signal is performed may be included in the indication information. Furthermore, the received power measurement of a third downlink reference signal may be performed without depending on the indication information.

Furthermore, as another example, the base station device 1 notifies the terminal device 2 of information indicating whether the received power measurement of the first downlink reference signal is performed or the received power measurement of the second downlink reference signal is performed. In a case where the indication information indicates that the received power measurement of the first downlink reference signal is performed, the terminal device 2 performs the received power measurement of the first downlink reference signal. In a case where the indication information indicates that the received power measurement of the second downlink reference signal is performed, the terminal device 2 performs the received power measurement of the second downlink reference signal. To be more precise, the indication information is information that indicates switching of the received power measurement. Furthermore, the information indicating whether or not the received quality measurement is performed may be included in the indication information. In this example, the indication information is described as information that indicates the switching between the received power measurements of two downlink reference signals, but may be information that indicates the switching among the received power measurements of three or more downlink reference signals. Furthermore, the received power measurement of the third downlink reference signal may be performed without depending on the indication information. Furthermore, the transmission power for the second downlink reference signal and/or the transmission power for the third downlink reference signal may be set based on the transmission power for the first downlink reference signal. For example, a power ratio (the power offset) between the first downlink reference signal and the second downlink reference signal (or the third downlink reference signal) may be set.

In a case of the downlink, for the downlink subframe that belongs to the first subframe set, the received power measurement of the downlink signal may be performed without considering the power offset, and for the downlink subframe that belongs to the second subframe set, the received power measurement of the downlink signal may be performed considering the power offset. The power offset may be set in advance by the base station device 1. Furthermore, the power offset may be indicated in a state of being set to be in the DCI format relating to the downlink.

Moreover, according to each of the embodiments described above, even in a case where the first configuration and the second configuration are set, if multiple subframe sets are not configured, the accumulation/absolute transmit power control may be common.

Moreover, according to each of the embodiments described above, in the terminal device 2, for the flexible subframe, the power control (the uplink power control, or the downlink power control) may be performed differently than with the uplink subframe/downlink subframe/special subframe. Furthermore, for the flexible subframe and the uplink subframe/downlink subframe/special subframe, closed-loop transmit power control may be performed independently. For example, for that subframe, power may be controlled using a parameter that is different from that in a case of a different uplink subframe or downlink subframe. Furthermore, for the flexible subframe and the uplink subframe/downlink subframe, a parameter that is used for generating a signal may be set independently. For example, a virtual cell ID, a scramble ID, or the like may be set independently. At this point, the generating of the signal includes generating a signal sequence. Furthermore, the generating of the signal includes determining the radio resource that is allocated to the signal.

Moreover, according to each of the embodiments described above, the first subframe set may be configured from subframes each of which is a small interference source (to be more precise, causes a small amount of interference, or causes low interference) for the terminal device 2. The second subframe set may be configured from subframes each of which is a large interference source (to be more precise, causes a large amount of interference, or causes high interference) for the terminal device 2. At this point, the subframe that is a small interference source is a subframe that is not set to be the same subframe which is used as the downlink subframe and the uplink subframe. Furthermore, the subframe that is a large interference source is a subframe that is set to be the same subframe which is used as the downlink subframe and the uplink subframe. The subframe that is a large interference source is a subframe in which an uplink signal that is transmitted from a different terminal device 2 can be an interference source when the terminal device 2 receives a downlink signal, and is subframe in which a downlink signal that is transmitted from a different base station device 1 can be an interference source when the base station device 1 receives an uplink signal.

Moreover, according to each of the embodiments described above, the same RSRP and path loss value may be applied as is the case with the first power control and the second power control. The received power measurement control may be shared among the downlink subframes that belong to two subframe sets. Furthermore, path loss measurement may be performed independently for every subframe set. Furthermore, the path loss measurement may be performed for every downlink subframe that belongs to a subframe set. Furthermore, a reference signal (a path loss reference resource) for the path loss measurement for the first subframe set may a CRS and a reference signal for the path loss measurement for the second subframe set may be a CSI-RS. To be more precise, the reference signal for the path loss measurement may be set for every subframe set. Furthermore, a path loss value that is measured independently may be applied to power that is controlled independently for every subframe set. Furthermore, for the path loss reference resource, a type of reference signal for the path loss measurement and a configuration of a resource (a time frequency resource, a resource element, or a subframe) for the reference signal for the path loss measurement may be indicated.

Moreover, according to each of the embodiments described above, in a case where the PUSCH and the PUCCH are transmitted on the flexible subframe, if a sum of these transmission powers exceeds the total maximum output power that is set for the terminal device 2, a maximum value of the transmission power for the PUSCH may be a value that results from subtracting the transmission power for the PUCCH from the total maximum output power $P_{CMAX}$.

Moreover, according to each of embodiments described above, although a power parameter is commonly used in multiple power control methods, this does not matter. To be more precise, some of the parameters may be common to the multiple power control methods. For example, a parameter that is set only as a parameter relating to the first power control can be used in the second power control method or the third power control method whenever necessary.

Furthermore, according to each of the embodiments described above, the base station device 1 may control the terminal device 2 in such a manner that the uplink signal is transmitted on the subframe in which the uplink subframe and the downlink subframe collide with each other and on the subframe in which the uplink subframe and the downlink subframe do not collide with each other, using an uplink index.

With two subframe sets, the power adjustment value may be shared that is obtained by the accumulation by the TPC command. The accumulation may be common without depending on the subframe set.

Moreover, according to each of the embodiments described above, the TPC command (TPC command for (scheduled) PUSCH) for the PUSCH that is used in the first power control method may be transmitted in the DCI format 0/4 or the DCI format 3/3A, and the TPC command for the PUSCH that is used in the second power control method may be transmitted in the DCI format 0/4. Furthermore, the TPC command (TPC command for PUCCH) for the PUCCH that is used in the first power control method may be transmitted in the DCI format 1/1A/1B/1D/2/2A/2B/2C/2D/3/3A, and the TPC command for the PUCCH that is used in the second power control method may be transmitted, for example, in the DCI format 1/1A/1B/1D/2/2A/2B/2C/2D.

Furthermore, although the same TPC command is present, switching between corresponding to the first power control method and corresponding to the second power control method may performed, depending on which subframe set, to which the uplink subframe on which the uplink signal is transmitted belongs, the detected TPC command corresponds to.

Furthermore, the accumulation may be performed independently in a case where the TPC command that is set to be in the DCI format 0 corresponds to the uplink subframe that belongs to the first subframe set, and a case where the TPC command that is set to be in the DCI format 0 corresponds to the uplink subframe that belongs to the second subframe set. For example, in a case where the DCI format 0 and the DCI format 3 are detected in the same subframe, when it is assumed that the DCI format 0 schedules the uplink signal for the uplink subframe which belongs to the first subframe set, the terminal device 2 sets uplink power based on the TPC command that is set to be in the DCI format 0. Furthermore, when it assumed that the DCI format 0 schedules the uplink signal for the uplink subframe which belongs to the second subframe set, the terminal device 2 sets the uplink power based on the TPC command that is set to be in the DCI format 0. Moreover, the transmission power for the uplink signal that corresponds to the uplink subframe which belongs to the first subframe set is configure based on the TPC command that is set to the DCI format 3. To be more precise, the first configuration and the second configuration are set, the subframe set and the DCI format may be associated with each other.

With the two subframe sets, a result of RSRP measurement may be shard. The RSRP may be common without depending on the subframe set.

Furthermore, the accumulation by the TPC command may be performed independently with the subframe set. The accumulation by the TPC command that is received in the fixed subframe and the accumulation by the TPC command that is received on the flexible subframe are controlled independently.

For example, in the case where the first configuration and the second configuration are set, the transmit power control (accumulation transmit power control or the closed-loop transmit power control) by the TPC command may be performed independently for every subframe set.

In a case where the accumulation is performed for every subframe set, the timing at which the DCI format that includes each TPC command field is received may be defined in advance.

Furthermore, the result of RSRP measurement may be independent with the subframe set. The measurement control of the RSRP by the CRS that is received on the downlink subframe that is the fixed subframe and of the RSRP by the CRS that is received on the flexible subframe may be performed independently.

In a case where the two subframe sets are configured based on the first configuration and the second configuration, when it is assumed that the second subframe set is the subframe pattern of the flexible subframe, the second configuration may be information that indicates the subframe on which it is possible to receive the DCI format that includes the TPC command field for the flexible subframe.

Each of the subframe on which the TPC command that is applicable to the uplink subframe which belongs to the first subframe set is transmitted and the subframe on which the TPC command that is applicable to the uplink subframe which belongs to the second subframe set is transmitted may be set separately. Correspondence (mapping or association) between an uplink subframe and a downlink subframe on which the DCI format that includes the TPC command for the uplink subframe is transmitted may be managed using a table.

Moreover, according to each of the embodiments described above, the first configuration and/or the second configuration may be information that indicates a switching period of the uplink and the downlink and a configuration of each subframe.

Moreover, according to each of the embodiments described above, for the uplink signal and/or the downlink signal, the transmit power control may be performed in the flexible subframe and a subframe other than the flexible subframe.

Moreover, according to each of the embodiments described above, in the case where both of the first configuration and the second configuration are set, the terminal device 2 may not transmit the first uplink reference signal (for example, the P-SRS) to a cell (a serving cell) for which the first configuration is set. Furthermore, according to each of the embodiments described above, in the case where both of the first configuration and the second configuration are set, the terminal device 2 may not transmit the uplink reference signal for which a specific transmission subframe is set by the higher layer.

Moreover, according to each of the embodiments described above, the resource element or the resource block is described as being used as a mapping unit for various uplink signals or downlink signals and the symbol, the subframe, or the radio frame is described as being used as a transmission unit for the time direction, but limitation to this is not imposed. Even if, instead of these, domain and time units are used that are configured from an arbitrary frequency and time, respectively, the same effect can be obtained. Moreover, according to each of the embodiments described above, the case where the demodulation is performed using the RS that is processed in a precoded manner is described, and for description, a port that is equivalent to a MIMO layer is used as a port corresponding to the RS that is processed in a precoded manner, but limitation to this is not imposed. In addition, the same effect can be obtained by applying the present invention to ports that correspond to different reference signals, respectively. For example, the unprecoded (non-precoded) RS can be used instead of the precoded RS, and a port that is equivalent to an output terminal after the precoding processing, or a port that is equivalent to a physical antenna (or a combination of antennas) can be used.

Moreover, according to each of the embodiments described above, the uplink transmit power control is power control for the uplink physical channel/physical signal (the PUSCH, the PUCCH, the PRACH, the SRS, the DMRS, or the like), and the power control includes pieces of information relating to switching or (re-) setting of various parameters that are used in the setting of the power for various uplink physical channels. Furthermore, the downlink transmit power control is power control for the downlink physical channel/physical signal (the CRS, the UERS (DL DMRS), the CSI-RS, the PDSCH, the PDCCH/EPDCCH, the PBCH, the PSS/SSS, the PMCH, the PRS, or the like), and the power control includes pieces of information relating to switching or (re-) setting of various parameters that are used in the setting of the power for various downlink physical channels.

Moreover, according to each of the embodiments described above, the transmission of the DCI format also means that various pieces of downlink control information that are set being associated with the DCI format are transmitted using the radio resource that is set for the PDCCH/EPDCCH. To be more precise, the transmission of the DCI format also means that the base station device 1 transmits the downlink control information, on the PDCCH/EPDCCH.

Moreover, according to each of the embodiments described above, the base station device 1 may possibly set multiple virtual cell IDs for one terminal device 2. For example, the base station device 1 and a network that include at least one base station device 1 may possibly set the virtual cell ID independently for every physical channel/physical signal. Furthermore, multiple virtual cell IDs may possibly be set for one physical channel/physical signal. To be more precise, the virtual cell ID may be set for every setting of a parameter relating to each physical channel/physical signal. Furthermore, with the multiple physical channels/physical signals, the virtual cell ID may be shared.

According to the present invention, the uplink power control has been described so far, but the downlink power control may also be controlled in the same manner.

According to the present invention, the uplink power control has been described so far, but downlink channel estimation control may also be controlled in the same manner. Furthermore, the present invention may be applied to control of channel state information reporting. The present invention may be applied to control of the received power measurement. According to the present invention, the downlink power control may also be controlled in the same manner.

Moreover, according to each of the embodiments described above, for example, the setting of the power includes setting a value of power, the calculating of the power includes calculating the value of the power, the measuring of the power includes measuring the value of the power, and the reporting of the power includes reporting the value of the power. In this manner, the term power also means a value of suitable power.

Moreover, according to each of the embodiments described above, for example, the calculating of the path loss includes calculating a value of the path loss. In this manner, the term path loss also includes a value of a suitable path loss.

Moreover, according to each of the embodiments described above, the setting of various parameters includes setting values of various parameters. In this manner, the expression various parameters also means values of suitable various parameters.

A program running on the base station device 1 and the terminal device 2 according to the present invention is a program (a program for causing a computer to operate) that controls a CPU and the like in such a manner as to realize the function according to the embodiments of the present invention. Then, pieces of information that are handled in these devices are temporarily stored in a RAM while being processed. Thereafter, the pieces of information are stored in various ROMs or HDDs, and whenever necessary, is read by the CPU to be modified or written. As a recording medium on which to store the program, among a semiconductor medium (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the functions according to the embodiments described above are realized by running the loaded program, and in addition, the functions according to the present invention are realized by performing processing in conjunction with an operating system or other application programs, based on an instruction from the program.

Furthermore, in a case where programs are distributed on the market, the programs, each of which is stored on a portable recording medium, can be distributed, or the program can be transmitted to a server computer that is connected through a network such as the Internet. In this case, a storage device of the server computer is also included in the present invention. Furthermore, some or all portions of the base station device 1 and the terminal device 2 according to the embodiments described above may be realized as an LSI that is a typical integrated circuit. Each functional block of the base station device 1 and the terminal device 2 may be individually built into a chip, and some or all functional blocks may be integrated into a chip. Furthermore, a technique of the integrated circuit is not limited to an LSI, and an integrated circuit for the functional block may be realized as a dedicated circuit or a general-purpose processor. Furthermore, if with advances in a semiconductor technology, a circuit integration technology with which an LSI is replaced appears, it is also possible to use an integrated circuit to which such a technology is applied.

The embodiments of the invention are described in detail above referring to the drawings, but the specific configuration is not limited to the embodiments and includes an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to each of the embodiments is also included in the technical scope of the present invention.

Moreover, the invention in the present application is not limited to the embodiments described above. Furthermore, application of the terminal device according to the disclosure in the present application is not limited to the mobile station. It goes without saying that the terminal device can be applied to a stationary-type electronic apparatus that is installed indoors or outdoors, or a non-movable-type electronic apparatus, for example, an AV apparatus, a kitchen apparatus, a cleaning or washing machine, an air-conditioning apparatus, office equipment, a vending machine, and other household apparatuses. Furthermore, the present invention is suitable for use in a wireless base station device, a wireless terminal device, a wireless communication system, or a wireless communication method.

The present invention as described above may have the following features.

(1) According to an aspect of the present invention, there is provided a terminal device configured to communicate with a base station device, the terminal device being configured to: receive first information indicating a subframe in a first subframe set and a subframe in a second subframe set, and second information indicating whether or not accumulation is enabled, for the one cell; set transmission power for transmission of a physical uplink shared channel on a subframe belonging to the first subframe set, based on a first parameter relating to power control adjustment; set transmission power for the physical uplink shared channel on a subframe belonging to the second subframe set, based on a second parameter relating to the power control adjustment; calculate a value of the first parameter by accumulating a correction value indicated by a transmit power control command corresponding to a subframe belonging to the first subframe set, in a case that the accumulation is enabled based on the second information; calculate a value of the second parameter by accumulating the correction value indicated by the transmit power control command corresponding to a subframe belonging to the second subframe set, in the case that the accumulation is enabled based on the second information; set one value indicated by one transmit power control command corresponding to the subframe belonging to the first subframe set, as the value of the first parameter, in a case that the accumulation is not enabled based on the second information; and set one value indicated by one transmit power control command corresponding to the subframe belonging to the second subframe set, as the value of the second parameter, in the case that the accumulation is not enabled based on the second information.

(2) Furthermore, the terminal device according to the aspect of the present invention is configured to: receive information indicating a first uplink-downlink configuration and information indicating a second uplink-downlink configuration; transmit a HARQ-ACK for a physical downlink shared channel detected in a subframe n−j, on the physical uplink shared channel corresponding to a physical downlink control channel accompanied by C-RNTI detected in a subframe n−k, in a subframe n, using a transmission power based on the first parameter or the second parameter; set the k based on the first uplink-downlink configuration; and set the j based on the second uplink-downlink configuration.

(3) Furthermore, the terminal device according to the aspect of the present invention is configured to, in a case that a sounding reference signal is transmitted on the subframe belonging to the first subframe set, set transmission power for transmission of the sounding reference signal, based on the first parameter, and the terminal device is configured to, in a case that the sounding reference signal is transmitted on the subframe belonging to the second subframe set, set the transmission power for the transmission of the sounding reference signal, based on the second parameter.

(4) Furthermore, the terminal device according to the aspect of the present invention is configured not to accumulate the correction value for the first parameter, in a case that the transmission power based on the value of the first parameter reaches a maximum power, and the transmission power exceeds the maximum power by accumulating the correction value indicated by the transmit power control command corresponding to the subframe belonging to the first subframe set, and the terminal device is configured not to accumulate the correction value for the second parameter, in a case that the transmission power based on the value of the second parameter reaches the maximum power, and the transmission power exceeds the maximum power by accumulating the correction value indicated by the transmit power control command corresponding to the subframe belonging to the second subframe set.

(5) Furthermore, the terminal device according to the aspect of the present invention is configured not to accumulate the correction value for the first parameter, in a case that the transmission power based on the value of the first parameter reaches a minimum power, and the transmission power falls below the minimum power by accumulating the correction value indicated by the transmit power control command corresponding to the subframe belonging to the first subframe set, and the terminal device is configured not to accumulate the correction value for the second parameter, in a case that the transmission power based on the value of the second parameter reaches the minimum power, and the transmission power falls below the minimum power by accumulating the correction value indicated by the transmit power control command corresponding to the subframe belonging to the second subframe set.

(6) Furthermore, according to another aspect of the present invention, there is provided a method for use in a terminal device configured to communicate with a base station device using one cell, the method comprising: a step of receiving first information indicating a subframe in a first subframe set and a subframe in a second subframe set, and second information indicating whether or not accumulation is enabled, for the one cell; a step of setting transmission power for transmission of a physical uplink shared channel on a subframe belonging to the first subframe set, based on a first parameter relating to power control adjustment; a step of setting transmission power for transmission of the physical uplink shared channel on a subframe belonging to the second subframe set, based on a second parameter relating to the power control adjustment; a step of calculating a value of the first parameter by accumulating a correction value indicated by a transmit power control command corresponding to a subframe belonging to the first subframe set, in a case that accumulation is enabled based on the second information; a step of calculating a value of the second parameter by accumulating the correction value indicated by the transmit power control command corresponding to a subframe belonging to the second subframe set, in the case that the accumulation is enabled based on the second information; a step of setting one value indicated by one transmit power control command corresponding to the subframe belonging to the first subframe set, as the value of the first parameter, in a case that the accumulation is not enabled based on the second information; and a step of setting one value indicated by one transmit power control command corresponding to the subframe belonging to the second subframe set, as the value of the second parameter, in the case that the accumulation is not enabled based on the second information.

(7) Furthermore, the method according to the aspect of the present invention further includes: a step of receiving information indicating a first uplink-downlink configuration and information indicating a second uplink-downlink configuration; a step of transmitting a HARQ-ACK for a physical downlink shared channel detected in a subframe n–j, on the physical uplink shared channel corresponding to a physical downlink control channel accompanied by C-RNTI detected in a subframe n–k, in a subframe n, using a transmission power based on the first parameter or the second parameter; a step of setting the k based on the first uplink-downlink configuration; and a step of setting the j based on the second uplink-downlink configuration.

(8) Furthermore, the method according to the aspect of the prevent invention further includes: a step of setting transmission power for transmission of a sounding reference signal, based on the first parameter, in a case that the sounding reference signal is transmitted on the subframe belonging to the first subframe set; and a step of setting transmission power for the transmission of the sounding reference signal, based on the second parameter, in a case that the sounding reference signal is transmitted on the subframe belonging to the second subframe set.

(9) Furthermore, the method according to the aspect of the present invention further includes: a step of not accumulating the correction value for the first parameter, in a case that the transmission power exceeds a maximum power by accumulating the correction value indicated by the transmit power control command corresponding to the subframe belonging to the first subframe set, and the transmission power based on the value of the first parameter reaches the maximum power; and a step of not accumulating the correction value for the second parameter, in a case that the transmission power exceeds the maximum power by accumulating the correction value indicated by the transmit power control command corresponding to the subframe belonging to the second subframe set, and the transmission power based on the value of the second parameter reaches the maximum power.

(10) Furthermore, the method according to the aspect of the present invention further includes: a step of not accumulating the correction value for the first parameter, in a case that the transmission power falls below a minimum power by accumulating the correction value indicated by the transmit power control command corresponding to the subframe belonging to the first subframe set, and the transmission power based on the value of the first parameter reaches the minimum power; and a step of not accumulating the correction value for the second parameter, in a case that the transmission power falls below the minimum power by accumulating the correction value indicated by the transmit power control command corresponding to the subframe belonging to the second subframe set, and the transmission power based on the value of the second parameter reaches the minimum power.

(11) Furthermore, according to still another aspect of the present invention, there is provided an integrated circuit to be mounted on a terminal device configured to communicate with a base station device using one cell, and the integrated circuit being configured to cause the terminal device to perform a series of functions including: a function of setting a subframe in a first subframe set and a subframe in a second subframe set, for the one cell, based on first information; a function of setting transmission power for transmission of a physical uplink shared channel on a subframe belonging to the first subframe set, based on a first parameter relating to power control adjustment; a function of setting the transmission power for transmission of the physical uplink shared channel on a subframe belonging to the second subframe set, based on a second parameter relating to the power control adjustment; a function of calculating a value of the first parameter by accumulating a correction value indicated by a transmit power control command corresponding to a subframe belonging to the first subframe set, in a case that accumulation is enabled based on second information; a function of calculating a value of the second parameter by accumulating the correction value indicated by the transmit power control command corresponding to a subframe belonging to the second subframe set, in the case that the accumulation is enabled based on the second information; a function of setting one value indicated by one transmit power control command corresponding to the subframe belonging to the first subframe set, as the value of the first parameter, in a case that the accumulation is not enabled based on the second information; and a function of setting one value indicated by one transmit power control command corresponding to the subframe belonging to the second subframe set, as the value of the second parameter, in the case that the accumulation is not enabled based on the second information.

(12) Furthermore, the integrated circuit according to the aspect of the present invention is configured to cause the terminal device to perform the series of functions including: a function of receiving information indicating a first uplink-downlink configuration and information indicating a second uplink-downlink configuration; a function of transmitting a HARQ-ACK for a physical downlink shared channel detected in a subframe n−j, on a physical uplink shared channel corresponding to a physical downlink control channel accompanied by C-RNTI detected in a subframe n−k, in a subframe n, using a transmission power based on the first parameter or the second parameter; a function of setting the k based on the first uplink-downlink configuration; and a function of setting the j based on the second uplink-downlink configuration.

(13) Furthermore, the integrated circuit according to the aspect of the present invention is configured to cause the terminal device to perform the series of functions further including: a function of setting transmission power for transmission of a sounding reference signal, based on the first parameter, in a case that the sounding reference signal is transmitted on the subframe belonging to the first subframe set; and a function of setting transmission power for the transmission of the sounding reference signal, based on the second parameter, in a case that the sounding reference signal is transmitted on the subframe belonging to the second subframe set.

(14) Furthermore, the integrated circuit according to the aspect of the present invention is configured to cause the terminal device to perform the series of functions including: a function of not accumulating the correction value for the first parameter, in a case that the transmission power exceeds a maximum power by accumulating the correction value indicated by the transmit power control command corresponding to the subframe belonging to the first subframe set, and the transmission power based on the value of the first parameter reaches the maximum power; and a function of not accumulating the correction value for the second parameter, in a case that the transmission power exceeds the maximum power by accumulating the correction value indicated by the transmit power control command corresponding to the subframe belonging to the second subframe set, and the transmission power based on the value of the second parameter reaches the maximum power.

(15) Furthermore, the integrated circuit according to the aspect to the present invention is configured to cause the terminal device to perform the series of functions including: a function of not accumulating the correction value for the first parameter, in a case that the transmission power falls below a minimum power by accumulating the correction value indicated by the transmit power control command corresponding to the subframe belonging to the first subframe set, and the transmission power based on the value of the first parameter reaches the minimum power; and a function of not accumulating the correction value for the second parameter, in a case that the transmission power falls below the minimum power by accumulating the correction value indicated by the transmit power control command corresponding to the subframe belonging to the second subframe set, and the transmission power based on the value of the second parameter reaches the minimum power.

Accordingly, the terminal device can perform suitable transmit power control.

DESCRIPTION OF REFERENCE NUMERALS

1 BASE STATION DEVICE
2 TERMINAL DEVICE
101 HIGHER LAYER PROCESSING UNIT
103 CONTROL UNIT
105 RECEPTION UNIT
107 TRANSMISSION UNIT
109 CHANNEL MEASUREMENT UNIT
111 TRANSMIT AND RECEIVE ANTENNA
1051 DECODING UNIT
1053 DEMODULATION UNIT
1055 DEMULTIPLEXING UNIT
1057 RADIO RECEPTION UNIT
1071 CODING UNIT
1073 MODULATION UNIT
1075 MULTIPLEXING UNIT
1077 RADIO TRANSMISSION UNIT
1079 DOWNLINK REFERENCE SIGNAL GENERATION UNIT
201 HIGHER LAYER PROCESSING UNIT
203 CONTROL UNIT
205 RECEPTION UNIT
207 TRANSMISSION UNIT
209 CHANNEL MEASUREMENT UNIT
211 TRANSMIT AND RECEIVE ANTENNA
2051 DECODING UNIT
2053 DEMODULATION UNIT
2055 DEMULTIPLEXING UNIT
2057 RADIO RECEPTION UNIT
2071 CODING UNIT
2073 MODULATION UNIT
2075 MULTIPLEXING UNIT
2077 RADIO TRANSMISSION UNIT
2079 UPLINK REFERENCE SIGNAL GENERATION UNIT

The invention claimed is:

1. A terminal device configured to communicate with a base station device using one cell, the terminal device comprising:
reception circuitry configured and/or programmed to receive first information indicating a subframe in a first subframe set and a subframe in a second subframe set, and second information indicating whether or not accumulation is enabled, for the one cell; and
transmission circuitry configured and/or programmed to:
set transmission power for transmission of a physical uplink shared channel on a subframe belonging to the first subframe set, based on a first parameter relating to power control adjustment;
set transmission power for the physical uplink shared channel on a subframe belonging to the second subframe set, based on a second parameter relating to the power control adjustment;
calculate a value of the first parameter by accumulating a correction value indicated by a transmit power control command corresponding to a subframe belonging to the first subframe set, in a case that the accumulation is enabled based on the second information;
calculate a value of the second parameter by accumulating the correction value indicated by the transmit power control command corresponding to a subframe belonging to the second subframe set, in the case that the accumulation is enabled based on the second information;

set one value indicated by one transmit power control command corresponding to the subframe belonging to the first subframe set, as the value of the first parameter, in a case that the accumulation is not enabled based on the second information; and set one value indicated by one transmit power control command corresponding to the subframe belonging to the second subframe set, as the value of the second parameter, in the case that the accumulation is not enabled based on the second information; wherein in a case that transmission of the physical uplink shared channel on the subframe belonging to the second subframe set corresponds to a semi-persistent grant, the transmission circuitry is configured and/or programmed to set the transmission power based on the second parameter and a third parameter related to an uplink power control; and in a case that transmission of the physical uplink shared channel on the subframe belonging to the second subframe set corresponds to a dynamic scheduled grant, the transmission circuitry is configured and/or programmed to set the transmission power based on the second parameter and a fourth parameter related to the uplink power control.

2. The terminal device according to claim 1, wherein the reception circuitry is configured to receive information indicating a first uplink-downlink configuration and information indicating a second uplink-downlink configuration, and the transmission circuitry is configured to transmit a HARQ-ACK for a physical downlink shared channel detected in a subframe n−j, on the physical uplink shared channel corresponding to a physical downlink control channel accompanied by C-RNTI detected in a subframe n−k, in a subframe n, using a transmission power based on the first parameter or the second parameter, set the k based on the first uplink-downlink configuration, and set the j based on the second uplink-downlink configuration.

3. The terminal device according to claim 1, wherein the transmission circuitry is configured to, in a case that a sounding reference signal is transmitted on the subframe belonging to the first subframe set, set transmission power for transmission of the sounding reference signal, based on the first parameter, and the transmission circuitry is configured to, in a case that the sounding reference signal is transmitted on the subframe belonging to the second subframe set, set transmission power for the transmission of the sounding reference signal, based on the second parameter.

4. The terminal device according to claim 1, wherein the transmission circuitry is configured not to accumulate the correction value for the first parameter, in a case that the transmission power based on the value of the first parameter reaches a maximum power, and the transmission power exceeds the maximum power by accumulating the correction value indicated by the transmit power control command corresponding to the subframe belonging to the first subframe set, and the transmission circuitry is configured not to accumulate the correction value for the second parameter, in a case that the transmission power based on the value of the second parameter reaches the maximum power, and the transmission power exceeds the maximum power by accumulating the correction value indicated by the transmit power control command corresponding to the subframe belonging to the second subframe set.

5. The terminal device according to claim 1, wherein the transmission circuitry is configured not to accumulate the correction value for the first parameter, in a case that the transmission power based on the value of the first parameter reaches a minimum power, and the transmission power falls below the minimum power by accumulating the correction value indicated by the transmit power control command corresponding to the subframe belonging to the first subframe set, and the transmission circuitry is configured not to accumulate the correction value for the second parameter, in a case that the transmission power based on the value of the second parameter reaches the minimum power, and the transmission power falls below the minimum power by accumulating the correction value indicated by the transmit power control command corresponding to the subframe belonging to the second subframe set.

6. A method for use in a terminal device configured to communicate with a base station device using one cell, the method comprising:

receiving first information indicating a subframe in a first subframe set and a subframe in a second subframe set, and second information indicating whether or not accumulation is enabled, for the one cell;

setting transmission power for transmission of a physical uplink shared channel on a subframe belonging to the first subframe set, based on a first parameter relating to power control adjustment;

setting transmission power for transmission of the physical uplink shared channel on a subframe belonging to the second subframe set, based on a second parameter relating to the power control adjustment;

calculating a value of the first parameter by accumulating a correction value indicated by a transmit power control command corresponding to a subframe belonging to the first subframe set, in a case that accumulation is enabled based on the second information;

calculating a value of the second parameter by accumulating the correction value indicated by the transmit power control command corresponding to a subframe belonging to the second subframe set, in the case that the accumulation is enabled based on the second information;

setting one value indicated by one transmit power control command corresponding to the subframe belonging to the first subframe set, as the value of the first parameter, in a case that the accumulation is not enabled based on the second information; and setting one value indicated by one transmit power control command corresponding to the subframe belonging to the second subframe set, as the value of the second parameter, in the case that the accumulation is not enabled based on the second information; wherein in a case that transmission of the physical uplink shared channel on the subframe belonging to the second subframe set corresponds to a semi-persistent grant, the transmission power is set based on the second parameter and a third parameter related to an uplink power control; and in a case that transmission of the physical uplink shared channel on the subframe belonging to the second subframe set corresponds to a dynamic scheduled grant, the transmission power is set based on the second parameter and a fourth parameter related to the uplink power control.

7. The method according to claim 6, further comprising:
receiving information indicating a first uplink-downlink configuration and information indicating a second uplink-downlink configuration;
transmitting a HARQ-ACK for a physical downlink shared channel detected in a subframe n−j, on the physical uplink shared channel corresponding to a physical downlink control channel accompanied by C-RNTI detected in a subframe n−k, in a subframe n, using a transmission power based on the first parameter or the second parameter;
setting the k based on the first uplink-downlink configuration; and
setting the j based on the second uplink-downlink configuration.

8. The method according to claim 6, further comprising:
setting transmission power for transmission of a sounding reference signal, based on the first parameter, in a case that the sounding reference signal is transmitted on the subframe belonging to the first subframe set; and
setting the transmission power for the transmission of the sounding reference signal, based on the second parameter, in a case that the sounding reference signal is transmitted on the subframe belonging to the second subframe set.

9. The method according to claim 6, further comprising:
not accumulating the correction value for the first parameter, in a case that the transmission power exceeds a maximum power by accumulating the correction value indicated by the transmit power control command corresponding to the subframe belonging to the first subframe set, and the transmission power based on the value of the first parameter reaches the maximum power; and
not accumulating the correction value for the second parameter, in a case that the transmission power exceeds the maximum power by accumulating the correction value indicated by the transmit power control command corresponding to the subframe belonging to the second subframe set, and the transmission power based on the value of the second parameter reaches the maximum power.

10. The method according to claim 6, further comprising:
not accumulating the correction value for the first parameter, in a case that the transmission power falls below a minimum power by accumulating the correction value indicated by the transmit power control command corresponding to the subframe belonging to the first subframe set, and the transmission power based on the value of the first parameter reaches the minimum power; and
not accumulating the correction value for the second parameter, in a case that the transmission power falls below the minimum power by accumulating the correction value indicated by the transmit power control command corresponding to the subframe belonging to the second subframe set, and the transmission power based on the value of the second parameter reaches the minimum power.

11. An integrated circuit to be mounted on a terminal device configured to communicate with a base station device using one cell, and the integrated circuit being configured to cause the terminal device to perform at least a method comprising:

setting a subframe in a first subframe set and a subframe in a second subframe set, for the one cell, based on first information;
setting transmission power for transmission of a physical uplink shared channel on a subframe belonging to the first subframe set, based on a first parameter relating to power control adjustment;
setting the transmission power for transmission of the physical uplink shared channel on a subframe belonging to the second subframe set, based on a second parameter relating to the power control adjustment;
calculating a value of the first parameter by accumulating a correction value indicated by a transmit power control command corresponding to a subframe belonging to the first subframe set, in a case that accumulation is enabled based on second information;
calculating a value of the second parameter by accumulating the correction value indicated by the transmit power control command corresponding to a subframe belonging to the second subframe set, in the case that the accumulation is enabled based on the second information;
setting one value indicated by one transmit power control command corresponding to the subframe belonging to the first subframe set, as the value of the first parameter, in a case that the accumulation is not enabled based on the second information; and
setting one value indicated by one transmit power control command corresponding to the subframe belonging to the second subframe set, as the value of the second parameter, in the case that the accumulation is not enabled based on the second information; wherein
in a case that transmission of the physical uplink shared channel on the subframe belonging to the second subframe set corresponds to a semi-persistent grant, the transmission power is set based on the second parameter and a third parameter related to an uplink power control; and
in a case that transmission of the physical uplink shared channel on the subframe belonging to the second subframe set corresponds to a dynamic scheduled grant, the transmission power is set based on the second parameter and a fourth parameter related to the uplink power control.

12. The integrated circuit according to claim 11, wherein the integrated circuit is configured to cause the terminal device to further perform:
receiving information indicating a first uplink-downlink configuration and information indicating a second uplink-downlink configuration;
transmitting a HARQ-ACK for a physical downlink shared channel detected in a subframe n−j, on a physical uplink shared channel corresponding to a physical downlink control channel accompanied by C-RNTI detected in a subframe n−k, in a subframe n, using a transmission power based on the first parameter or the second parameter;
setting the k based on the first uplink-downlink configuration; and
setting the j based on the second uplink-downlink configuration.

13. The integrated circuit according to claim 11, wherein the integrated circuit is configured to cause the terminal device to further perform:
setting the transmission power for transmission of a sounding reference signal, based on the first parameter, in a case that the sounding reference signal is transmitted on the subframe belonging to the first subframe set; and setting the transmission power for the transmission of the sounding reference signal, based on the second parameter, in a case that the sounding reference signal is transmitted on the subframe belonging to the second subframe set.

14. The integrated circuit according to claim 11, wherein the integrated circuit is configured to cause the terminal device to further perform:

not accumulating the correction value for the first parameter, in a case that the transmission power exceeds a maximum power by accumulating the correction value indicated by the transmit power control command corresponding to the subframe belonging to the first subframe set, and the transmission power based on the value of the first parameter reaches the maximum power; and not accumulating the correction value for the second parameter, in a case that the transmission power exceeds the maximum power by accumulating the correction value indicated by the transmit power control command corresponding to the subframe belonging to the second subframe set, and the transmission power based on the value of the second parameter reaches the maximum power.

15. The integrated circuit according to claim 11, wherein the integrated circuit is configured to cause the terminal device to further perform:

not accumulating the correction value for the first parameter, in a case that the transmission power falls below a minimum power by accumulating the correction value indicated by the transmit power control command corresponding to the subframe belonging to the first subframe set, and the transmission power based on the value of the first parameter reaches the minimum power; and not accumulating the correction value for the second parameter, in a case that the transmission power falls below the minimum power by accumulating the correction value indicated by the transmit power control command corresponding to the subframe belonging to the second subframe set, and the transmission power based on the value of the second parameter reaches the minimum power.

* * * * *